US007049778B2

(12) United States Patent
Katanaya

(10) Patent No.: US 7,049,778 B2
(45) Date of Patent: May 23, 2006

(54) INVERTER CONTROL APPARATUS AND INVERTER CONTROL METHOD

(75) Inventor: Ikuya Katanaya, Kyoto (JP)

(73) Assignee: Nippon Yusoki Co., Ltd., Kyoto (JP)

( * ) Notice: Subject to any disclaimer, the term of this patent is extended or adjusted under 35 U.S.C. 154(b) by 0 days.

(21) Appl. No.: 11/052,813

(22) Filed: Feb. 9, 2005

(65) Prior Publication Data

US 2005/0174076 A1 Aug. 11, 2005

(30) Foreign Application Priority Data

Feb. 9, 2004 (JP) ........................... P2004-031797
Feb. 13, 2004 (JP) ........................... P2004-037301
Apr. 30, 2004 (JP) ........................... P2004-136809

(51) Int. Cl.
*G05B 11/28* (2006.01)

(52) U.S. Cl. ...................... 318/599; 318/254; 318/600; 318/601; 318/602; 318/603; 318/604; 318/606; 318/607; 318/608; 363/41; 363/42; 375/238

(58) Field of Classification Search ................ 318/139, 318/811, 800–802, 437–439, 599–608, 254, 318/700
See application file for complete search history.

(56) References Cited

U.S. PATENT DOCUMENTS 3,916,285 A * 10/1975 Iwata et al. ................... 363/41
4,099,109 A * 7/1978 Abbondanti ................ 318/811
4,166,247 A * 8/1979 Miyazawa .................. 327/176
4,167,775 A * 9/1979 Baker et al. .................. 363/42
4,295,189 A * 10/1981 Boys ........................... 363/41
4,325,112 A * 4/1982 Otsuka ........................ 363/42
4,339,697 A * 7/1982 Franz ......................... 388/811
4,419,615 A * 12/1983 Muto et al. ................. 318/811
4,491,768 A * 1/1985 Slicker ....................... 318/139
4,559,485 A * 12/1985 Stephan ...................... 318/802
4,562,524 A * 12/1985 Mutoh et al. ................. 363/41
4,599,550 A * 7/1986 Robertson et al. .......... 318/811
4,622,628 A * 11/1986 Murasaki et al. ............. 363/37
4,628,475 A * 12/1986 Azusawa et al. ........... 708/845
4,660,162 A * 4/1987 Berlinsky ................... 708/290
4,686,480 A * 8/1987 Katto et al. ................. 327/176
4,727,468 A * 2/1988 Maekawa .................... 363/41
4,751,442 A * 6/1988 Kurakake ................... 318/567
4,802,077 A * 1/1989 Fujii et al. .................... 363/41

(Continued)

FOREIGN PATENT DOCUMENTS

JP 2002-27763 A 1/2002

(Continued)

*Primary Examiner*—David Martin
*Assistant Examiner*—Robert W. Horn
(74) *Attorney, Agent, or Firm*—Sughrue Mion, PLLC

(57) ABSTRACT

An interrupt signal is generated at each of rising timings of PWM signals which are produced on the basis of phase-shifted triangular wave carrier signals for phases, and voltage command values for the phases. At timings of the interrupt signals, A/D conversion of motor currents of the phases detected by a shunt is started. Interrupt signals are also produced at timings of valleys of the triangular wave carrier signals. Additionally, peak interrupt signals and valley interrupt signals are respectively produced at timings of peaks and valleys of triangular wave carrier signals for phases. Based on each of the peak interrupt signals, normality/abnormality of a switching element of an upper side of the phase corresponding to the interrupt signal is checked, and, based on each of the valley interrupt signals, normality/abnormality of a switching element of a lower side of the phase corresponding to the interrupt signal is checked.

20 Claims, 23 Drawing Sheets

U.S. PATENT DOCUMENTS 4,860,186 A * 8/1989 Maekawa et al. ............ 363/41
4,894,598 A * 1/1990 Daggett ................ 318/568.16
4,924,373 A * 5/1990 Inaba et al. .................. 363/95
5,177,373 A * 1/1993 Nakamura .................. 327/176
5,309,079 A * 5/1994 Takada ...................... 318/811
5,350,988 A * 9/1994 Le ........................... 318/618
5,355,136 A * 10/1994 Katagiri ..................... 341/157
5,382,886 A * 1/1995 Mizuide .................... 318/807
5,400,237 A * 3/1995 Flanagan et al. ............ 363/41
5,416,686 A * 5/1995 Azuma et al. ............... 363/37
5,486,743 A * 1/1996 Nagai ........................ 318/439
5,500,627 A * 3/1996 Hulsing, II ................ 331/1 A
5,550,450 A * 8/1996 Palko et al. ............... 318/800
5,581,169 A * 12/1996 Kerkman et al. .......... 318/811
5,646,499 A * 7/1997 Doyama et al. ........... 318/801
5,650,709 A * 7/1997 Rotunda et al. ........... 318/802
5,739,650 A * 4/1998 Kimura et al. ............. 318/254
5,903,128 A * 5/1999 Sakakibara et al. ......... 318/721
5,933,344 A * 8/1999 Mitsuishi et al. ............ 700/13
6,060,851 A * 5/2000 Imai et al. ................. 318/437
6,194,856 B1 * 2/2001 Kobayashi et al. ......... 318/432
6,324,038 B1 * 11/2001 Kishibe et al. .............. 361/31
6,392,418 B1 * 5/2002 Mir et al. .................. 324/403
6,400,107 B1 * 6/2002 Nakatani et al. ........... 318/254
6,418,097 B1 * 7/2002 Schell et al. ............. 369/44.34
6,426,609 B1 * 7/2002 Tanaka et al. ............... 322/19
6,448,827 B1 * 9/2002 Tojima ...................... 327/172
6,452,349 B1 * 9/2002 Hahn et al. ................ 318/254
6,501,243 B1 * 12/2002 Kaneko et al. ............ 318/700
6,534,948 B1 * 3/2003 Ohura et al. ............... 318/798
6,545,443 B1 * 4/2003 Kushida .................... 318/727
6,549,871 B1 * 4/2003 Mir et al. .................. 702/145
6,559,783 B1 * 5/2003 Stoneking .................. 341/141
6,611,117 B1 * 8/2003 Hardt ........................ 318/254
6,657,412 B1 * 12/2003 Ishida et al. ............... 318/599
6,667,598 B1 * 12/2003 Shimohara ................. 318/811
6,737,828 B1 * 5/2004 Kiuchi et al. .............. 318/779
6,788,137 B1 * 9/2004 Morita ....................... 330/10
6,792,042 B1 * 9/2004 Bae ........................... 375/238
6,844,697 B1 * 1/2005 Masaki et al. ............. 318/721
6,903,948 B1 * 6/2005 Yoshida et al. .............. 363/95
6,946,753 B1 * 9/2005 Kernahan et al. .......... 307/151
6,969,968 B1 * 11/2005 Throngnumchai .......... 318/807
2002/0057069 A1 * 5/2002 Kushida .................... 318/727
2005/0025231 A1 * 2/2005 Mitsuki ..................... 375/238

FOREIGN PATENT DOCUMENTS

JP 2003-164190 A 6/2003

* cited by examiner

FIG. 4

| PHASE DIFFERENCE WITH RESPECT TO REFERENCE CARRIER SIGNAL IN PHASE LAGGING DIRECTION | RATIO OF INITIAL VALUE TO UPPER LIMIT VALUE OF UP/DOWN COUNTER | INITIAL COMMAND VALUE OF FLIP-FLOP |
|---|---|---|
| 60° | 1/3 | L |
| 72° | 2/5 | L |
| 90° | 1/2 | L |
| 120° | 2/3 | L |
| 144° | 4/5 | L |
| 180° | 1 | L |
| 216° | 4/5 | H |
| 240° | 2/3 | H |
| 270° | 1/2 | H |
| 288° | 2/5 | H |
| 300° | 1/3 | H |
| 360° (0°) | 0 | H |

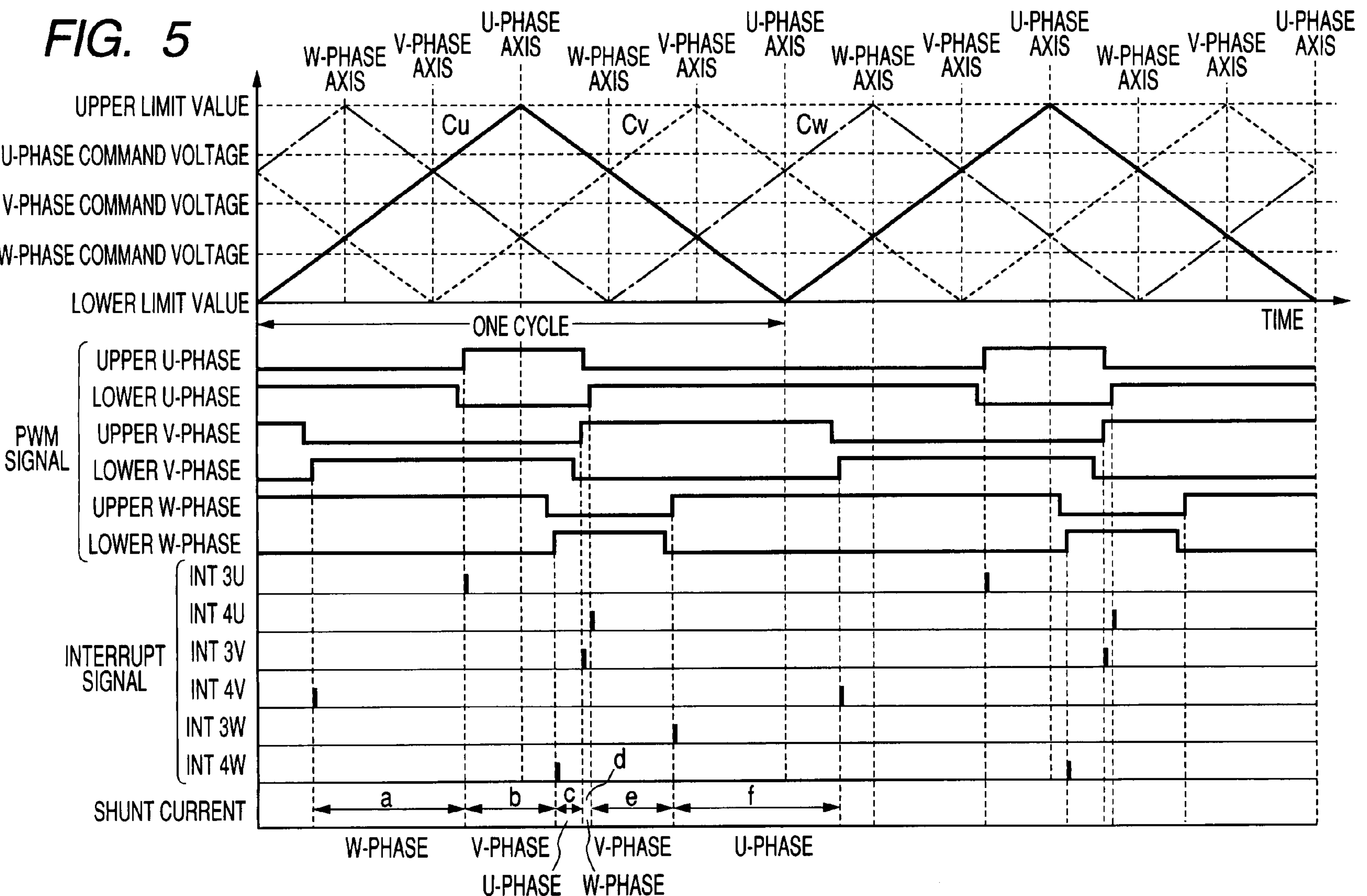
FIG. 5
W-PHASE AXIS
V-PHASE AXIS
U-PHASE AXIS
UPPER LIMIT VALUE
U-PHASE COMMAND VOLTAGE
V-PHASE COMMAND VOLTAGE
W-PHASE COMMAND VOLTAGE
LOWER LIMIT VALUE
Cu
Cv
Cw
ONE CYCLE
TIME
PWM SIGNAL
UPPER U-PHASE
LOWER U-PHASE
UPPER V-PHASE
LOWER V-PHASE
UPPER W-PHASE
LOWER W-PHASE
INTERRUPT SIGNAL
INT 3U
INT 4U
INT 3V
INT 4V
INT 3W
INT 4W
SHUNT CURRENT
a
b
c
d
e
f
W-PHASE
V-PHASE
U-PHASE
V-PHASE
W-PHASE
U-PHASE UPPER LIMIT VALUE
U-PHASE COMMAND VOLTAGE
V-PHASE COMMAND VOLTAGE
W-PHASE COMMAND VOLTAGE
LOWER LIMIT VALUE
UPPER U-PHASE
LOWER U-PHASE
UPPER V-PHASE
LOWER V-PHASE
UPPER W-PHASE
LOWER W-PHASE
INT 1U
INT 2U
INT 1V
INT 2V
INT 1W
INT 2W
W-PHASE AXIS
V-PHASE AXIS
U-PHASE AXIS
Cu
Cv
Cw
TIME 300
CARRIER SIGNAL GENERATION SECTION
301
PULSE GENERATOR
302
120° PHASE SHIFTER
303
120° PHASE SHIFTER
304
INTEGRATION CIRCUIT
305
INTEGRATION CIRCUIT
306
INTEGRATION CIRCUIT
Cu
Cv
Cw
U-PHASE COMMAND VOLTAGE
V-PHASE COMMAND VOLTAGE
W-PHASE COMMAND VOLTAGE
307
COMPARATOR
308
COMPARATOR
309
COMPARATOR UPPER LIMIT VALUE
U-PHASE COMMAND VOLTAGE
V-PHASE COMMAND VOLTAGE
W-PHASE COMMAND VOLTAGE
LOWER LIMIT VALUE
PWM SIGNAL
UPPER U-PHASE
LOWER U-PHASE
UPPER V-PHASE
LOWER V-PHASE
UPPER W-PHASE
LOWER W-PHASE
INTERRUPT SIGNAL
INT 1U
INT 2U
INT 1V
INT 2V
INT 1W
INT 2W
W-PHASE AXIS
V-PHASE AXIS
U-PHASE AXIS
Cu
Cv
Cw
TIME
t1
t2
t3
t4
t5
t6
A
c
B
a
C
b
ONE CYCLE

INVERTER CONTROL APPARATUS AND INVERTER CONTROL METHOD

BACKGROUND OF THE INVENTION

1. Field of the Invention

The present invention relates to an inverter control apparatus and an inverter control method which are useful for controlling, for example, PWM (Pulse Width Modulation) of a three-phase AC motor.

2. Description of the Related Art

FIG. 10 shows a controller of a common three-phase AC motor operating under PWM control. In the drawing, reference symbol B denotes a battery, and power is supplied from this battery B to a motor M by way of a contactor Z and an inverter circuit 100. For instance, the motor M is a three-phase induction motor mounted on a forklift. The contactor Z is formed from a contact point of a magnetic contactor. In the drawing, reference symbol C denotes a capacitor connected between power lines, and ST denotes a shunt for detecting an electric current flowing into the motor M. The shunt ST is formed from a resistor. Reference symbol PG denotes a pulse generator for detecting the revolutions per minute (RPM) of the motor M, and the pulse generator is formed from a known rotary encoder provided on a rotary shaft of the motor M.

The inverter circuit 100 is a circuit for driving the motor M by converting DC power of the battery B into AC power and corresponds to a known circuit constituted of six semiconductor switching elements; namely, an upper U-phase switching element Q1, a lower U-phase switching element Q2, an upper V-phase switching element Q3, a lower V-phase switching element Q4, an upper W-phase switching element Q5, and a lower W-phase switching element Q6. An element capable of operating at high speed; e.g., a MOS FET (field-effect transistor) or an IGBT (insulated gate bipolar transistor), is used as the semiconductor switching element. A diode is connected in parallel with each of the elements. A PWM signal output from a control section 101 is input to gates of the respective semiconductor switching elements Q1 to Q6. The respective semiconductor switching elements Q1 to Q6 are opened and closed during predetermined ON periods and predetermined OFF periods by this PWM signal. Consequently, an output from the inverter circuit 100 is taken out as a three-phase AC voltage, and a U-phase voltage, a V-phase voltage, and a W-phase voltage are supplied to the motor M.

The control section 101 has a CPU, memory, an A/D converter, a carrier signal generation circuit, and a PWM circuit. For example, a command value, such as a motor speed based on actuation of a lever of a forklift, a pulse output from the pulse generator PG, a current value detected by the shunt ST, or a voltage value of the battery B, is input to the control section 101. On the basis of the input values, the control section 101 generates a PWM signal required to control the motor M and outputs the signal to the inverter circuit 100. The motor controller using PWM control is described in, e.g., JP-A-2003-164190.

FIG. 11 is a view showing the configuration of a PWM signal generation section provided in the control section 101. Reference numeral 200 designates a carrier signal generation section for generating a carrier signal Ca; 207 designates a comparator for comparing the carrier signal Ca with the value of the U-phase command; 208 designates a comparator for comparing the carrier signal Ca with the value of a V-phase command; 209 designates a comparator for comparing the carrier signal Ca with the value of the W-phase command; and 210 designates a PWM circuit for generating a PWM signal on the basis of outputs from the comparators 207 to 209. Pulses imparted to the respective gates of the upper U-phase switching element Q1, the lower U-phase switching element Q2, the upper V-phase switching element Q3, the lower V-phase switching element Q4, the upper W-phase switching element Q5, and the lower W-phase switching element Q6 in the inverter circuit 100 shown in FIG. 10 are output as PWM signals from the PWM circuit 210.

FIG. 12 is a view for describing the principle for generating a PWM signal. As illustrated, the carrier signal Ca is a triangular wave having a given frequency, and the command values of respective phases are compared with the amplitude of the carrier signal Ca signal by the comparators 207 to 209. During a period in which the amplitude of the carrier signal Ca is greater than or equal to the command voltage, outputs from the comparators 207 to 209 become "H". During a period in which the amplitude of the carrier signal Ca is less than the command voltage, outputs from the comparators 207 to 209 become "L". Therefore, signals whose pulse widths vary in accordance with a change in the command voltage are obtained from the comparators 207 to 209. The signals are input to the PWM circuit 210, and the PWM circuit 210 generates six types of PWM signals, on the basis of the output from the comparators 207 to 209, for activating the upper and lower switching elements Q1 to Q6 of respective phases, such as those shown in FIG. 12. As can be seen from FIG. 12, during a period in which the amplitude of the carrier signal Ca is greater then or equal to the command voltages of respective phases, the upper switching elements of respective phases are activated, whilst the lower switching elements are deactivated. In contrast, during a period in which the amplitude of the carrier signal Ca is less than the command voltages, the lower switching elements of respective phases are activated, whereas the upper switching elements are deactivated.

Here, when the timing at which one of the pair of upper and lower switching elements of each phase is activated coincides with the timing at which the remaining element of is deactivated, a short circuit is formed from the upper and lower switching elements, whereupon a heavy current flows through the circuit, which may in turn destroy the element. For this reason, in reality, the PWM circuit 210 performs processing for producing a given time difference (dead time) between the activation timing of one of the pair of upper and lower switching elements and the deactivation timing of the other element.

However, in the case of such a method for generating a PWM signal through use of a single carrier signal Ca, when the motor voltage is in the neighborhood of 0 volt; that is, when a duty ratio between the pulses of PWM signals of respective phases is in the vicinity of 50:50, the periods of the dead times Td of respective phases overlap each other in the same position as shown in FIG. 13. During these periods, the inverter circuit 100 becomes inoperative, thereby raising a problem of a failure to output the motor voltage to be output.

As shown in FIG. 14, in order to solve this problem, the following method is proposed in JP-A-2002-27763 to be described later. Under this method, independent carrier signals are used for the respective phases, and command voltages of respective phases are compared with carrier signals of corresponding phases while the phases between the carrier signals are made different from each other by 120°, to thus obtain a PWM signal. In the proposed system, as shown in FIG. 16, carrier signal generation sections 201 to 203 are disposed respectively for the U-phase, V-phase, and W-phase to generate a U-phase carrier Cu, a V-phase carrier Cv, and a W-phase carrier Cw. As shown in FIG. 15, even when the pulse duty ratio between the PWM signals of respective phases is in the neighborhood of 50:50, the periods of the dead times Td of respective phases do not overlap each other in accordance with a difference between the phases of the carrier signals. Even when the motor voltage is in the neighborhood of 0 volt, the inverter circuit 100 operates to thus produce a predetermined voltage.

SUMMARY OF THE INVENTION

FIG. 10 shows the inverter control apparatus of the one-shunt type in which the current flowing through the motor M is detected by the single shunt ST. In such an inverter control apparatus, a feedback control is conducted on the motor M on the basis of the motor current detected by the single shunt ST. In order to control the motor M with high precision, therefore, it is requested to accurately A/D-convert the phase currents detected by the shunt ST. In such conversion, (1) in a period of one cycle of a triangular wave carrier signal, data of the current values of the phases must be sampled as many as possible, (2) in a period of one cycle of a triangular wave carrier signal, the phase currents must be stably detected and the A/D-converting process must be conducted, and (3) in the case of the one-shunt type, the motor currents of the phases are detected in a time-sharing manner by one shunt, and hence the timing of the A/D conversion must be adequately selected with respect to the motor current of each phase.

In the case of (1), in the conventional system in which a single triangular wave carrier signal is used, the amount of data which can be obtained in one cycle of the carrier signal is restricted, and hence the improvement of the accuracy of the A/D conversion is limited. Also in the system such as disclosed in JP-A-2002-27763 in which multi-phase triangular wave carrier signals are used, the amount of data which can be obtained in one cycle of the carrier signal may be reduced depending on the timing of the A/D conversion. However, JP-A-2002-27763 discloses nothing about the problems and method for solving them.

In the cases of (2) and (3), a configuration where an interrupt signal is generated at each of risings of the PWM signals at which the corresponding switching elements are turned ON from the OFF state, and the A/D conversion of the motor current is started at the timing of the interrupt signal will be considered. In this configuration, when a single triangular wave carrier signal is used, the timings of the interrupt signals for the phases are close to one another, and the time period for conducting the A/D conversion is short. Therefore, there is a possibility that the A/D conversion is conducted in an unstable condition where, for example, the switching element is not completely set to the ON state, thereby causing a problem in that the accuracy of the A/D-converted motor current is lowered.

By contrast, when multi-phase triangular wave carrier signals are used, the interval between the interrupt signals can be prolonged because the carrier signals are shifted in phase from one another. As compared with the case of a single triangular wave carrier signal, consequently, there is room for the time period for conducting the A/D conversion. However, the interval between the interrupt signals in one cycle of the carrier signal is not constant, and is varied in accordance with the temporal change of the command voltage value for each phase. Therefore, also the time period which can be consumed for the A/D conversion of the motor current of each phase is not constant, and the time period for the A/D conversion is not uniformly ensured for the motor currents of all the phases. Consequently, a motor current value which is A/D-converted in a period where the interval between the interrupt signals is short has low reliability. When the motor is feedback controlled with using such a motor current value, there is a problem in that the accuracy of the motor control is lowered. JP-A-2003-164190 and JP-A-2002-27763 disclose nothing about the problems and method for solving them.

In the inverter control apparatus such as shown in FIG. 10, when an abnormality such as a short circuit or burning occurs in the switching elements Q1 to Q6 of the inverter circuit 100, a normal current does not flow through the motor M, thereby causing a problem in that the motor control is disabled, or that the motor overheats. As a countermeasure against the above, for example, a method may be employed in which the control section 101 monitors the motor current flowing through the shunt ST, and, when the motor current has an abnormal value, it is judged that a failure occurs in the inverter circuit 100. In this method, although a failure of the inverter circuit 100 may be detected, it is impossible to separately check normality/abnormality of each of the switching elements Q1 to Q6. Therefore, it is impossible to immediately know which switching element becomes abnormal. The method has therefore a drawback that a response to occurrence of abnormality, such as inspection of the elements or replacement of a component requires much trouble.

Therefore, the control section 101 may monitor at predetermined time intervals the motor voltage for each phase output from the inverter circuit 100, so as to separately check normality/abnormality of each of the switching elements Q1 to Q6. In this case, interruption is applied to the CPU of the control section 101 at a predetermined timing, the CPU reads the motor voltages of the phases at this timing, and judges normality/abnormality of each of the switching elements. For example, an interrupt signal is generated at each of risings of the PWM signals which cause the corresponding switching elements to be turned ON from the OFF state, and the switching elements are checked at the timing of the interrupt signal. However, the process of reading the motor voltages and then judging normality/abnormality of each element requires a certain time period. In the above-described case where a single triangular wave carrier signal is used, timings of interrupt signals for the phases are so close to one another that a sufficient time period cannot be spared for the judgment, thereby producing a problem in that the reliability of the judgment is lowered. In an unstable condition where the switching element is not completely set to the ON state, for example, an erroneous judgment may be made.

By contrast, in the case where multi-phase triangular wave carrier signals are used as described above, the interval between the interrupt signals in one cycle of the carrier signals is not constant, and is varied in accordance with the temporal change of the command voltage value for each phase. Therefore, also the time period which can be consumed for judging normality/abnormality of each element is not constant, and the time period for the judgment is not uniformly ensured for all the elements. Consequently, a judgment in a period where the interval between the interrupt signals is short has low reliability, and an erroneous judgment may be made. JP-A-2003-146190 and JP-A-2002-27763 disclose nothing about the problems and method for solving them.

It is an object of the invention to, in the case where multi-phase triangular wave carrier signals are used in an inverter control apparatus of the one-shunt type, enable detected motor currents to be accurately A/D-converted. It is another object of the invention to, in one cycle of a triangular wave carrier signal, enable a motor current of each phase to be accurately A/D-converted.

It is a further object of the invention to stably check normality/abnormality of each switching element, thereby obtaining a highly reliable judgment result.

The inverter control apparatus of the invention is an inverter control apparatus including: an inverter circuit in which series connections of a pair of switching elements are connected in parallel, the series connections being disposed correspondingly with respective phases of a multi-phase alternating current motor, and phase voltages for driving the motor are taken out from junctions of the switching elements in the series connections, respectively; a current detection method, disposed in series with the inverter circuit, for detecting a motor current flowing through the motor; and a control section which outputs PWM signals based on command values for the phases to control ON/OFF operations of the switching elements of the inverter circuit, wherein the control section includes: an A/D converter which A/D-converts the motor current detected by the current detection method; a control method for controlling an operation of the A/D converter; a carrier signal generation section which generates triangular wave carrier signals respectively corresponding to the phases with forming a predetermined phase difference among the carrier signals for the phases; and a signal production method for producing PWM signals respectively for the switching elements on the basis of comparison between the triangular wave carrier signals for the phases output from the carrier signal generation section, and the command values for the phases. The signal production method produces interrupt signals for the control method respectively at timings when the PWM signals cause ON/OFF states of the switching elements to be switched over, and the control method controls the A/D converter to start A/D conversion, based on the interrupt signals.

In the invention, the PWM signals are produced on the basis of the multi-phase triangular wave carrier signals which are shifted in phase from one another, the interrupt signals are generated respectively at timings when the ON/OFF states of the PWM signals for the phases are switched over, and the A/D conversion is started based on the interrupt signals. Therefore, the data amount of the current which is obtained in one cycle of each triangular wave carrier signal can be increased. This is caused because of the following reason. Since the phases of the triangular wave carrier signals are shifted from one another, and the interrupt signals are generated at timings when the ON/OFF states of the PWM signals are switched over, the period from generation of one interrupt signal to that of the next interrupt signal, i.e., the period in which the A/D conversion is conducted can be prolonged. As a result, a larger amount of data of the motor current values of the phases can be sampled in one cycle of the triangular wave carrier signal, so that the accuracy of the A/D conversion is improved and the motor can be accurately controlled. Moreover, the A/D conversion requires a fixed time period, and hence the motor current must be surely detected by the current detection method at least during this time period. Therefore, the signal production method produces the interrupt signals for the control method respectively at rising timings of the PWM signals when the switching elements are switched from the OFF state to the ON state. As a result, immediately after the motor current begins to flow, the A/D converter can start the A/D conversion, and the certainty of the A/D conversion can be enhanced. When the intervals of the interrupt signals are short, a configuration provided with only one A/D converter cannot operate, and a plurality of A/D converters are required. By contrast, in the invention, the intervals of the interrupt signals can be prolonged, and hence even a configuration provided with only one A/D converter can operate.

In an embodiment of the invention, a time period from timing when one interrupt signal is produced to timing when a next interrupt signal is produced is obtained, and, when the time period is equal to or larger than a fixed value, values of motor currents which are A/D-converted during the time period are made effective, and, when the time period is smaller than the fixed value, values of motor currents which are A/D-converted during the time period are made ineffective. When the intervals of the interrupt signals are excessively short, the data which are obtained by A/D conversion during the intervals have low reliability. Only when the time period is equal to or larger than the fixed value, therefore, the values obtained by A/D conversion are made effective, whereby the reliability of the data can be enhanced. In the case where the motor current values are to be made ineffective, the A/D-converting process is conducted, and data obtained by A/D conversion are discarded.

In an embodiment of the invention, a time period from timing when one interrupt signal is produced to timing when a next interrupt signal is produced is obtained, and, when the time period is equal to or larger than a fixed value, the A/D converter is caused to conduct A/D conversion during the time period, and, when the time period is smaller than the fixed value, A/D conversion during the time period is inhibited. In this case, when the time period is obtained by a calculation or the like in advance of A/D conversion, it is not required to wastefully conduct A/D conversion.

In an embodiment of the invention, one of the triangular wave carrier signals is set as a reference triangular wave carrier signal, and the A/D converter is caused to conduct A/D conversion of the motor currents of all the phases which are detected by the current detection method, in one cycle of the reference triangular wave carrier signal. According to the configuration, data can be sampled in the currents of all the phases, and the detection accuracy of the motor current can be improved.

In an embodiment of the invention, the motor is a three-phase alternating current motor, and the control method sets one of the triangular wave carrier signals as a reference triangular wave carrier signal, and controls the A/D converter to conduct A/D conversion of motor currents of at least two phases among the motor currents which are detected by the current detection method, in one cycle of the reference triangular wave carrier signal. In the case of a three-phase motor, six interrupt signals are generated in one cycle of, for example, the reference triangular wave carrier signal. Since the command values for the phases are temporally changed, a situation where generation timings of the six interrupt signals partly overlap with each other may possibly occur. When such a situation occurs, A/D conversion due to the overlapping interrupt signals is disabled. In the invention, phase-shifted triangular wave carrier signals are used, and hence a situation where generation timings of all the interrupt signals overlap with each other never occurs. It is ensured that interrupt signals for at least two phases can be obtained in one cycle of the reference triangular wave carrier signal. When the motor current values for two phases are once detected, the motor current value of the other one phase can be automatically obtained by adding the motor current values of the two phases to each other. In this case, a value which is obtained by inverting the sign of the total of the A/D-converted motor currents of the two phases is used as the current value of the remaining one phase.

In an embodiment of the invention, one of the triangular wave carrier signals is set as a reference triangular wave carrier signal, and, when A/D conversion is conducted plural times on a motor current of the same phase in one cycle of the reference triangular wave carrier signal, an average of the A/D-converted motor currents is obtained, and the average is set as the motor current of the phase in the one cycle. When such an averaging process is conducted, the accuracy of A/D conversion can be further enhanced, and the motor can be controlled more accurately.

In an embodiment of the invention, the carrier signal generation section is disposed in each of the phases, and each of the carrier signal generation sections includes: a counting method; first and second detection methods; and a command method. The counting method counts clock signals, increments or decrements a count value, and outputs a triangular wave carrier signal. The first detection method detects that the count value of the counting method reaches a predetermined upper limit, and the second detection method detects that the count value of the counting method reaches a predetermined lower limit. The command method gives a subtraction command for conducting the decrementing calculation to the counting method, based on a detection output of the first detection method, and gives an addition command for conducting the incrementing calculation to the counting method, based on a detection output of the second detection method. The counting method for one phase outputs a triangular wave carrier signal which has a predetermined phase difference with respect to triangular wave carrier signals output from the counting method of the other phases. When such a carrier signal generation section is used, multi-phase triangular wave carrier signals having a correct waveform and phase difference which correspond to the count value can be easily obtained simply by conducting a digital adding or subtracting calculation with using up/down counters or the like.

The inverter control method of the invention is a control method for the above-described inverter control apparatus wherein triangular wave carrier signals respectively corresponding to the phases are generated with forming a predetermined phase difference among the carrier signals for the phases, the PWM signals are produced on the basis of a comparison between the triangular wave carrier signals and command values for the phases, the interrupt signals are produced at timings when the PWM signals cause ON/OFF states of the switching elements to be switched over, and the A/D conversion of the motor current detected by the current detection method is started on the basis of the interrupt signals.

As described above, the PWM signals are produced on the basis of the multi-phase triangular wave carrier signals which are shifted in phase from one another, the interrupt signals are generated respectively at rising timings of the PWM signals for the phases, and the A/D conversion is started based on the interrupt signals. Therefore, the data amount of the current which is obtained in one cycle of each triangular wave carrier signal can be increased. As a result, the accuracy of the A/D conversion is improved and the motor can be accurately controlled. Moreover, the A/D conversion requires a fixed time period, and hence the motor current must be surely detected by the current detection method at least during this time period. Therefore, the interrupt signals are produced respectively at rising timings of the PWM signals when the switching elements are switched from the OFF state to the ON state. As a result, immediately after the motor current begins to flow, the A/D conversion can be started, and the certainty of the A/D conversion can be enhanced.

According to the invention, in an inverter control apparatus, a large number of data of the motor current values of the phases can be sampled in one cycle of each triangular wave carrier signal. Therefore, the accuracy of the A/D conversion is improved, and the motor can be accurately controlled. Moreover, the intervals of the interrupt signals can be prolonged, and hence even a configuration provided with only one A/D converter can operate.

The inverter control apparatus of the invention is an inverter control apparatus including: an inverter circuit in which series connections of a pair of switching elements are connected in parallel, the series connections being disposed correspondingly with respective phases of a multi-phase alternating current motor, and phase voltages for driving the motor are taken out from junctions of the switching elements in the series connections, respectively; current detection methods, connected in series with the series connections, respectively, for detecting a motor current flowing through the motor for each phase; and a control section which outputs PWM signals based on command values for the phases to control ON/OFF operations of the switching elements of the inverter circuit, wherein the control section includes: an A/D converter which A/D-converts the motor currents of the phases detected respectively by the current detection method; a control method for controlling an operation of the A/D converter; a carrier signal generation section which generates triangular wave carrier signals respectively corresponding to the phases with forming a predetermined phase difference among the carrier signals for the phases; and a signal production method for producing PWM signals respectively for the switching elements on the basis of comparison between the triangular wave carrier signals for the phases output from the carrier signal generation section, and the command values for the phases. The carrier signal generation section produces interrupt signals for the control method respectively at timings of peaks or valleys of the triangular wave carrier signals for the phases, and, on the basis of each of the interrupt signals, the control method controls the A/D converter to start A/D conversion of the motor current of the phase corresponding to the interrupt signal.

In the invention, the current detection method is disposed for each of the phases, and the motor current of each phase is independently detected by the corresponding current detection method. Multi-phase triangular wave carrier signals which are shifted in phase from one another are used as the carrier signals, and the interrupt signals are generated at timings of peaks or valleys of the triangular wave carrier signals for the phases. At the timings of the interrupt signals, A/D conversion of the motor currents of the phases corresponding to the interrupt signals is started. When the triangular wave carrier signals have a constant frequency, therefore, the interrupt signals are generated at fixed time intervals which are determined by the period of the carrier signals, thereby enabling the A/D-converting processes for the phases to be always conducted at given timings. Therefore, a relatively long time period can be ensured for A/D conversion in accordance with the period of the carrier signals. The timings of peaks or valleys of the carrier signals are not timings when the switching elements for the phases are switched from the OFF state to the ON state, but those when a predetermined time period elapses after the elements are turned ON. At the timings, therefore, the motor currents of the phases detected by the current detection method are in a stable state. Therefore, the A/D-converted motor current values are highly reliable. As a result, the motor can be accurately controlled. The A/D conversion requires a certain time period. When the intervals of the interrupt signals are short, a configuration provided with only one A/D converter cannot operate, and a plurality of A/D converters are required. By contrast, in the invention, the intervals of the interrupt signals can be prolonged, and hence even a configuration provided with only one A/D converter can operate.

In an embodiment of the invention, each of the PWM signals is configured by: an ON-period signal which maintains corresponding one of the switching elements to an ON state, and which has a variable time width; and an OFF-period signal which maintains the switching element to an OFF state, and which has a variable time width, and the carrier signal generation section generates each of the interrupt signals at a substantially intermediate timing of the time width of the ON-period signal which maintains one of the switching elements of the series connection for the corresponding phase to an ON state. At the intermediate timing, the motor current flowing through the current detection method and of the phase corresponding to the interrupt signal is in the most stable state. Therefore, the reliability of the A/D-converted motor current is further enhanced.

In an embodiment of the invention, a time width of the ON-period signal which maintains one of the switching elements of the series connection for each of the phases to an ON state is obtained, and, when the time width is equal to or larger than a fixed value, values of motor currents which are A/D-converted on the basis of interrupt signals that are produced during the time period are made effective, and, when the time width is smaller than the fixed value, values of motor currents which are A/D-converted on the basis of interrupt signals that are produced during the time period are made ineffective. When the time period when the switching element maintains the ON state is excessively short, data which are obtained by A/D conversion during the time period have low reliability. Only when the time width is equal to or larger than the fixed value, therefore, the values obtained by A/D conversion are made effective, whereby the reliability of the data can be enhanced. In the case where the motor current values are to be made ineffective, data obtained by A/D conversion are discarded.

In an embodiment of the invention, a time width of the ON-period signal which maintains one of the switching elements of the series connection for each of the phases to an ON state is obtained, and, when the time width is equal to or larger than a fixed value, the A/D converter is caused to conduct A/D conversion based on interrupt signals that are produced during the time period, and, when the time width is smaller than the fixed value, A/D conversion during the time period is inhibited. In this case, when the time width is obtained by a calculation or the like in advance of A/D conversion, it is not required to wastefully conduct A/D conversion.

In an embodiment of the invention, one of the triangular wave carrier signals is set as a reference triangular wave carrier signal, and the A/D converter is caused to conduct A/D conversion of the motor currents of all the phases which are detected by the current detection method in one cycle of the reference triangular wave carrier signal. According to the configuration, data can be sampled in the currents of all the phases, and the detection accuracy of the motor currents can be further improved.

In an embodiment of the invention, the motor is a three-phase alternating current motor, and the control method sets one of the triangular wave carrier signals as a reference triangular wave carrier signal, and controls the A/D converter to conduct A/D conversion of motor currents of at least two phases among the motor currents which are detected respectively by the current detection method in one cycle of the reference triangular wave carrier signal. In one cycle of the carrier signals, a situation where no PWM signal is output for a certain phase may occur because of the temporal change of the command value. When such a situation occurs, A/D conversion of the motor current of the phase is disabled. In the invention, phase-shifted triangular wave carrier signals are used, and hence it is ensured that motor currents of at least two phases can be obtained in one cycle of the reference triangular wave carrier signal. When the motor currents of two phases are once detected, the motor current of the other one phase can be automatically obtained by adding the motor currents of two phases to each other. In this case, a value which is obtained by inverting the sign of the total of the A/D-converted motor currents of the two phases is used as the current of the remaining one phase.

In an embodiment of the invention, the A/D converter receives the motor currents detected by the current detection method, and a detection output of at least one detection method other than the current detection method, and the control method controls the A/D converter to start A/D conversion of the motor currents on the basis of the interrupt signals which are produced at the timings of either peaks or valleys of the triangular wave carrier signals for the phases, and controls the A/D converter to start A/D conversion of the other detection output on the basis of the interrupt signals which are produced at the timings of others of peaks or valleys. According to the configuration, A/D conversion of the motor currents, and that of a detection output other than the motor currents can be conducted with using both timings of peaks and valleys of the triangular wave carrier signals. An example of the detection output other than the motor currents is the voltage of the battery B.

In an embodiment of the invention, the carrier signal generation section is disposed in each of the phases, and each of the carrier signal generation sections includes: a counting method; first and second detection methods; and a command method. The counting method counts clock signals, increments or decrements a count value, and outputs a triangular wave carrier signal. The first detection method detects that the count value of the counting method reaches a predetermined upper limit, and, at timing when the count value reaches the upper limit, produces a first interrupt signal corresponding to a peak of the triangular wave carrier signal. The second detection method detects that the count value of the counting method reaches a predetermined lower limit, and, at timing when the count value reaches the lower limit, produces a second interrupt signal corresponding to a valley of the triangular wave carrier signal. The command method gives the subtraction command for conducting a decrementing calculation to the counting method, based on a detection output of the first detection method, and gives the addition command for conducting an incrementing calculation to the counting method, based on a detection output of the second detection method. The counting method for one phase outputs a triangular wave carrier signal which has a predetermined phase difference with respect to triangular wave carrier signals output from the counting method of the other phases. When such a carrier signal generation section is used, multi-phase triangular wave carrier signals having a correct waveform and phase difference which correspond to the count value can be easily obtained simply by conducting a digital adding or subtracting calculation with using up/down counters or the like, and interrupt signals at peaks and valleys of the triangular wave carrier signals can be easily produced.

The inverter control method of the invention is a control method for the above-described inverter control apparatus wherein triangular wave carrier signals respectively corresponding to the phases are generated with forming a predetermined phase difference among the carrier signals for the phases, the PWM signals are produced on the basis of a comparison between the triangular wave carrier signals and command values for the phases, the interrupt signals are produced at timings of peaks or valleys of the triangular wave carrier signals, and, on the basis of the interrupt signals, the A/D conversion of the motor currents of the phases corresponding to the interrupt signals and detected by the detection method is started. The interrupt signals are generated at timings of peaks or valleys of the multi-phase triangular wave carrier signals, and A/D conversion of the motor currents is started on the basis of the interrupt signals. Therefore, a relatively long time period can be spared for A/D conversion in accordance with the period of the carrier signals, and the motor current of each phase can be A/D-converted in a stable state, so that the accuracy of the A/D conversion is improved and the motor can be accurately controlled.

According to the invention, the interrupt signals for A/D conversion are always generated at given timings, a relatively long time period can be ensured for A/D conversion, and the motor current of each phase can be A/D-converted in a stable state. Therefore, the accuracy of the A/D conversion is improved, and the motor can be accurately controlled. Moreover, the intervals of the interrupt signals can be prolonged, and hence even a configuration provided with only one A/D converter can operate.

The inverter control apparatus of the invention is an inverter control apparatus including: an inverter circuit in which series connections of a pair of switching elements are connected in parallel, the series connections being disposed correspondingly with respective phases of a multi-phase alternating current motor, and phase voltages for driving the motor are taken out from junctions of the switching elements in the series connections, respectively; and a control section which outputs PWM signals based on command values for the phases to control ON/OFF operations of the switching elements of the inverter circuit, wherein the control section includes: a carrier signal generation section which generates triangular wave carrier signals respectively corresponding to the phases with forming a predetermined phase difference among the carrier signals for the phases; a signal production method for producing PWM signals respectively for the switching elements on the basis of comparison between the triangular wave carrier signals for the phases output from the carrier signal generation section, and the command values for the phases; and a judging method for judging normality/abnormality of the switching elements operating on the basis of the PWM signals. The carrier signal generation section produces interrupt signals for the judging method respectively at timings of peaks or valleys of the triangular wave carrier signals for the phases, and, on the basis of each of the interrupt signals, the judging method judges normality/abnormality of the switching elements of the series connection for the phase corresponding to the interrupt signal.

In the invention, multi-phase triangular wave carrier signals which are shifted in phase from one another are used as the carrier signals, and the interrupt signals are generated at timings of peaks or valleys of the triangular wave carrier signals for the phases. On the basis of the interrupt signals, normality/abnormality of the switching elements of the corresponding phases is checked. When the triangular wave carrier signals have a constant frequency, therefore, the interrupt signals are generated at fixed time intervals which are determined by the period of the carrier signals, thereby enabling the check of the elements to be always conducted at given timings. Therefore, a relatively long time period can be ensured for the judgment of normality/abnormality in accordance with the period of the carrier signals. The timings of peaks and valleys of the carrier signals are not timings when the switching elements for the phases are switched from the OFF state to the ON state, but those when a predetermined time period elapses after the elements are turned ON. At the timings, therefore, the elements are in a stable state, and the result of the judgment of normality/abnormality is highly reliable.

In an embodiment of the invention, each of the PWM signals is configured by: an ON-period signal which maintains corresponding one of the switching elements to an ON state, and which has a variable time width; and an OFF-period signal which maintains the switching element to an OFF state, and which has a variable time width, and, on the basis of each of the interrupt signals, the judging method judges whether the time width of the ON-period signal which maintains the switching element for the phase corresponding to the interrupt signal is equal to or larger than a fixed value or not. If the time width is equal to or larger than the fixed value, a voltage of the phase at a junction is read, and normality/abnormality of the switching elements is judged on the basis of the voltage. When the time period when the switching elements maintain the ON state is excessively short, the voltage value which is read during the time period has low reliability, and hence there is a possibility that normality/abnormality of the switching elements is erroneously judged. Only when the time width is equal to or larger than the fixed value, therefore, the voltage is read, and the judgment of normality/abnormality is then conducted, whereby the reliability of the judgment can be further enhanced.

In an embodiment of the invention, the carrier signal generation section produces a peak interrupt signal for the judging method at timings of peaks of the triangular wave carrier signals for the phases, and a valley interrupt signal for the judging method at timings of valleys, and, on the basis of the peak interrupt signal of the interrupt signals, the judging method judges normality/abnormality of one of the switching elements of the series connection for the phase corresponding to the interrupt signal, and, on the basis of the valley interrupt signal, judges normality/abnormality of another one of the switching elements of the series connection for the phase corresponding to the interrupt signal. According to the configuration, normality/abnormality of both of the paired switching elements constituting each series connection can be conducted, and the judgments are conducted at different timings. Therefore, the judgment result is highly reliable.

In an embodiment of the invention, each of the PWM signals is configured by: an ON-period signal which maintains corresponding one of the switching elements to an ON state, and which has a variable time width; and an OFF-period signal which maintains the switching element to an OFF state, and which has a variable time width, and the signal production method produces, for one of the switching elements of the series connection of each of the phases, an ON-period signal having a time width in which an intermediate timing coincides with a peak of the triangular wave carrier signal for the phase, and, for another one of the switching elements, produces an ON-period signal having a time width in which an intermediate timing coincides with a valley of the triangular wave carrier signal for the phase. At the intermediate timing of the time width of the OFF-period signal, and that of the time width of the ON-period signal, the switching elements are in a stable state. When the interrupt signals are produced at peaks or valleys of the triangular wave carrier signals and normality/abnormality of the switching elements is then judged, therefore, the reliability of the judgment result is further enhanced.

In an embodiment of the invention, the judging method sets one of the triangular wave carrier signals as a reference triangular wave carrier signal, and, in one cycle of the reference triangular wave carrier signal, judges normality/abnormality of all the switching elements on the basis of the peak and valley interrupt signals for the phases. According to the configuration, for all the switching elements, normality/abnormality is judged in one cycle, and hence the reliability of the judgment can be further improved.

In an embodiment of the invention, the judging method reads a voltage of the phase at a junction, and a voltage of a battery which is connected to the inverter control apparatus to drive the motor, and compares the voltages with each other to judge normality/abnormality of the switching elements. According to the configuration, normality/abnormality can be judged by a simple process, and a judgment result can be quickly obtained.

In an embodiment of the invention, the carrier signal generation section is disposed in each of the phases, each of the carrier signal generation sections includes: a counting method for counting clock signals, incrementing or decrementing a count value, and outputting a triangular wave carrier signal; a first detection method for detecting that the count value reaches a predetermined upper limit, and, at timing when the count value reaches the upper limit, producing a peak interrupt signal corresponding to a peak of the triangular wave carrier signal; a second detection method for detecting that the count value reaches a predetermined lower limit, and, at timing when the count value reaches the lower limit, producing a valley interrupt signal corresponding to a valley of the triangular wave carrier signal; and a command method for giving a subtraction command for conducting a decrementing calculation to the counting method, based on a detection output of the first detection method, and giving an addition command for conducting an incrementing calculation to the counting method, based on a detection output of the second detection method. The counting method for one phase outputs a triangular wave carrier signal which has a predetermined phase difference with respect to triangular wave carrier signals output from the counting method of the other phases. When such a carrier signal generation section is used, simply by conducting a digital adding or subtracting calculation with using up/down counters or the like, multi-phase triangular wave carrier signals having a correct waveform and phase difference which correspond to the count value can be easily obtained, and the peak and valley interrupt signals can be readily produced.

In an embodiment of the invention, when the judging method judges one of the switching elements abnormal, the control section controls the signal production method to stop production of the PWM signals based on the command values for the phases, thereby stopping the motor. According to the configuration, it is possible to prevent abnormal overheating or the like from occurring in the motor.

The inverter control method of the invention is a control method for an inverter control apparatus including: an inverter circuit in which series connections of a pair of switching elements are connected in parallel, the series connections being disposed correspondingly with respective phases of a multi-phase alternating current motor, and phase voltages for driving the motor are taken out from junctions of the switching elements in the series connections, respectively; and a control section which outputs PWM signals based on command values for the phases to control ON/OFF operations of the switching elements of the inverter circuit, wherein, in the control section, triangular wave carrier signals respectively corresponding to the phases are generated with forming a predetermined phase difference among the carrier signals for the phases, interrupt signals are produced at timings of peaks or valleys of each of the triangular wave carrier signals for the phases, and, on the basis of the interrupt signals, normality/abnormality of the switching elements of the series connection for the phase corresponding to the interrupt signal is judged. As described above, the interrupt signals are generated at peaks or valleys of the multi-phase triangular wave carrier signals, and normality/abnormality of the switching elements is judged on the basis of the interrupt signals. Therefore, a relatively long time period can be spared for the judgment in accordance with the period of the carrier signals, and the judgment is conducted in a state where the elements are stabilized. Therefore, it is possible to obtain a highly reliable judgment result.

In an embodiment of the invention, in the control section, a peak interrupt signal is produced at timings of peaks of the triangular wave carrier signals for the phases, a valley interrupt signal is produced at timings of valleys, and, on the basis of the peak interrupt signal, normality/abnormality of one of the switching elements of the series connection for the phase corresponding to the interrupt signal is judged, and, on the basis of the valley interrupt signal, normality/abnormality of another one of the switching elements of the series connection for the phase corresponding to the interrupt signal is judged. According to the configuration, normality/abnormality of both of the paired switching elements constituting each series connection can be conducted, and the judgments are conducted at different timings. Therefore, the judgment result is highly reliable.

In an embodiment of the invention, when it is judged that one of the switching elements is abnormal, the control section stops an output of the PWM signals based on the command values for the phases, thereby stopping the motor. According to the configuration, it is possible to prevent abnormal overheating or the like from occurring in the motor.

According to the invention, the interrupt signals are always generated at fixed timings, a relatively long time period can be ensured for the judgment of normality/abnormality of the switching elements, and the judgment can be conducted in a state where the elements are stabilized. Therefore, it is possible to obtain a highly reliable judgment result.

BRIEF DESCRIPTION OF THE DRAWING

These and other objects and advantages of this invention will become more fully apparent from the following detailed description taken with the accompanying drawings in which:

FIG. 4 is a table illustrating setting of an initial value of an up/down counter;

FIG. 5 is a time chart showing generation timings of interrupt signals in the first embodiment;

DETAILED DESCRIPTION OF THE PREFERRED EMBODIMENTS

<First Embodiment>

Figure 1:
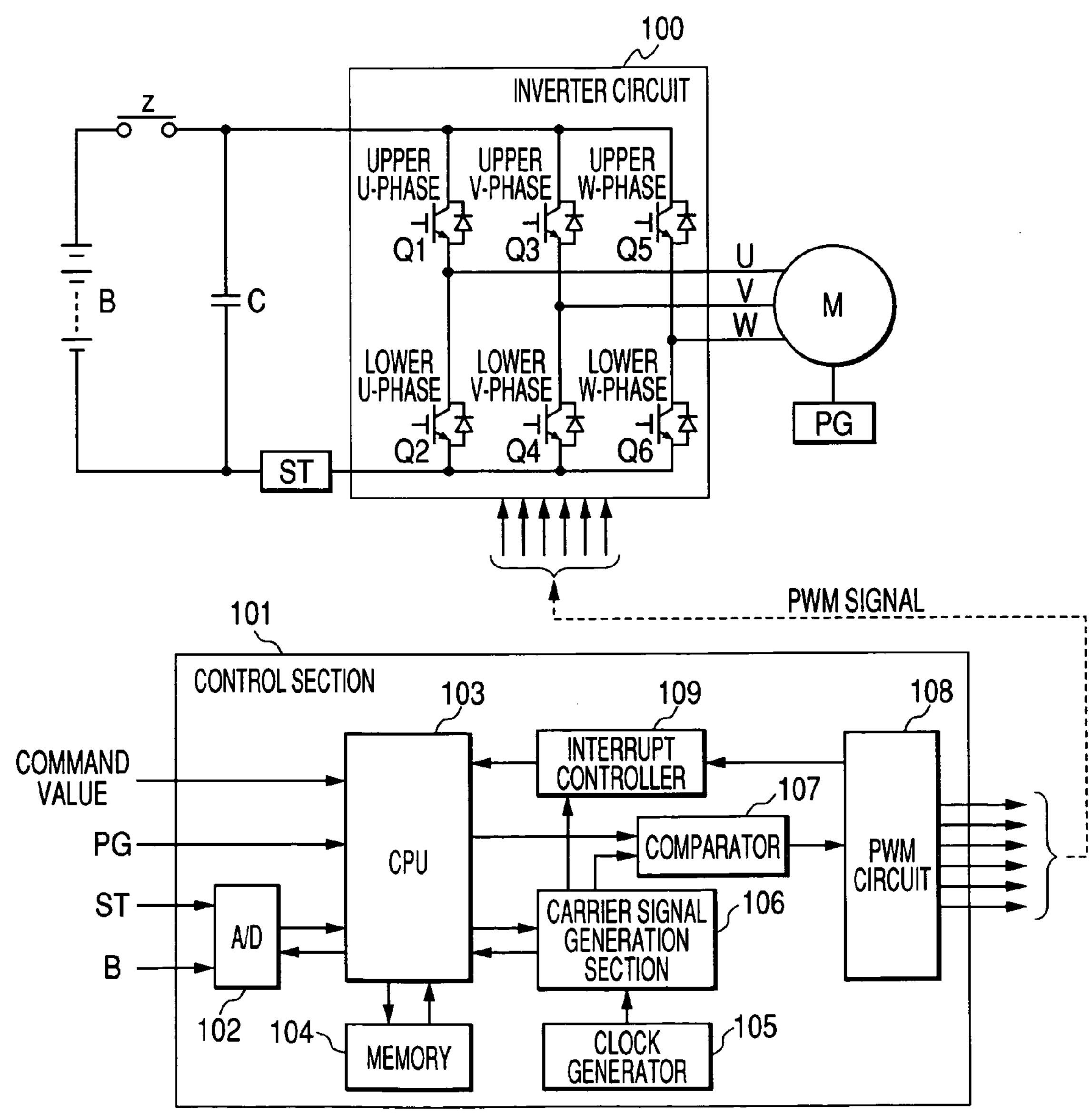
FIG. 1 is a diagram of an inverter control apparatus of a first embodiment of the invention.

FIG. 1 shows an inverter control apparatus of a first embodiment of the invention. In the drawing, B denotes a battery. A power is supplied from the battery B to a motor M via a contactor Z and an inverter circuit 100. The motor M is a three-phase induction motor which is mounted on, for example, a forklift. The contactor Z is configured by contacts of an electromagnetic contactor. In the drawing, C denotes a capacitor which is connected between power lines, ST denotes a shunt which is used for detecting the current flowing through the motor M, which is configured by resistors, and which corresponds to the current detection method in the invention, and PG denotes a pulse generator which is used for detecting the revolution of the motor M, and which is configured by a known rotary encoder disposed on the rotary shaft of the motor M.

Figure 7:
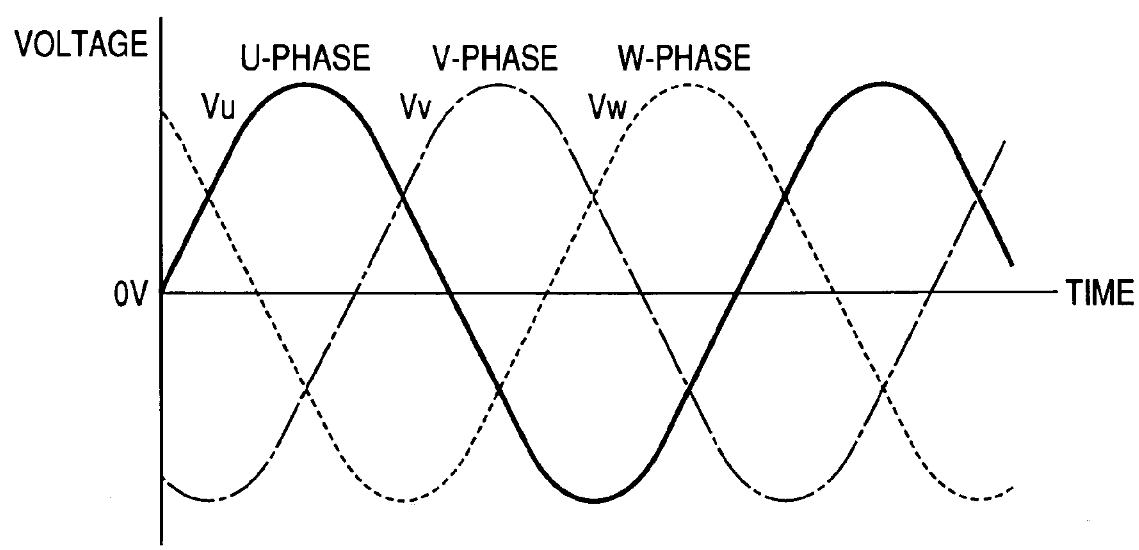
FIG. 7 is a waveform chart of voltages taken out from the inverter circuit.
Figure 10:
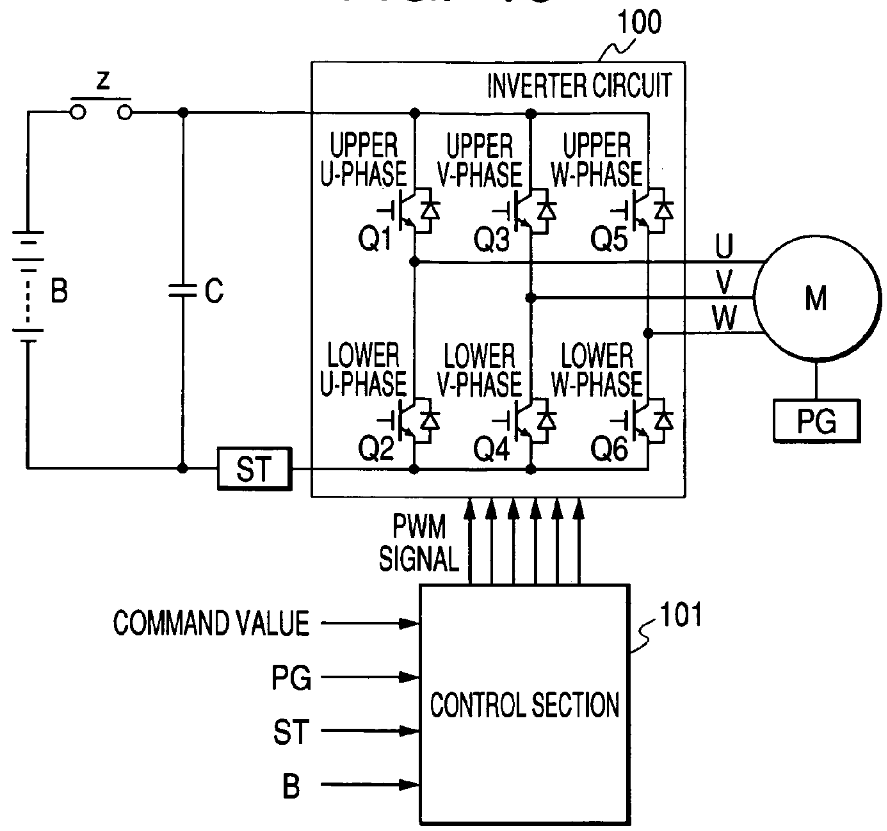
FIG. 10 is a diagram showing a control apparatus for a usual three-phase AC motor.
Figure 11:
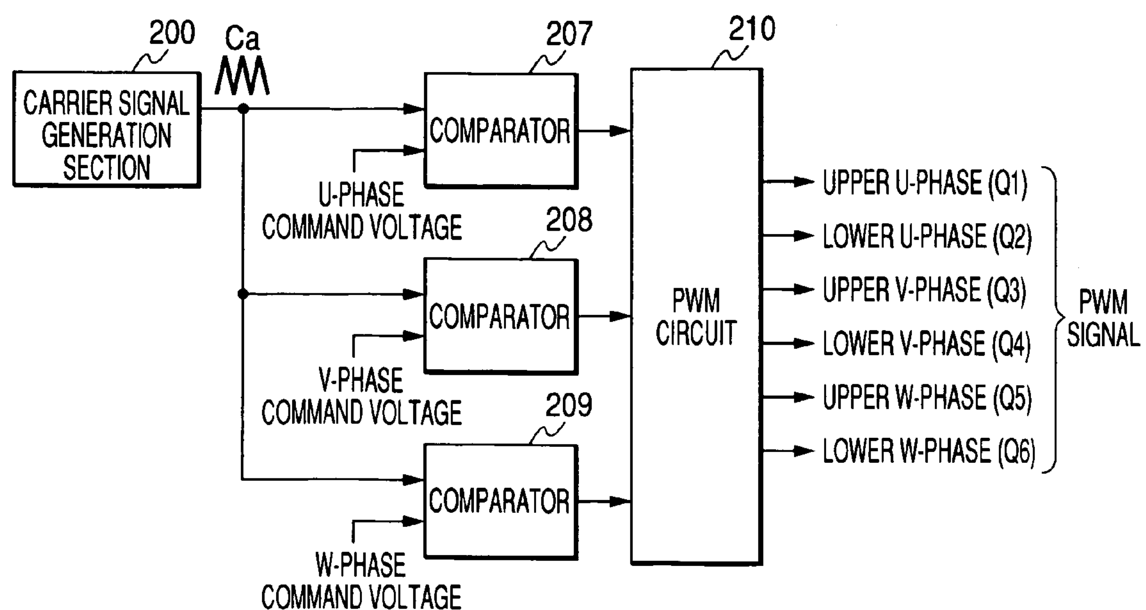
FIG. 11 is a diagram showing the configuration of a PWM signal production section.

The inverter circuit 100 is a known circuit which converts the DC power source of the battery B to an AC power source to drive the motor M, and which is configured by six semiconductor switching elements Q1 to Q6 of U-phase upper, U-phase lower, V-phase upper, V-phase lower, W-phase upper, and W-phase lower. A series connection of the switching elements Q1, Q2 corresponding to the U-phase, that of the switching elements Q3, Q4 corresponding to the V-phase, and that of the switching elements Q5, Q6 corresponding to the W-phase are connected in parallel between the power lines. Phase voltages for driving the motor M are taken out from junctions of the switching elements in the series connections, respectively. Switching elements which can conduct a high-speed switching operation, such as MOS FET (Field Effect Transistors) or IGBT (Insulated Gate Bipolar Transistors) are used as the semiconductor switching elements Q1 to Q6. A diode is connected in parallel with each of the elements. PWM signals are supplied from a control section 101 to gates of the semiconductor switching elements Q1 to Q6, respectively. In accordance with the PWM signals, the semiconductor switching elements Q1 to Q6 conduct opening/closing operations for predetermined ON and OFF time periods. As a result, the output of the inverter circuit 100 is taken out as a three-phase AC power, so that U-phase voltage, V-phase voltage, and W-phase voltage such as shown in FIG. 7 are supplied to the motor M. The phase currents flowing through the motor M are shifted in phase by a predetermined degree with respect to the phase voltages in FIG. 7, respectively. The above configuration is identical with that shown in FIG. 10.

The control section 101 includes an A/D converter 102, a CPU 103, a memory 104, a clock generator 105, a carrier signal generation section 106, a comparator 107, a PWM circuit 108, and an interrupt controller 109. The CPU 103 corresponds to the control method in the invention, and the comparator 107 and the PWM circuit 108 correspond to the signal production method in the invention.

To the CPU 103, for example, input are command values such as a motor speed based on a lever operation on the forklift, pulses output from the pulse generator PG, the current value detected by the shunt ST, and the voltage value of the battery B. The current value of the shunt ST and the voltage value of the battery B are converted to digital values by the A/D converter 102, and the digital values are supplied to the CPU 103. On the basis of these input values, the CPU 103 implements processes required for controlling the motor M. The memory 104 is configured by a RAM and a ROM. The CPU 103 reads out various information required for implementing the processes, from the memory 104, and writes information into the memory 104.

The clock generator 105 produces a clock signal of a predetermined frequency with using an incorporated oscillating circuit, and supplies the clock signal to the carrier signal generation section 106. At the same time when the apparatus is powered on, the clock generator 105 starts to operate without receiving a signal from the CPU 103. The carrier signal generation section 106 counts clock signals supplied from the clock generator 105, and generates triangular wave carrier signals respectively for the phases, on the basis of the count value. The carrier signal generation section 106 is configured by three carrier signal generation sections, or a U-phase carrier signal generation section 10, a V-phase carrier signal generation section 20, and a W-phase carrier signal generation section 30. The comparator 107 compares the command voltages for the phases supplied from the CPU 103 with the triangular wave carrier signals for the phases supplied from the carrier signal generation section 106, and outputs a result of the comparison in the form of a pulse. The comparator 107 is configured by three comparators 16, 26, 36 respectively for the phases shown in FIG. 2.

Based on the output of the comparator 107, the PWM circuit 108 outputs six kinds of pulses which have ON/OFF periods corresponding to the changes of the command voltage values of the phases, as PWM signals respectively for the switching elements. The PWM signals are supplied to gates of the switching elements Q1 to Q6 of U-phase upper, U-phase lower, V-phase upper, V-phase lower, W-phase upper, and W-phase lower in the inverter circuit 100, respectively. In accordance with the PWM signals, the switching elements Q1 to Q6 conduct ON/OFF operations to enable the inverter circuit 100 to output the U-phase, V-phase, and W-phase voltages. The voltages are applied to the motor M. In the embodiment, the PWM circuit 108 produces interrupt signals at rising timings of the PWM signals, and sends the interrupt signals to the interrupt controller 109.

Upon reception of the interrupt signals from the PWM circuit 108, the interrupt controller 109 applies interruption to the CPU 103. At the timing when the interruption is applied, the CPU 103 gives a command for A/D conversion to the A/D converter 102. At the timings of the interrupt signals, therefore, the A/D converter 102 starts A/D conversion of the motor current detected by the shunt ST. Also interrupt signals produced by the carrier signal generation section 106 are supplied to the interrupt controller 109. The interrupt signals are generated at peaks and valleys of the triangular wave carrier signals, and used in, for example, fault diagnosis of the switching elements Q1 to Q6.

Figure 2:
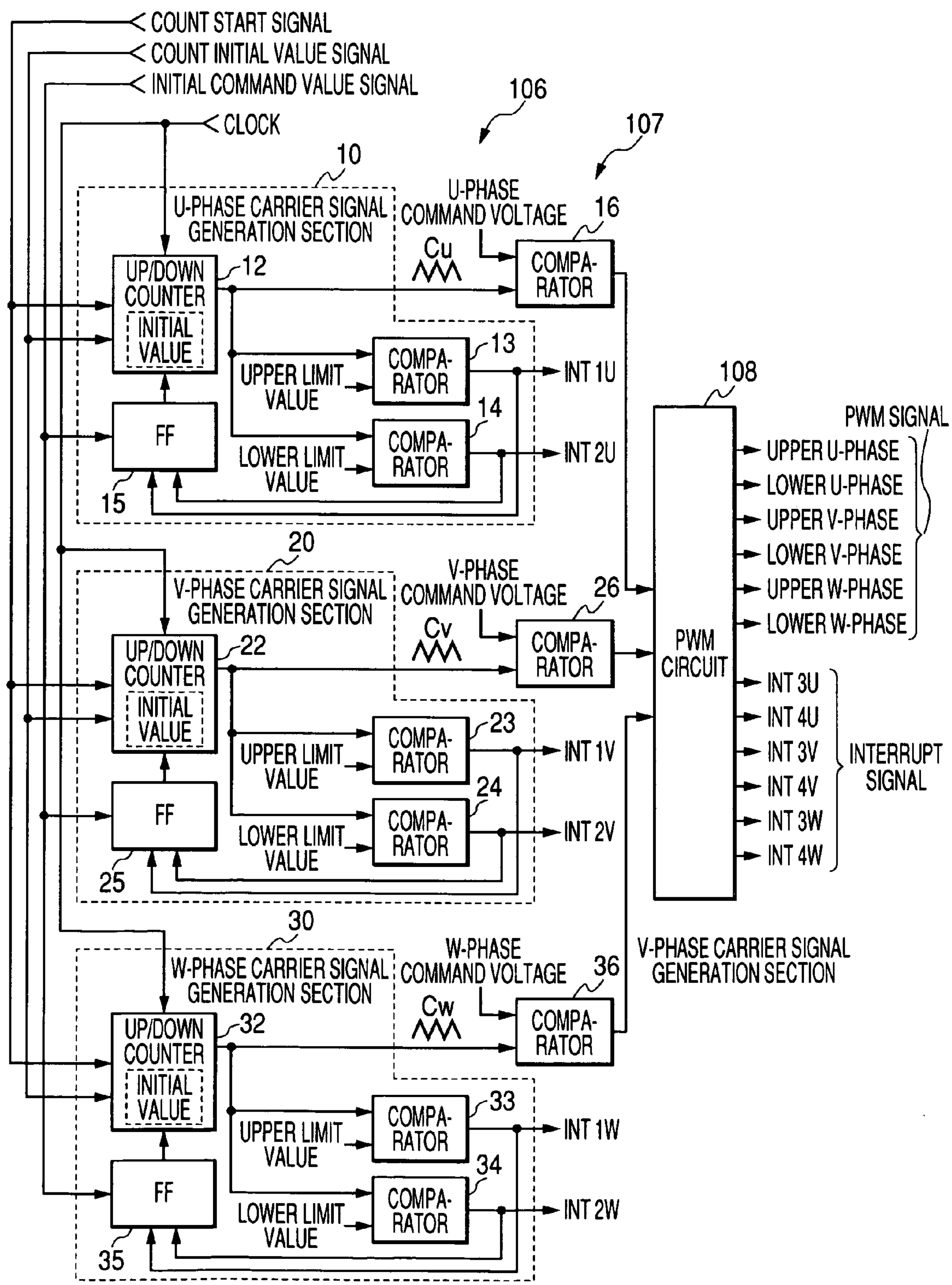
FIG. 2 is a detailed diagram of a carrier signal generation section and a comparator.

FIG. 2 is a detailed diagram of the carrier signal generation section 106 and the comparator 107 in FIG. 1. As described above, the carrier signal generation section 106 is configured by the U-phase carrier signal generation section 10, the V-phase carrier signal generation section 20, and the W-phase carrier signal generation section 30. The U-phase carrier signal generation section 10 generates a U-phase carrier signal Cu which is a reference triangular wave carrier signal. The V-phase carrier signal generation section 20 generates a V-phase carrier signal Cv which is shifted in phase by 120° from the U-phase carrier signal Cu. The W-phase carrier signal generation section 30 generates a W-phase carrier signal Cw which is shifted in phase by 120° from the V-phase carrier signal Cv. The method of generating the carrier signals for the phases will be described later in detail.

The comparator 107 is configured by comparators 16, 26, 36 which are disposed respectively for the phases. The comparator 16 compares the value of a U-phase command voltage supplied from the CPU 103 with the U-phase carrier signal Cu, and, in a period where the amplitude of the amplitude of the U-phase carrier signal Cu is equal to or larger than the U-phase command voltage value, outputs "H" signal, and, in a period where the amplitude of the U-phase carrier signal Cu is smaller than the U-phase command voltage value, outputs "L" signal. The comparator 26 compares the value of a V-phase command voltage supplied from the CPU 103 with the amplitude of the V-phase carrier signal Cv, and, in a period where the amplitude of the V-phase carrier signal Cv is equal to or larger than the V-phase command voltage value, outputs "H" signal, and, in a period where the amplitude of the V-phase carrier signal Cv is smaller than the V-phase command voltage value, outputs "L" signal. The comparator 36 compares the value of a W-phase command voltage supplied from the CPU 103 with the amplitude of the W-phase carrier signal Cw, and, in a period where the amplitude of the W-phase carrier signal Cw is equal to or larger than the W-phase command voltage value, outputs "H" signal, and, in a period where the amplitude of the W-phase carrier signal Cw is smaller than the W-phase command voltage value, outputs "L" signal.

In the U-phase carrier signal generation section 10, 12 denotes up/down counter which receives the clock signal output from the clock generator 105 of FIG. 1, and a count start signal and a count initial value signal that are sent from the CPU 103. The initial value of the up/down counter 12 is set by the count initial value signal sent from the CPU 103, and the clock signals are counted with starting from the initial value. When the count start signal is supplied from the CPU 103, the counting of the clock signals is started to increment (add 1 each time when a clock signal is input) or decrement (subtract 1 each time when a clock signal is input) the count value, thereby outputting the U-phase carrier signal Cu which is a triangular wave carrier signal. In the up/down counter 12, the initial value of the counting is previously set. The initial value is set by the count initial value signal supplied from the CPU 103. The reference numeral 13 denotes a comparator which compares the count value of the up/down counter 12 with a predetermined upper limit, and which, when it is detected that the count value reaches the upper limit, outputs a detection signal. The reference numeral 14 denotes a comparator which compares the count value of the up/down counter 12 with a predetermined lower limit, and which, when it is detected that the count value reaches the lower limit, outputs a detection signal. The reference numeral 15 denotes a flip-flop which, in response to the output from the comparator 13, outputs "L" signal to the up/down counter 12, and which, in response to the output from the comparator 14, outputs "H" signal to the up/down counter 12. In response to "H" signal from the flip-flop 15, the up/down counter 12 increments the count value of the clock signals, and, in response to "L" signal, decrements the count value of the clock signals. Therefore, "H" signal from the flip-flop 15 serves as the addition command for conducting incrementation, and "L" signal serves as the subtraction command for conducting decrementation. An initial command value signal is given from the CPU 103 to the flip-flop 15. The initial state of the flip-flop 15 is set to "H" or "L" in accordance with the initial command value signal.

In the V-phase carrier signal generation section 20, 22 denotes up/down counter which receives the clock signal output from the clock generator 105 of FIG. 1, and the count start signal and the count initial value signal that are sent from the CPU 103. When the count start signal is supplied from the CPU 103, the up/down counter 22 starts the counting of the clock signals to increment or decrement the count value, thereby outputting the V-phase carrier signal Cv which is a triangular wave carrier signal. The initial value of the up/down counter 22 is set by the count initial value signal supplied from the CPU 103, and the clock signals are counted with starting from the initial value. The initial value of the counting is previously set. The initial value is set by the count initial value signal supplied from the CPU 103. The reference numeral 23 denotes a comparator which compares the count value of the up/down counter 22 with a predetermined upper limit, and which, when it is detected that the count value reaches the upper limit, outputs a detection signal. The reference numeral 24 denotes a comparator which compares the count value of the up/down counter 22 with a predetermined lower limit, and which, when it is detected that the count value reaches the lower limit, outputs a detection signal. The reference numeral 25 denotes a flip-flop which, in response to the output from the comparator 23, outputs “L” signal to the up/down counter 22, and which, in response to the output from the comparator 24, outputs “H” signal to the up/down counter 22. In response to “H” signal from the flip-flop 25, the up/down counter 22 increments the count value of the clock signals, and, in response to “L” signal, decrements the count value of the clock signals. Therefore, “H” signal from the flip-flop 25 serves as the addition command for conducting incrementation, and “L” signal serves as the subtraction command for conducting decrementation. The initial command value signal is given from the CPU 103 to the flip-flop 25. The initial state of the flip-flop 25 is set to “H” or “L” in accordance with the initial command value signal.

In the W-phase carrier signal generation section 30, 32 denotes up/down counter which receives the clock signal output from the clock generator 105 of FIG. 1, and the count start signal and the count initial value signal that are sent from the CPU 103. When the count start signal is supplied from the CPU 103, the up/down counter 32 starts the counting of the clock signals to increment or decrement the count value, thereby outputting the W-phase carrier signal Cw which is a triangular wave carrier signal. The initial value of the up/down counter 32 is set by the count initial value signal supplied from the CPU 103, and the clock signals are counted with starting from the initial value. The initial value of the counting is previously set. The initial value is set by the count initial value signal supplied from the CPU 103. The reference numeral 33 denotes a comparator which compares the count value of the up/down counter 32 with a predetermined upper limit, and which, when it is detected that the count value reaches the upper limit, outputs a detection signal. The reference numeral 34 denotes a comparator which compares the count value of the up/down counter 32 with a predetermined lower limit, and which, when it is detected that the count value reaches the lower limit, outputs a detection signal. The reference numeral 35 denotes a flip-flop which, in response to the output from the comparator 33, outputs “L” signal to the up/down counter 32, and which, in response to the output from the comparator 34, outputs “H” signal to the up/down counter 32. In response to “H” signal from the flip-flop 35, the up/down counter 32 increments the count value of the clock signals, and, in response to “L” signal, decrements the count value of the clock signals. Therefore, “H” signal from the flip-flop 35 serves as the addition command for conducting incrementation, and “L” signal serves as the subtraction command for conducting decrementation. The initial command value signal is given from the CPU 103 to the flip-flop 35. The initial state of the flip-flop 35 is set to “H” or “L” in accordance with the initial command value signal.

The count start signal is simultaneously given to the up/down counters 12, 22, 32 for the respective phases. In response to the input of the count start signal, the up/down counters simultaneously start the counting operation with starting from the respective initial values. The detection outputs of the comparators 13, 23, 33 for the phases, i.e., the signals indicating that the respective count values reach the upper limit are given to the flip-flops 15, 25, 35 as described above, and at the same time output as interrupt signals INT1U, INT1V, INT1W, respectively. The interrupt signals serve as peak interrupt signals at peaks of the triangular wave carrier signals for the phases. The detection outputs of the comparators 14, 24, 34 for the phases, i.e., the signals indicating that the respective count values reach the lower limit are given to the flip-flops 15, 25, 35 as described above, and at the same time output as interrupt signals INT2U, INT2V, INT2W, respectively. The interrupt signals serve as valley interrupt signals at valleys of the triangular wave carrier signals for the phases as described later. In the embodiment, the interrupt signals are output from the carrier signal generation sections 10, 20, 30 for the phases. Alternatively, the interrupt signals may be output only from the carrier signal generation sections for one or two of the phases.

In the above-described carrier signal generating apparatus, the clock generator 105 corresponds to the clock generation method in the invention, the up/down counters 12, 22, 32 correspond to the counting method in the invention, the comparators 13, 23, 33 correspond to the first detection method in the invention, the comparators 14, 24, 34 correspond to the second detection method in the invention, and the flip-flops 15, 25, 35 correspond to the command method in the invention.

Figure 3A:
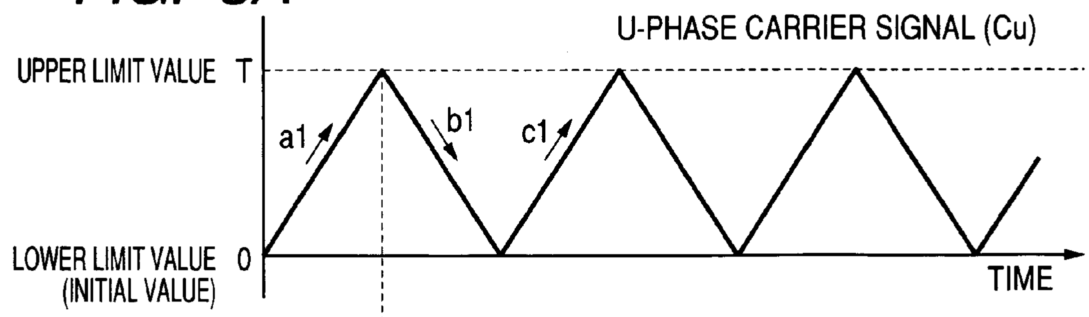
FIGS. 3A–3D are views illustrating the principle of production of triangular wave carrier signals for phases.

Next, the principle of the production of the triangular wave carrier signals for the phases will be described with reference to FIGS. 2 and 3. Referring to FIG. 2, when the count start signal is supplied from the CPU 103 to the up/down counter 12 of the U-phase carrier signal generation section 10, the up/down counter 12 starts the counting of the clock signals supplied from the clock generator 105. As described above, the initial value is set in the up/down counter 12. The initial value is set to 0. Therefore, the up/down counter 12 conducts the counting operation with starting from 0. The output of the flip-flop 15 which commands the up/down counter 12 to conduct incrementation or decrementation is set to “H” in the initial state. Therefore, the up/down counter 12 starts the counting operation to start incrementation of the count value. As a result, as shown in FIG. 3A, the output of the up/down counter 12 is increased with time from 0 which is a lower limit (initial value) toward an upper limit T as indicated by the arrow a1. When the count value reaches the upper limit T, the comparator 13 detects this, and supplies the detection output to the flip-flop 15. The state of the flip-flop 15 is inverted by the detection signal, and the flip-flop outputs “L”. Therefore, the operation of the up/down counter 12 is changed from incrementation to decrementation, and the output is decreased with time from the upper limit T toward the lower limit 0 as indicated by the arrow b1 in FIG. 3A. When the count value reaches the lower limit 0, the comparator 14 detects this, and supplies the detection output to the flip-flop 15. The state of the flip-flop 15 is inverted by the detection signal, and the flip-flop outputs “H”. Therefore, the operation of the up/down counter 12 is changed to incrementation, and the output is increased with time from the lower limit 0 toward the upper limit T as indicated by the arrow c1. When the incrementing and decrementing operations are repeated, the up/down counter 12 outputs the U-phase carrier signal Cu having a triangular waveform shown in FIG. 3A. In the embodiment, the U-phase carrier signal Cu is used as the reference triangular wave carrier signal.

Figure 3B:
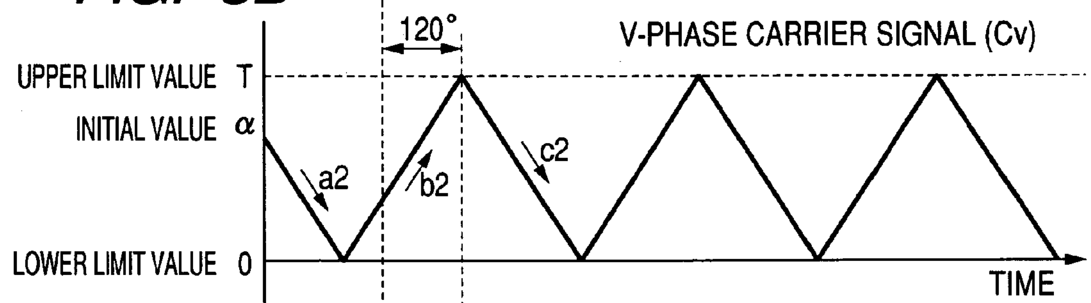

The count start signal from the CPU 103 is simultaneously supplied also to the up/down counter 22 of the V-phase carrier signal generation section 20. When the count start signal is supplied, the up/down counter 22 starts the counting of the clock signals supplied from the clock generator 105. As described above, the initial value is set in the up/down counter 22. The initial value is set to a value $\alpha$ which is not 0. Therefore, the up/down counter 22 conducts the counting operation with starting from $\alpha$. The output of the flip-flop 25 which commands the up/down counter 22 to conduct incrementation or decrementation is set to “L” in the initial state. Therefore, the up/down counter 22 starts the counting operation to start decrementation of the count value. As a result, as shown in FIG. 3B, the output of the up/down counter 22 is decreased with time from the initial value α toward the lower limit 0 as indicated by the arrow a2. When the count value reaches the lower limit 0, the comparator 24 detects this, and supplies the detection output to the flip-flop 25. The state of the flip-flop 25 is inverted by the detection signal, and the flip-flop outputs "H". Therefore, the operation of the up/down counter 22 is changed from decrementation to incrementation, and the output is increased with time from the lower limit 0 toward the upper limit T as indicated by the arrow b2 in FIG. 3B. When the count value reaches the upper limit T, the comparator 23 detects this, and supplies the detection output to the flip-flop 25. The state of the flip-flop 25 is inverted by the detection signal, and the flip-flop outputs "L". Therefore, the operation of the up/down counter 22 is changed to decrementation, and the output is decreased with time from the upper limit T toward the lower limit 0 as indicated by the arrow c2. When the incrementing and decrementing operations are repeated, the up/down counter 22 outputs the V-phase carrier signal Cv having a triangular waveform shown in FIG. 3B.

Figure 3C:
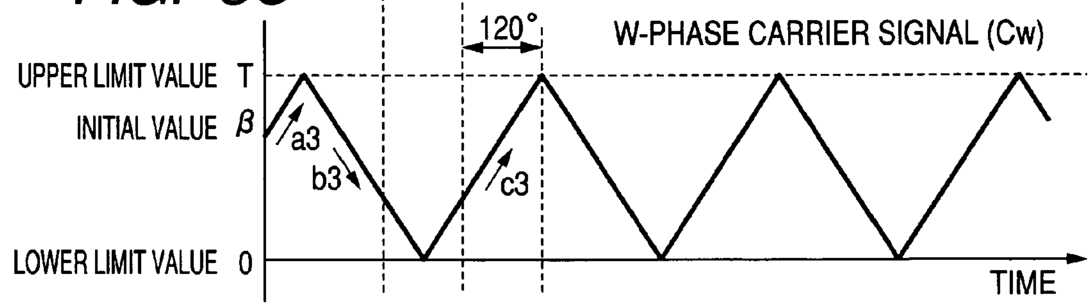
Figure 3D:
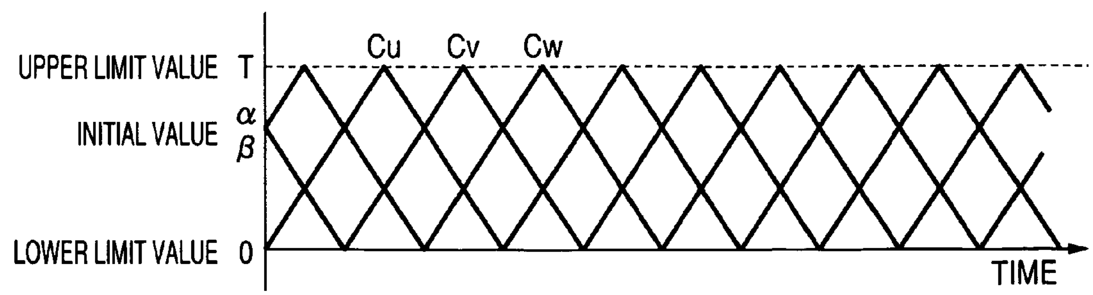

The count start signal from the CPU 103 is simultaneously supplied also to the up/down counter 32 of the W-phase carrier signal generation section 30. When the count start signal is supplied, the up/down counter 32 starts the counting of the clock signals supplied from the clock generator 105. As described above, the initial value is set in the up/down counter 32. The initial value is set to a value β which is not 0. Therefore, the up/down counter 32 conducts the counting operation with starting from β. In the embodiment, the value of β is equal to that of α. The output of the flip-flop 35 which commands the up/down counter 32 to conduct incrementation or decrementation is set to "H" in the initial state. Therefore, the up/down counter 32 starts the counting operation to start incrementation of the count value. As a result, as shown in FIG. 3C, the output of the up/down counter 32 is increased with time from the initial value β toward the upper limit T as indicated by the arrow a3. When the count value reaches the upper limit T, the comparator 33 detects this, and supplies the detection output to the flip-flop 35. The state of the flip-flop 35 is inverted by the detection signal, and the flip-flop outputs "L". Therefore, the operation of the up/down counter 32 is changed from incrementation to decrementation, and the output is decreased with time from the upper limit T toward the lower limit 0 as indicated by the arrow b3 in FIG. 3C. When the count value reaches the lower limit 0, the comparator 34 detects this, and supplies the detection output to the flip-flop 35. The state of the flip-flop 35 is inverted by the detection signal, and the flip-flop outputs "H". Therefore, the operation of the up/down counter 32 is changed to incrementation, and the output is increased from the lower limit 0 toward the upper limit T as indicated by the arrow c3. When the incrementing and decrementing operations are repeated, the up/down counter 32 outputs the W-phase carrier signal Cw having a triangular waveform shown in FIG. 3C.

In FIG. 3, the V-phase carrier signal Cv has a phase difference of 120° in the lagging direction with respect to the U-phase carrier signal Cu which is the reference triangular wave carrier signal, and the W-phase carrier signal Cw has a phase difference of 120° in the lagging direction with respect to the V-phase carrier signal Cv. Therefore, the W-phase carrier signal Cw has a phase difference of 240° in the lagging direction with respect to the U-phase carrier signal Cu which is the reference triangular wave carrier signal. Consequently, the U-phase carrier signal Cu, the V-phase carrier signal Cv, and the W-phase carrier signal Cw constitute triangular waves which are shifted in phase by 120° from one another. FIG. 3D is a view in which the carrier signals Cu, Cv, Cw for the phases are overlappingly drawn.

FIG. 4 is a table showing an example of the manner of setting the initial values of the up/down counters and the initial command values of the flip-flops in the case where a predetermined phase difference (phase difference in the lagging direction) is to be produced with respect to the reference triangular wave carrier signal. In the table, it is assumed that the up/down counters for the phases have the same upper limit (T), and the same lower limit (0). The table shows relationships among the phase difference, the ratio of the initial value to the upper limit, and the initial command value in the case where the initial value of the reference triangular wave carrier signal is 0 and the initial command value is "H". In the range of the phase difference of 0° to 180°, the ratio m of the initial value to the upper limit in the up/down counters is obtained by:

$$m=\text{phase difference}/180°.$$

In the range of the phase difference of 180° to 360°, the ratio n of the initial value to the upper limit in the up/down counters is obtained by:

$$n=2-[\text{phase difference}/180°].$$

The case where, as shown in FIG. 3, the three-phase triangular wave carrier signals are to be generated with forming uniform phase differences (120°) will be considered. For the U-phase carrier signal Cu which serves as the reference, the phase difference is 0°, and hence the initial value is set to 0 according to FIG. 4. At this time, the initial command value of the flip-flop is "H" (addition command). For the V-phase carrier signal Cv which has a phase difference of 120° with respect to the U-phase carrier signal Cu, the initial value α is set to ⅔ of the upper limit T according to FIG. 4. At this time, the initial command value of the flip-flop is "L" (subtraction command). For the W-phase carrier signal Cw which has a phase difference of 240° with respect to the U-phase carrier signal Cu, the initial value β is set to ⅔ of the upper limit T according to FIG. 4. At this time, the initial command value of the flip-flop is "H" (addition command).

When the above is summarized, the conditions for producing the U-phase carrier signal Cu serving as the reference, the V-phase carrier signal Cv which lags in phase by 120° with respect to the U-phase carrier signal, and the W-phase carrier signal Cw which lags in phase by 240° with respect to the U-phase carrier signal are as follows:

(1) U-phase carrier signal Cu (reference triangular wave carrier signal)

Initial value of up/down counter=0

Initial command value of flip-flop="H"

(2) V-phase carrier signal Cv

Initial value of up/down counter α=2T/3

Initial command value of flip-flop="L"

(3) W-phase carrier signal Cw

Initial value of up/down counter β=2T/3

Initial command value of flip-flop="H"

When the thus configured carrier signal generating apparatus is used, triangular wave carrier signals having a correct waveform and phase difference which correspond to the count value can be easily obtained simply by conducting digital adding and subtracting calculations with using the up/down counters. When the initial values of the phases are adequately set, the phase differences of the carrier signals Cu, Cv, Cw respectively output from the up/down counters 12, 22, 32 can be arbitrarily set. As a result, triangular wave carrier signals which are required in a PWM control of a three-phase motor, and which are shifted in phase from one another by 120° can be obtained easily and accurately.

In the above, the three-phase carrier signal generator which generates the U-phase, V-phase, and W-phase carrier signals has been exemplarily described. In the invention, the phase number is not restricted to three. When carrier signal generation sections the number of which is equal to the phase number are disposed, carrier signals corresponding to an arbitrary phase number such as two phases, four phases, five phases, or six phases can be generated by adequately setting the initial values of up/down counters and the initial command values of flip-flops in the sections. As seen also from FIG. 4, in the invention, when the initial values of up/down counters are adequately set, carrier signals can have an arbitrary phase difference. In the above example, the phase differences are uniform. Alternatively, the phase differences among the carrier signals may be made not uniform.

In the embodiment, the reference triangular wave carrier signal (U-phase carrier signal Cu) is generated at a valley (lower limit). Alternatively, the reference triangular wave carrier signal may be generated at a peak (upper limit). In the alternative, the initial value of the reference triangular wave carrier signal is T (upper limit), the initial command value is "L", and the phase is shifted by 180° with respect to a carrier signal which is generated at a valley. When the other phases are to be set with using FIG. 4, therefore, the contents of the table are read with setting the phase difference of 180° as the reference. When the phase difference with respect to the reference triangular wave carrier signal is set to 90° (larger than 0° and equal to or smaller than 180°), for example, the initial value of T/2 and the initial command value of "H" in the case of the phase difference of 270° (=180°+90°) are set. When the phase difference is set to 270° (larger than 180° and equal to or smaller than 360°), the initial value of T/2 and the initial command value of "L" in the case of the phase difference of 90° (=180°+270°−360°) are set.

Figure 12:
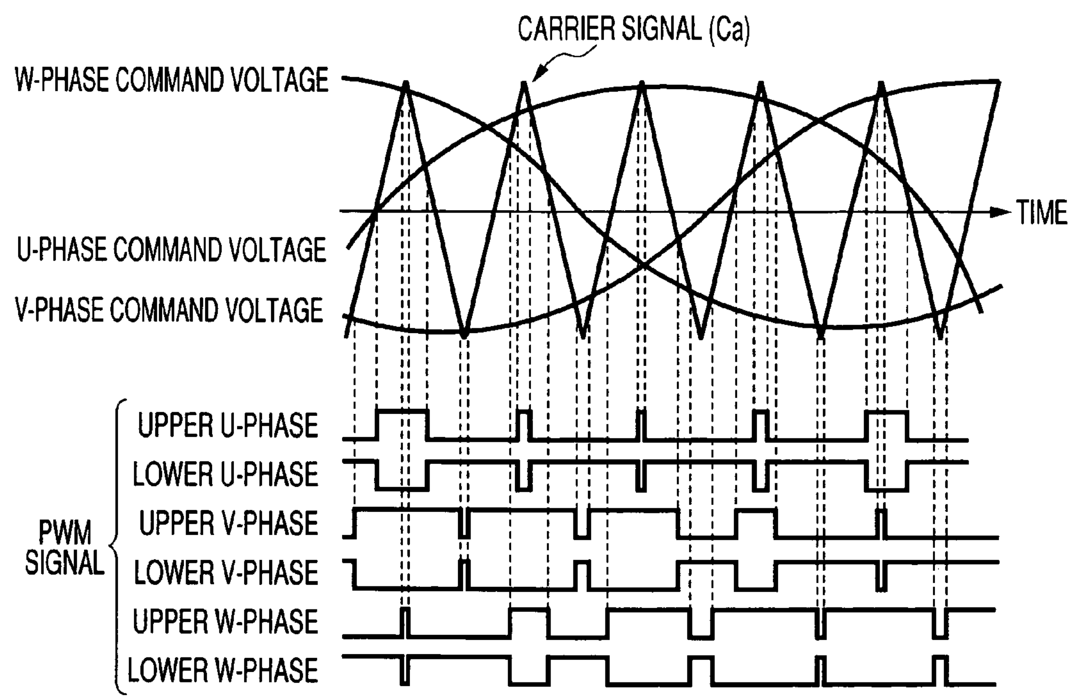
FIG. 12 is a view illustrating the principle of production of PWM signals.
Figure 13:
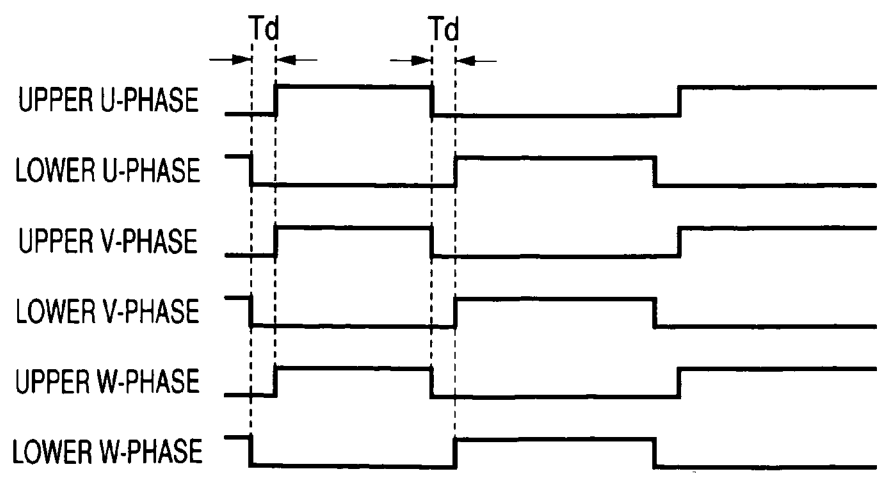
FIG. 13 is a view illustrating overlapping of dead time periods.

The triangular wave carrier signals Cu, Cv, Cw which are produced by the up/down counters 12, 22, 32 as described above are given to the comparators 16, 26, 36, respectively. In the comparator 16, the U-phase command voltage is compared with the U-phase carrier signal Cu. In the comparator 26, the V-phase command voltage is compared with the V-phase carrier signal Cv. In the comparator 36, the W-phase command voltage is compared with the W-phase carrier signal Cw. The outputs of the comparators 16, 26, 36 are supplied to the PWM circuit 108. On the basis of the results of the comparisons between the carrier signals and the command voltages in the comparators 16, 26, 36, the PWM circuit 108 produces the six kinds of PWM signals respectively corresponding to the switching elements Q1 to Q6 in the manner which has been described with reference to FIGS. 12 and 14, and, in the embodiment, produces interrupt signals INT3U to INT4W at rising timings of the PWM signals at which the switching elements are turned ON from the OFF state.

Figure 14:
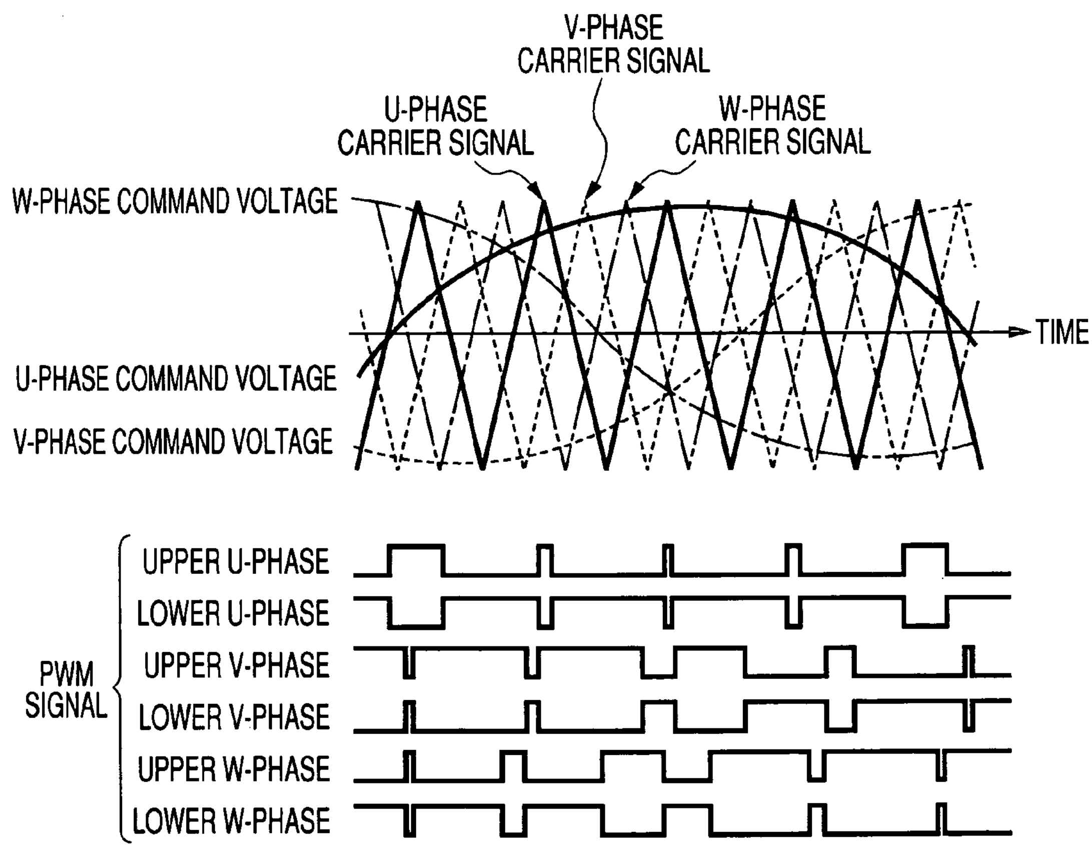
FIG. 14 is a waveform chart in the case where independent carrier signals are used respectively for the phases.
Figure 15:
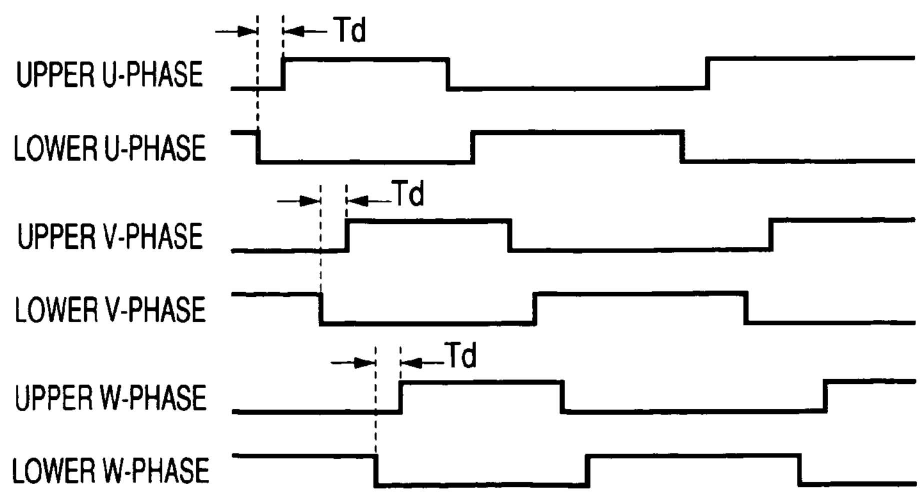
FIG. 15 is a view illustrating shifts of the dead time periods.
Figure 16:
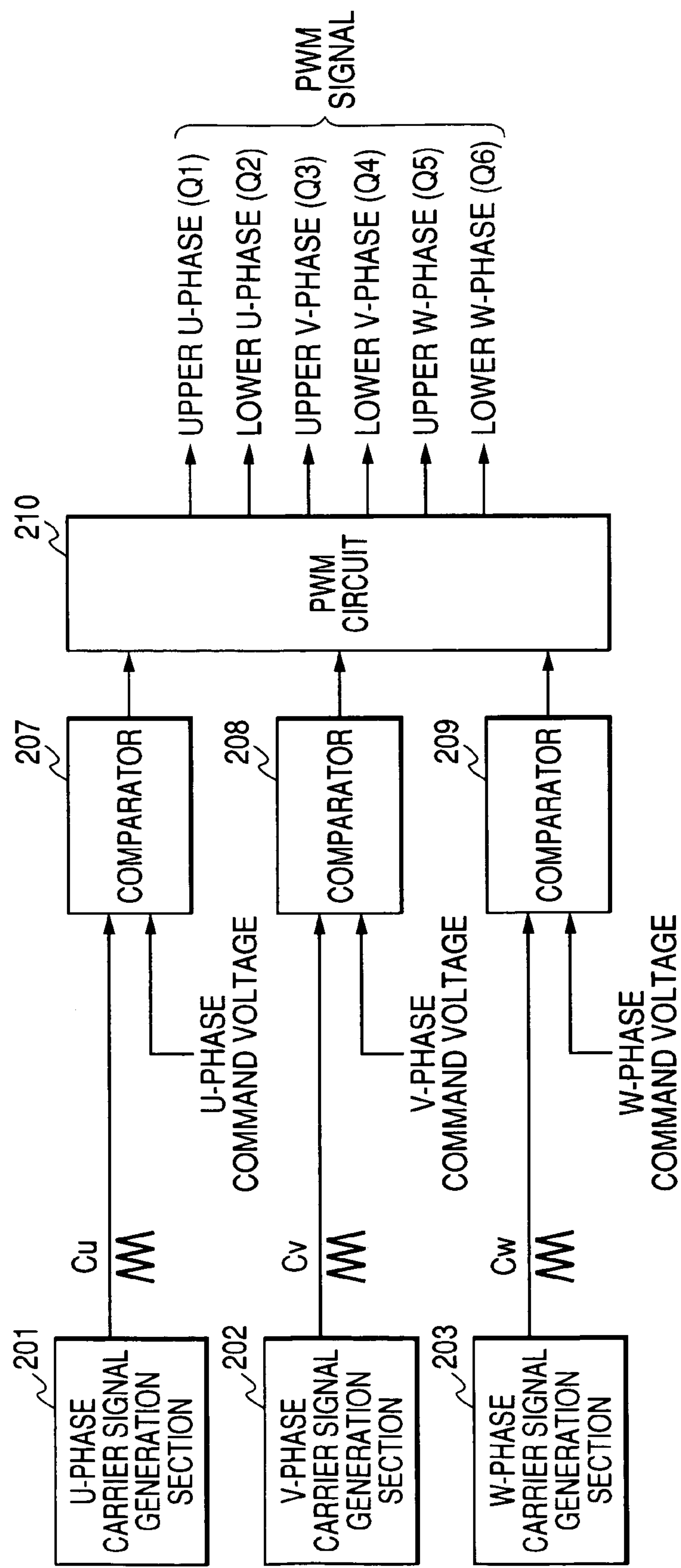
FIG. 16 is a diagram showing the configuration of the carrier signal generation section.

FIG. 5 is a time chart showing generation timings of the interrupt signals INT3U to INT4W. The relationships in which, in periods where the amplitudes of the carrier signals Cu, Cv, Cw are larger than the command voltage values for the respective U-phase, V-phase, and W-phases, the upper switching elements Q1, Q3, Q5 for the phases are turned ON, and, in periods where the amplitudes of the carrier signals Cu, Cv, Cw are smaller than the command voltage values of the respective U-phase, V-phase, and W-phases, the lower switching elements Q2, Q4, Q6 for the phases are turned ON are identical with those in the case of FIG. 14. In practice, the command voltages for the phases are changed with time as shown in FIG. 14. When a period of a several cycles of each carrier signal is considered, the command voltages are changed in a small degree. For the sake of convenience, therefore, the command voltages for the phases are indicated as constant values in FIG. 5.

As shown in FIG. 5, the interrupt signal INT3U is generated at rising timings of the PWM signal (U-phase upper) at which the switching element Q1 is turned ON from the OFF state, and the interrupt signal INT4U is generated at rising timings of the PWM signal (U-phase lower) at which the switching element Q2 is turned ON from the OFF state. The interrupt signal INT3V is generated at rising timings of the PWM signal (V-phase upper) at which the switching element Q3 is turned ON from the OFF state, and the interrupt signal INT4V is generated at rising timings of the PWM signal (V-phase lower) at which the switching element Q4 is turned ON from the OFF state. The interrupt signal INT3W is generated at rising timings of the PWM signal (W-phase upper) at which the switching element Q5 is turned ON from the OFF state, and the interrupt signal INT4W is generated at rising timings of the PWM signal (W-phase lower) at which the switching element Q6 is turned ON from the OFF state.

The interrupt signals INT3U to INT4W are supplied from the PWM circuit 108 of FIG. 1 to the interrupt controller 109, so that the interrupt controller 109 applies interruption to the CPU 103 at the timings of the interrupt signals. When the interruption is applied, the CPU 103 gives the command for A/D conversion to the A/D converter 102. In response to the command, the A/D converter 102 starts A/D conversion of the motor current detected by the shunt ST, at the timings of the interrupt signals.

Figure 6A:
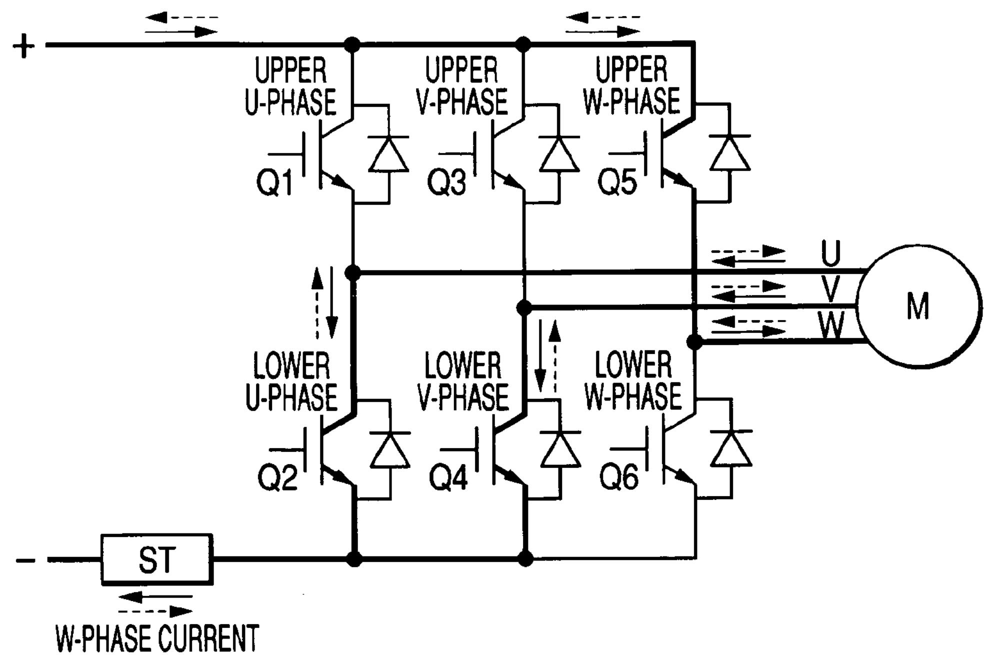
FIGS. 6A–F are diagrams illustrating current paths in an inverter circuit in the first embodiment.

FIG. 5 shows relationships among the interrupt signals and the shunt current (the motor current flowing through the shunt ST). When the interrupt signal INT4V which is in the left end of FIG. 5 is generated, the A/D converter 102 starts A/D conversion at the timing of the generation. At this time, the PWM signals of U-phase lower, V-phase lower, and W-phase upper are in the rising state (hereinafter, referred to as "H" state), and hence the switching elements Q2, Q4, Q5 in the inverter circuit 100 are turned ON so that current paths indicated by the thick lines in FIG. 6A are formed. The arrows indicate the direction of the current. As a result, the motor current flowing through the shunt ST is the W-phase current. Therefore, the A/D converter 102 conducts a process of A/D-converting the W-phase current in a period a in FIG. 5 which continues until the next interrupt signal INT3U is generated.

Figure 6B:
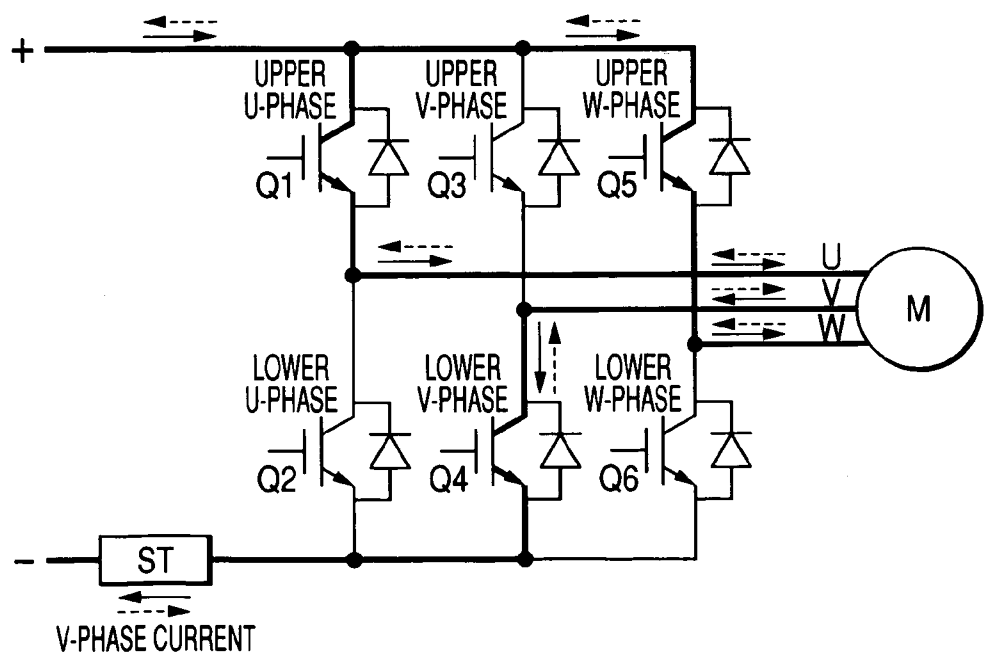

When the interrupt signal INT3U is generated, the A/D converter 102 starts next A/D conversion at the timing of the generation. At this time, the PWM signals of U-phase upper, V-phase lower, and W-phase upper are in "H" state, and hence the switching elements Q1, Q4, Q5 in the inverter circuit 100 are turned ON so that current paths indicated by the thick lines in FIG. 6B are formed. As a result, the motor current flowing through the shunt ST is the V-phase current. Therefore, the A/D converter 102 conducts a process of A/D-converting the V-phase current in a period b in FIG. 5 which continues until the next interrupt signal INT4W is generated.

Figure 6C:
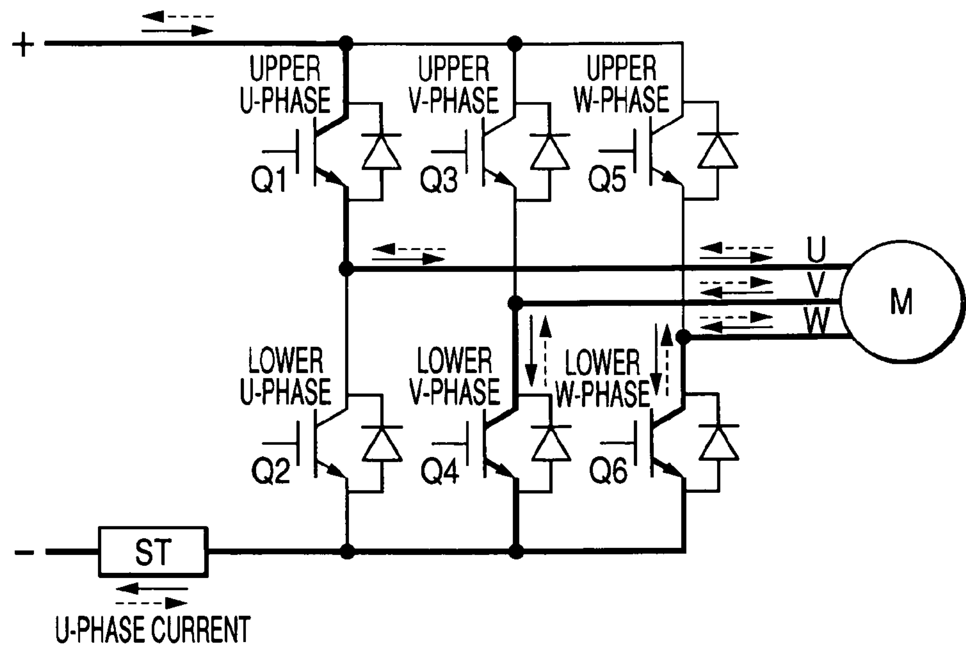

When the interrupt signal INT4W is generated, the A/D converter 102 starts next A/D conversion at the timing of the generation. At this time, the PWM signals of U-phase upper, V-phase lower, and W-phase lower are in "H" state, and hence the switching elements Q1, Q4, Q6 in the inverter circuit 100 are turned ON so that current paths indicated by the thick lines in FIG. 6C are formed. As a result, the motor current flowing through the shunt ST is the U-phase current. Therefore, the A/D converter 102 conducts a process of A/D-converting the U-phase current in a period c in FIG. 5 which continues until the next interrupt signal INT3V is generated.

Figure 6D:
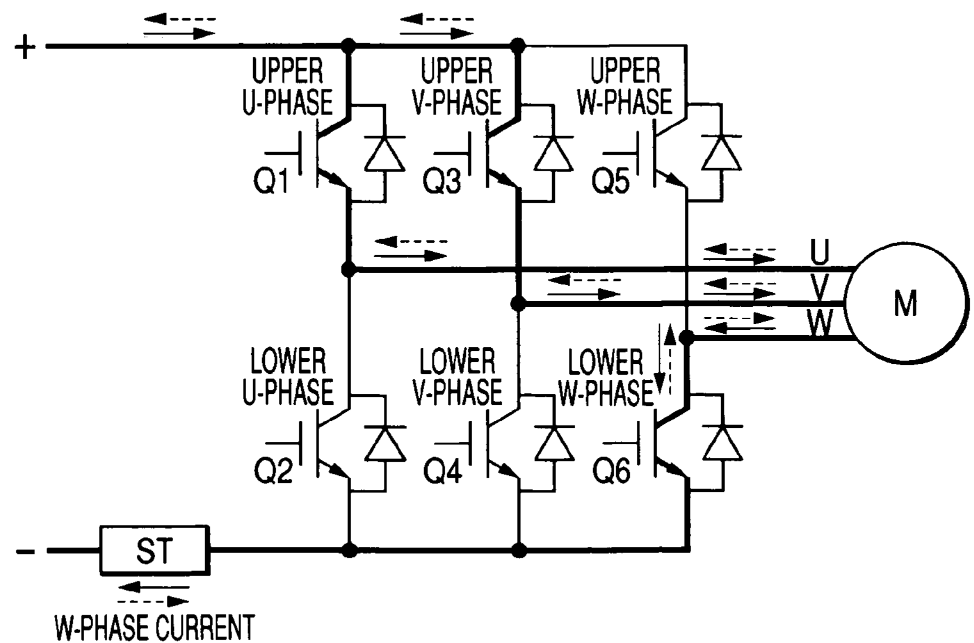

When the interrupt signal INT3V is generated, the A/D converter 102 starts next A/D conversion at the timing of the generation. At this time, the PWM signals of U-phase upper, V-phase upper, and W-phase lower are in "H" state, and hence the switching elements Q1, Q3, Q6 in the inverter circuit 100 are turned ON so that current paths indicated by the thick lines in FIG. 6D are formed. As a result, the motor current flowing through the shunt ST is the W-phase current. The polarity of the W-phase current in this case is opposite to that of the W-phase current (FIG. 6A) in the period a. Therefore, the A/D converter 102 conducts a process of A/D-converting the W-phase current in a period d in FIG. 5 which continues until the next interrupt signal INT4U is generated.

Figure 6E:
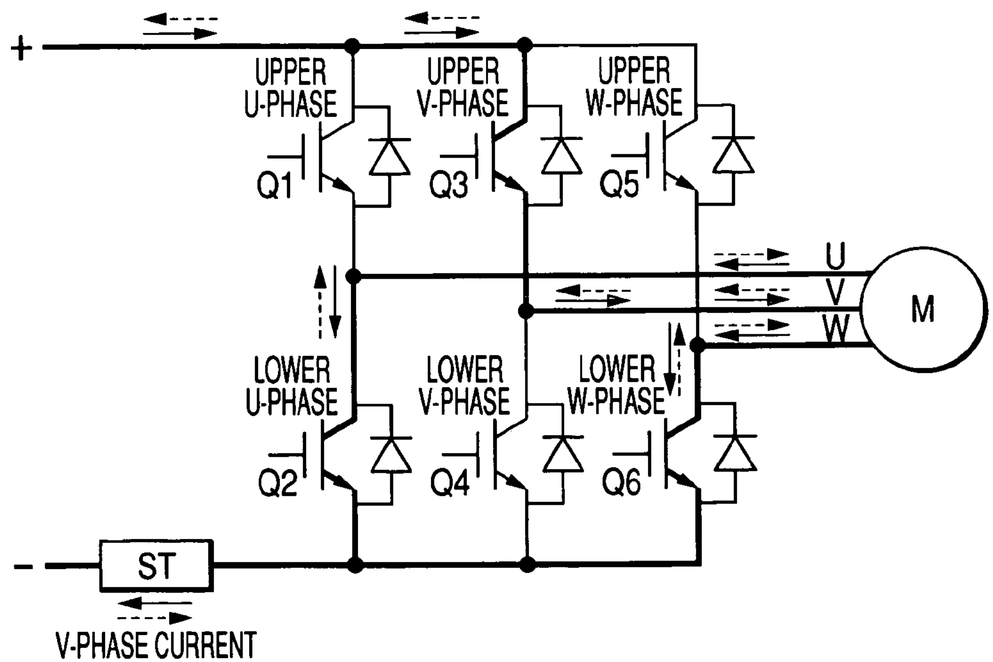

When the interrupt signal INT4U is generated, the A/D converter 102 starts next A/D conversion at the timing of the generation. At this time, the PWM signals of U-phase lower, V-phase upper, and W-phase lower are in "H" state, and hence the switching elements Q2, Q3, Q6 in the inverter circuit 100 are turned ON so that current paths indicated by the thick lines in FIG. 6E are formed. As a result, the motor current flowing through the shunt ST is the V-phase current. The polarity of the V-phase current in this case is opposite to that of the V-phase current (FIG. 6B) in the period b. Therefore, the A/D converter 102 conducts a process of A/D-converting the V-phase current in a period e in FIG. 5 which continues until the next interrupt signal INT3W is generated.

Figure 6F:
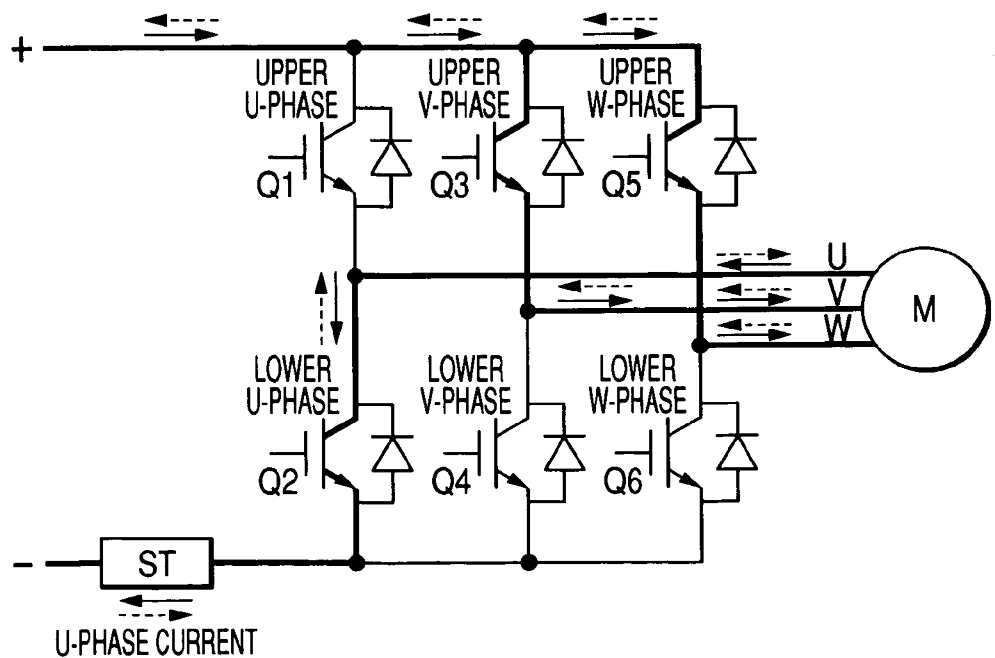

When the interrupt signal INT3W is generated, the A/D converter 102 starts next A/D conversion at the timing of the generation. At this time, the PWM signals of U-phase lower, V-phase upper, and W-phase upper are in "H" state, and hence the switching elements Q2, Q3, Q5 in the inverter circuit 100 are turned ON so that current paths indicated by the thick lines in FIG. 6F are formed. As a result, the motor current flowing through the shunt ST is the U-phase current. The polarity of the U-phase current in this case is opposite to that of the U-phase current (FIG. 6C) in the period c. Therefore, the A/D converter 102 conducts a process of A/D-converting the U-phase current in a period f in FIG. 5 which continues until the next interrupt signal INT4V is generated.

When the triangular wave carrier signals Cu, Cv, Cw which are shifted in phase by 120° from each other are used as described above, the six interrupt signals in total are generated in the period of the one cycle of the carrier signal Cu (reference triangular wave carrier signal) in FIG. 5, and A/D conversion of the motor currents of the phases is started at the timings of the interrupt signals. The A/D conversion is conducted on the motor currents of all the phases which are detected by the shunt ST. The interrupt signals are generated at the rising timings of the PWM signals, and the PWM signals are shifted in phase from one another in accordance with the phase differences of the triangular wave carrier signals. As compared with the case where the interrupt signals are generated at the timings of, for example, peaks (upper limit) and valleys (lower limit) of the triangular wave carrier signals, therefore, the time periods of conducting A/D conversion after the interrupt signals can be prolonged (see the periods a, b, e, f in FIG. 5). As a result, a larger amount of data of the motor current values of the phases can be sampled in one cycle of the carrier signal, so that the accuracy of the A/D conversion is improved. The A/D-converted motor current values are used in the feedback control of the motor M. When the accuracy of the motor current is enhanced, therefore, the motor M can be accurately controlled. Usually, the A/D conversion requires a fixed time period. When the intervals of the interrupt signals are short, therefore, a configuration provided with only one A/D converter cannot operate, and a plurality of A/D converters are required. By contrast, in the embodiment, the intervals of the interrupt signals can be prolonged, and hence even a configuration provided with only one A/D converter 102 can operate. The A/D conversion of the motor current is conducted on the basis of the interrupt signals at rising timings of the PWM signals. Immediately after the motor current of each phase begins to flow, therefore, the A/D conversion can be started, and the certainty of the A/D conversion can be enhanced.

In the case of FIG. 5, since the motor currents of all the phases are A/D-converted in one cycle of the carrier signal Cu, data of a current of any phase can be sampled, and the accuracy is improved. However, the command voltage values for the phases are temporally changed, and hence a situation where generation timings of the six interrupt signals partly overlap with each other may possibly occur. When such a situation occurs, A/D conversion due to the overlapping interrupt signals is disabled. When phase-shifted triangular wave carrier signals are used as described above, a situation where generation timings of all the interrupt signals overlap with each other never occurs, and it is ensured that interrupt signals for at least two phases can be obtained in one cycle of the carrier signal Cu. When the motor current values of two phases (for example, the U- and V-phases) are once detected, the motor current value of the other one phase (for example, W-phase) can be automatically obtained by adding the motor current values of the two phases to each other. In this case, a value which is obtained by inverting the sign of the total of the A/D-converted motor currents of the two phases is used as the motor current value of the remaining one phase. In the case of FIG. 5, A/D conversion is conducted two times on the motor current of the same phase in one cycle of the carrier signal Cu. Therefore, an average of the A/D-converted motor current values is obtained for each phase, and the average is used as the motor current of the phase in one cycle of the carrier signal Cu. When such an averaging process is carried out, the accuracy of the A/D conversion can be further enhanced, and the motor M can be controlled more accurately.

In the above-described A/D conversion, the CPU 103 obtains a time period from timing when one interrupt signal is generated to that when a next interrupt signal is generated. When the time period is equal to or larger than a fixed value, values of motor currents which are A/D-converted during the time period are made effective. The time period can be obtained by calculation based on the triangular wave carrier signals Cu, Cv, Cw and the command values for the phases. Alternatively, the time period from timing when one interrupt signal is generated to that when a next interrupt signal is generated may be monitored by a timer. In FIG. 5, the periods a, b, c, e, f continue for a time period which is equal to or larger than the fixed value. The data which are sampled in the periods by A/D conversion are highly reliable, and hence handled as effective values. By contrast, the time period of the period d is smaller than the fixed value. The reliability of data which are sampled in the period by A/D conversion is low, and hence the data are handled as ineffective values. Although the A/D-converting process is conducted in the period d, therefore, obtained data are discarded. As described above, values obtained by A/D conversion are made effective only when the time period between interrupt signals is equal to or larger than a fixed value, whereby the reliability of data can be enhanced. In the case where the time period of each period is previously known by the above-described calculation, when the time period is equal to or larger than the fixed value, A/D conversion may be conducted, and, when the time period is smaller than the fixed value, A/D conversion may be inhibited. When A/D conversion is inhibited, naturally, the data sampling in the period (the period d in FIG. 5) is not conducted. According to the configuration, it is possible to avoid a wasteful operation in which A/D conversion is conducted on ineffective data. From the viewpoint of improving the process speed, therefore, a process in which effectiveness/ineffectiveness of data is first judged and A/D conversion is then conducted is preferable to that in which A/D conversion is first conducted and effectiveness/ineffectiveness is then judged. The fixed value which serves as the criterion to judge effectiveness/ineffectiveness, and determine whether A/D conversion is conducted or not (inhibited) is set to a value which is equal to or larger than the minimum time period required in the A/D-converting process in the A/D converter 102.

In FIG. 2, as described above, the detection signals of the comparators 13, 23, 33 are taken out as the peak interrupt signals INT1U, INT1V, INT1W, and the detection signals of the comparators 14, 24, 34 are taken out as the valley interrupt signals INT2U, INT2V, INT2W, respectively. The interrupt signals are given to the interrupt controller 109 of FIG. 1. When detection signals indicative of the upper or lower limit of the count value are used as interrupt signals in this way, interruption can be applied to the CPU 103 at peaks and valleys of the triangular wave carrier signals.

Figure 8:
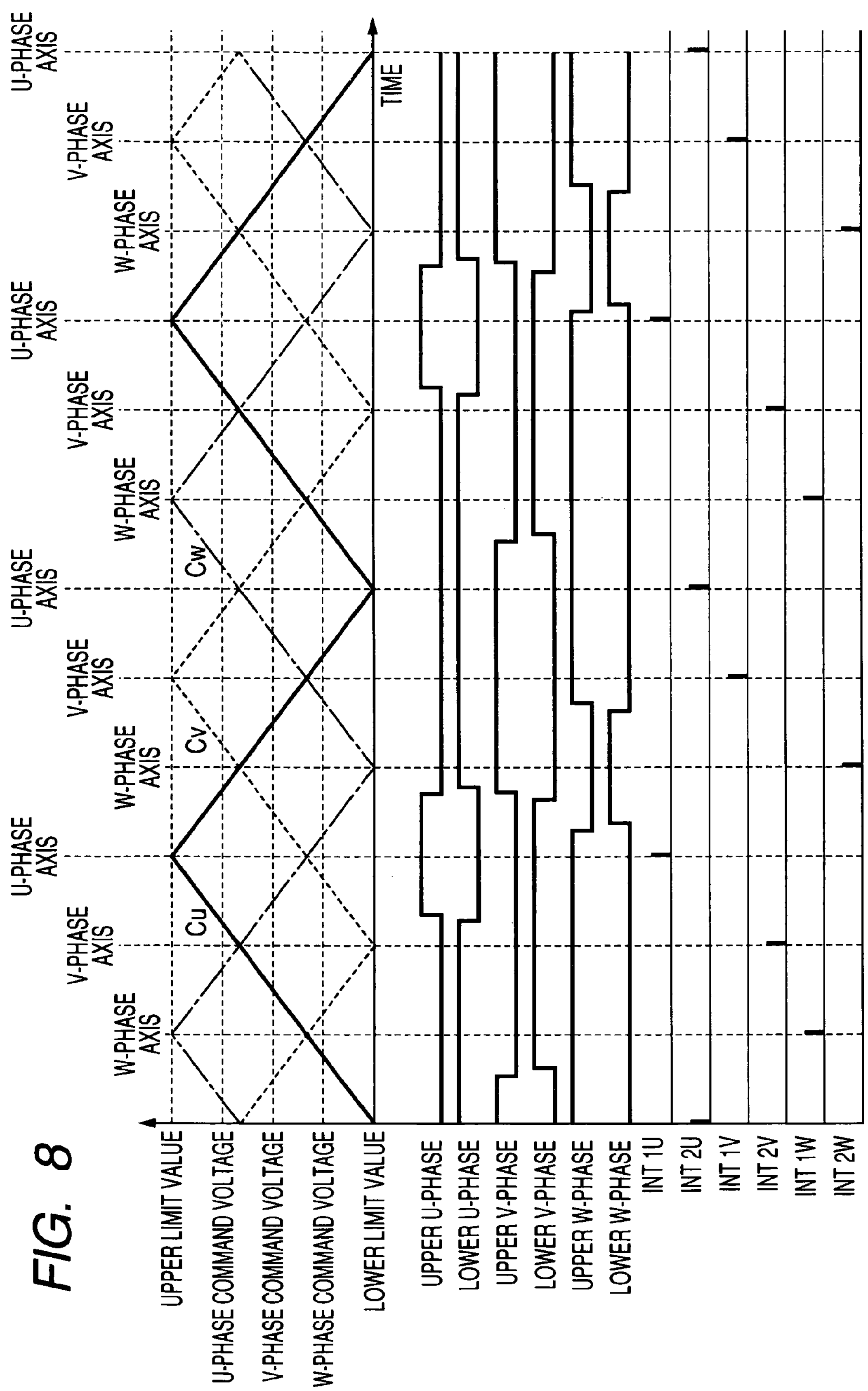
FIG. 8 is a time chart illustrating peak interruption and valley interruption.

FIG. 8 is a time chart illustrating interruptions at peaks and valleys of the triangular wave carrier signals. The U-phase peak interrupt signal INT1U is generated at a peak of the U-phase carrier signal Cu (timing when the count value reaches the upper limit), and the U-phase valley interrupt signal INT2U is generated at a valley of the U-phase carrier signal Cu (timing when the count value reaches the lower limit). The V-phase peak interrupt signal INT1V is generated at a peak of the V-phase carrier signal Cv, and the V-phase valley interrupt signal INT2V is generated at a valley of the V-phase carrier signal Cv. The W-phase peak interrupt signal INT1W is generated at a peak of the W-phase carrier signal Cw, and the W-phase valley interrupt signal INT2W is generated at a valley of the W-phase carrier signal Cw.

At timings corresponding to peaks and valleys for the phases when such interrupt signals are generated, as seen from FIG. 8, pulses of the PWM signals supplied to the switching elements Q1 to Q6 for the phases are not in a rising state or in a falling state, but are in a stable ON or OFF state. Namely, the interrupt signals for each phase are generated at the middles of ON and OFF periods of the pulses for the phase. When interruption is applied to the CPU 103 via the interrupt controller 109 on the basis of such interrupt signals, therefore, various control operations can be stably conducted. For example, the CPU 103 may conduct fault diagnosis on the upper switching elements Q1, Q3, Q5 for the phases in the inverter circuit 100 at the timings of the peak interrupt signals for the phases, and on the lower switching elements Q2, Q4, Q6 for the phases in the inverter circuit 100 at the timings of the valley interrupt signals for the phases. The interrupt control due to the peak and valley interrupt signals is carried out in a range where the above-described A/D conversion due to the interrupt signals at rising timings of the PWM signals is not disturbed.

Figure 9:
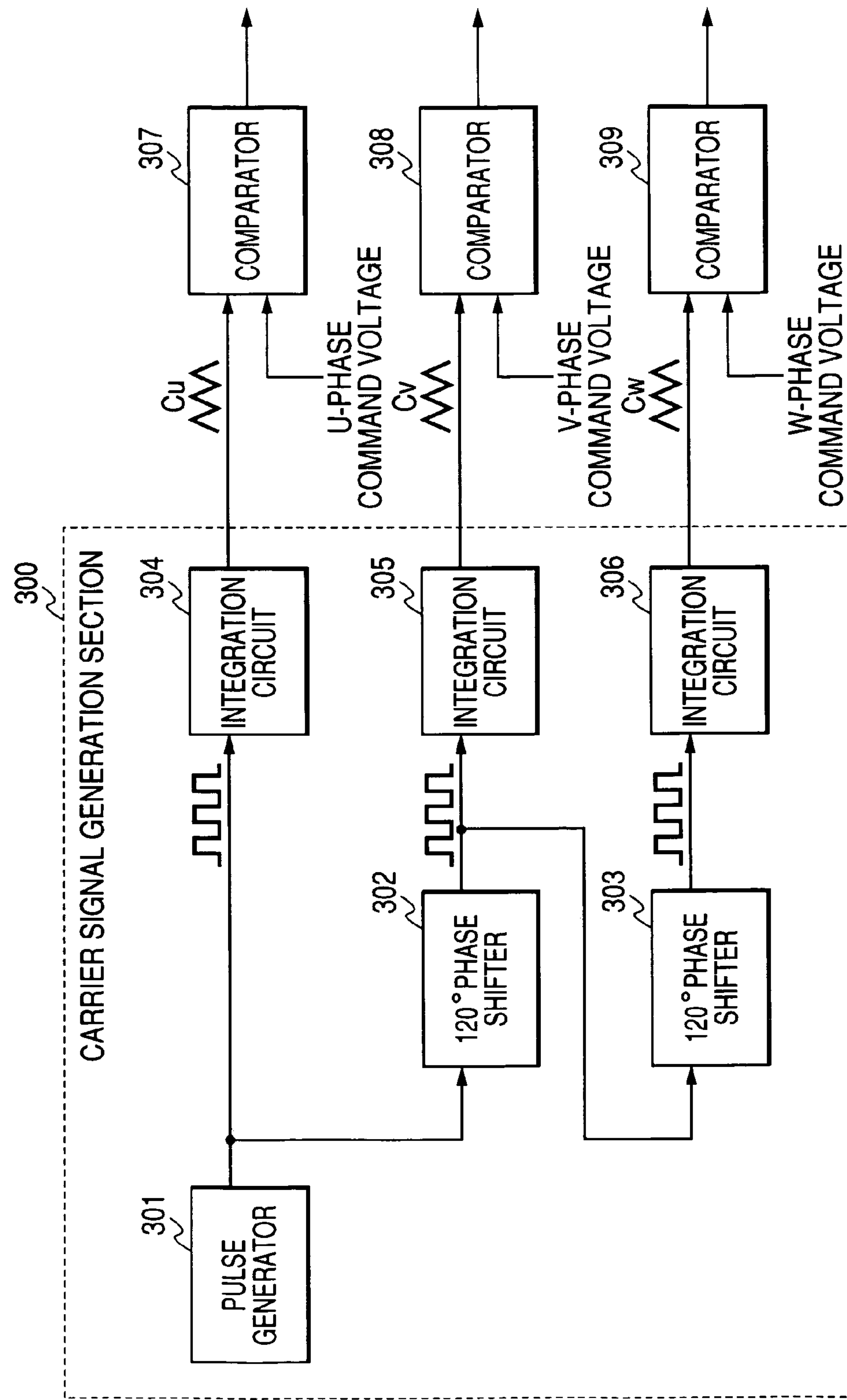
FIG. 9 is a diagram showing another example of the carrier signal generation section.

The invention can be realized in various modes other than the above-described embodiment. For example, a carrier signal generation section shown in FIG. 9 may be used in place of that shown in FIG. 2. In FIG. 9, 301 denotes a pulse generator which generates rectangular pulses, 302 denotes a phase shifter which shifts by 120° the phase of the pulses generated in the pulse generator 301, and 303 denotes a phase shifter which shifts by 120° the phase of the pulses that have been shifted by the phase shifter 302 by 120°. The reference numeral 304 denotes an integration circuit which integrates the pulses generated in the pulse generator 301 to produce a U-phase carrier signal Cu configured by a triangular wave, 305 denotes an integration circuit which integrates the pulses that have been shifted by the phase shifter 302 by 120°, to produce a V-phase carrier signal Cv configured by a triangular wave, and 306 denotes an integration circuit which integrates the pulses that have been shifted by the phase shifter 303 by 120°, to produce a W-phase carrier signal Cw configured by a triangular wave. The reference numeral 307 denotes a comparator which compares the U-phase carrier signal Cu with the U-phase command voltage, 308 denotes a comparator which compares the V-phase carrier signal Cv with the V-phase command voltage, and 309 denotes a comparator which compares the W-phase carrier signal Cw with the W-phase command voltage. Outputs of the comparators 307 to 309 are supplied to the PWM circuit 108 (FIG. 1). In the circuit of FIG. 9, the pulses generated in the pulse generator 301 are passed through the phase shifters 302, 303, and integrated by the integration circuits 304 to 306, so that the U-, V-, and W-phase carrier signals Cu, Cv, Cw which are shifted in phase from each other by 120° can be obtained.

The time period from timing when one interrupt signal is generated at a rising of the PWM signal to that when the next interrupt signal is generated may be calculated. When the time period is sufficiently long (for example, the period a in FIG. 5), A/D conversion of the battery voltage may be conducted after the A/D conversion of the motor current. When the time period is not sufficiently long (for example, the period c in FIG. 5), only the A/D conversion of the motor current may be conducted. According to the configuration, the battery voltage can be A/D-converted at least one time in one cycle of the carrier signal. The judgment on the sufficiency/insufficiency may be carried out depending on whether the time period is equal to or longer than a fixed value which is set to be equal to or larger than the minimum time period required in the two A/D-converting processes respectively for the motor current and the battery voltage.

In the case where elements of a relatively low operation speed are used as the switching elements Q1 to Q6, the command that is to be given to the A/D converter 102 from the CPU 103 to which interruption is applied may be delayed by a predetermined time period so that A/D conversion is prevented from being started before the elements are completely set to the ON state.

In the embodiment, the command value which is to be compared with the carrier signals is a voltage value. Alternatively, the command value may be a current value. In the embodiment, the interrupt signals INT3U to INT4W are produced by the PWM circuit 108. Alternatively, the interrupt signals INT3U to INT4W may be produced by conducting a delaying process corresponding to the dead time in the comparators 16, 26, 36.

<Second Embodiment>

Next, a second embodiment of the invention will be described in detail.

Figure 17:
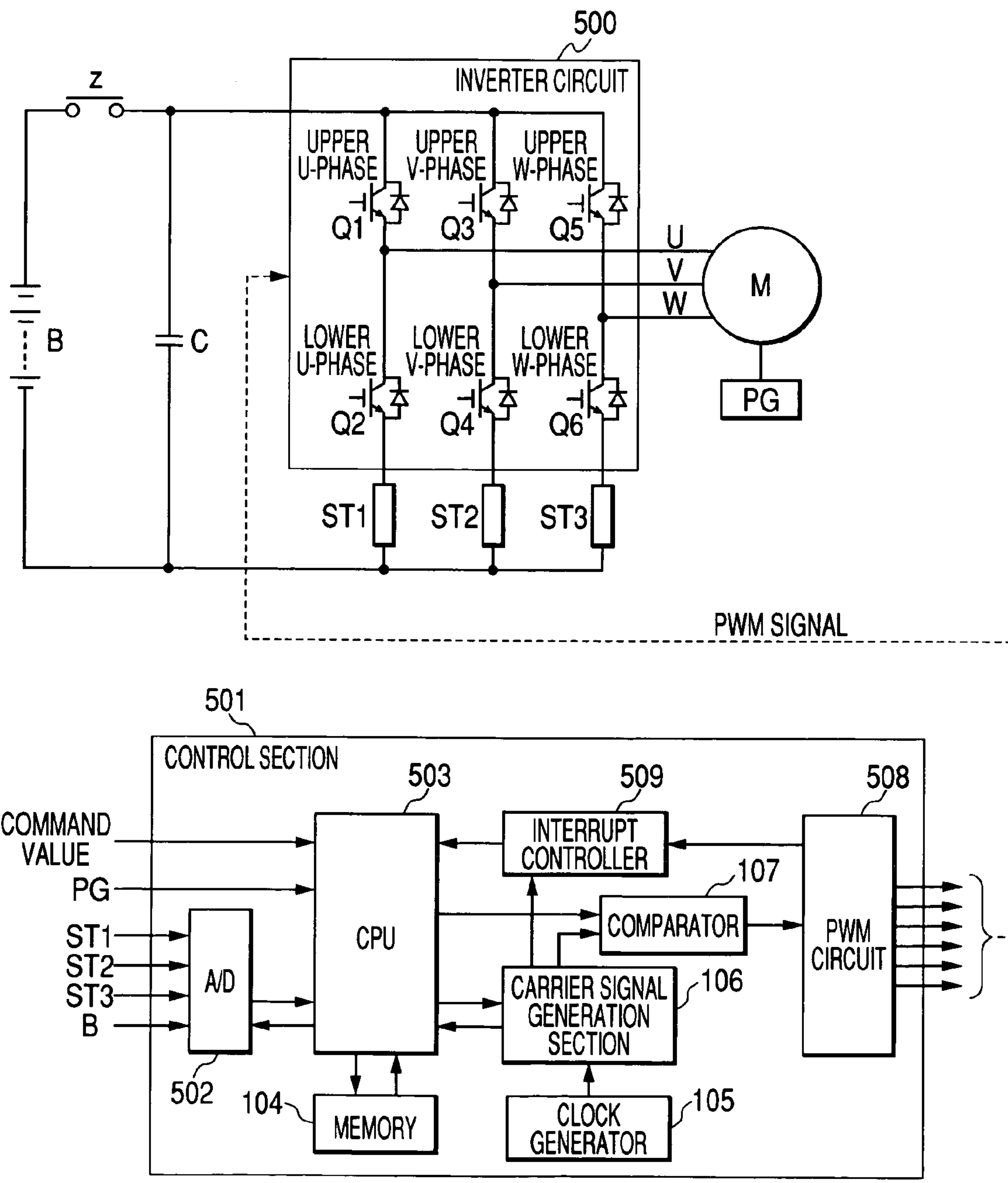
FIG. 17 is a diagram of an inverter control apparatus of a second embodiment of the invention.

FIG. 17 shows an example of an inverter control apparatus of the second embodiment of the invention. The components which are identical with those in the configuration of the first embodiment shown in FIG. 1 are denoted by the same reference numerals, and their detailed description is omitted.

In the second embodiment, shunts ST1 to ST3 are disposed in place of the shunt ST in FIG. 1. The shunts ST1 to ST3 detect the currents of the phases (U-phase, V-phase, and W-phase) flowing through the motor M, respectively.

An inverter circuit 500 is a known circuit which converts the DC power source of the battery B to an AC power source to drive the motor M, and which is configured by the six semiconductor switching elements Q1 to Q6 of U-phase upper, U-phase lower, V-phase upper, V-phase lower, W-phase upper, and W-phase lower. The shunt ST1 is connected in series to the series connection of the switching elements Q1, Q2 corresponding to the U-phase, the shunt ST2 is connected in series to that of the switching elements Q3, Q4 corresponding to the V-phase, and the shunt ST3 is connected in series to that of the switching elements Q5, Q6 corresponding to the W-phase. The series circuits are connected in parallel between the power lines.

A PWM circuit 508 is different from the PWM circuit 108 in the first embodiment in that the circuit does not send interrupt signals to an interrupt controller 509.

The carrier signal generation section 106 produces interrupt signals at timings of peaks and valleys of triangular wave carrier signals for the phases, and sends the interrupt signals to the interrupt controller 509. Upon reception of the interrupt signals from the carrier signal generation section 106, the interrupt controller 509 applies interruption to the CPU 503. At the timing when the interruption is applied, the CPU 503 gives a command for A/D conversion to an A/D converter 502. As described later, at timing of a valley interrupt signal, the A/D converter 502 starts A/D conversion of the motor current detected by one of the shunts ST1 to ST3 and of the phase corresponding to the interrupt signal, and, at timing of a peak interrupt signal, starts A/D conversion of the voltage of the battery B.

The configurations of the carrier signal generation section 106 and the comparator 107 in FIG. 17 are identical with those of the first embodiment shown in FIG. 2. Therefore, their components are denoted by the same reference numerals, and their description is omitted.

When the thus configured carrier signal generating apparatus is used, as described in the first embodiment, triangular wave carrier signals which are required in a PWM control of a three-phase motor, and which are shifted in phase from one another by 120° can be obtained easily and accurately, and peak and valley interrupt signals can be easily produced at peaks and valleys of the carrier signals Cu, Cv, Cw.

Figure 18:
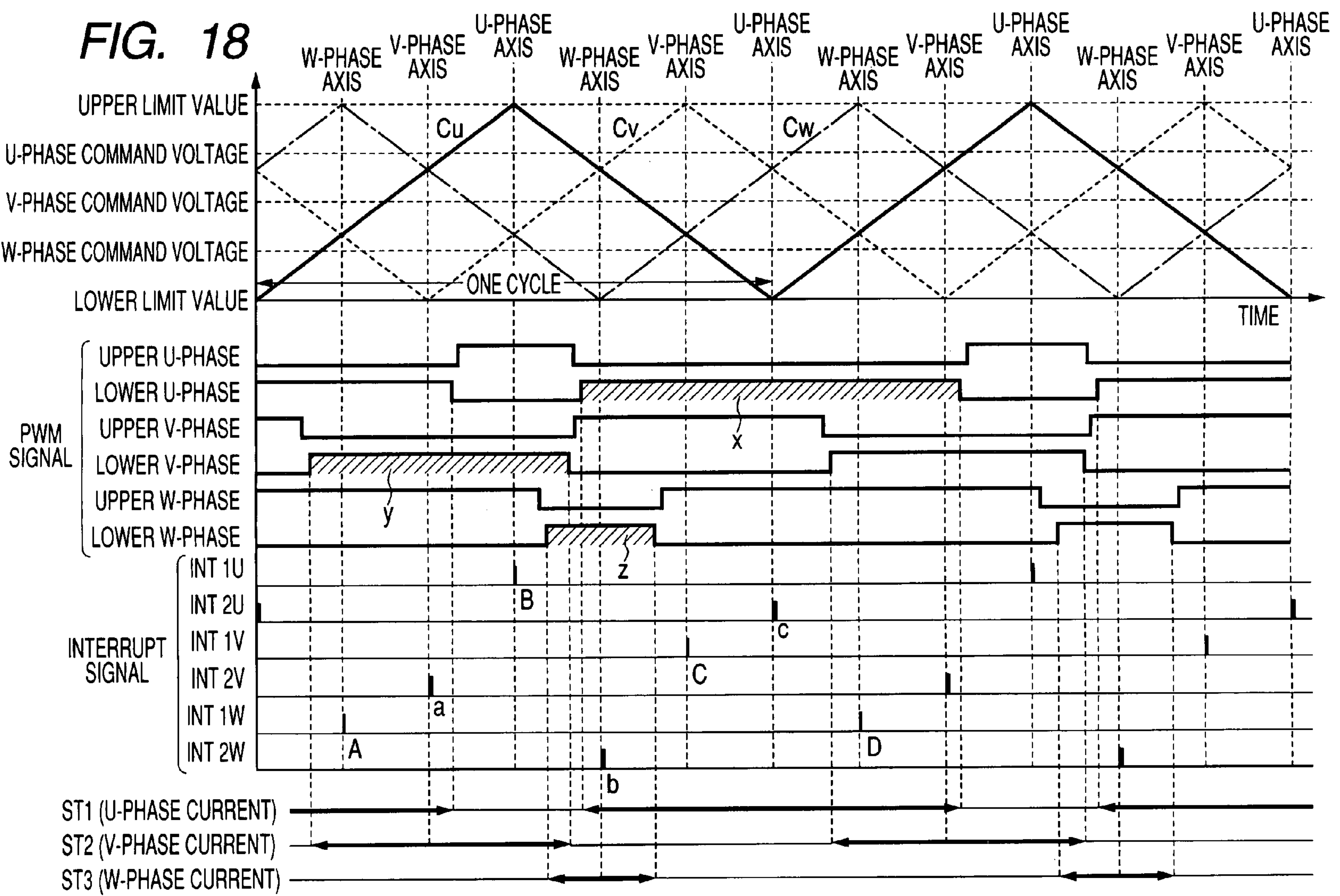
FIG. 18 is a time chart showing generation timings of interrupt signals in the second embodiment.

FIG. 18 is a time chart showing generation timings of the peak interrupt signals INT1U, INT1V, INT1W output from the comparators 13, 23, 33 of FIG. 2, and the valley interrupt signals INT2U, INT2V, INT2W output from the comparators 14, 24, 34. The relationships in which, in periods where the amplitudes of the carrier signals Cu, Cv, Cw are larger than the command voltage values for the respective U-phase, V-phase, and W-phases, the upper switching elements Q1, Q3, Q5 for the phases are turned ON, and, in periods where the amplitudes of the carrier signals Cu, Cv, Cw are smaller than the command voltage values for the respective U-phase, V-phase, and W-phases, the lower switching elements Q2, Q4, Q6 for the phases are turned ON are identical with those in the case of FIG. 14. In practice, the command voltages for the phases are changed with time as shown in FIG. 14. When a period of a several cycles of each carrier signal is considered, the command voltages are changed in a small degree. For the sake of convenience, therefore, the command voltages for the phases are indicated as constant values in FIG. 18.

As shown in FIG. 18, the peak interrupt signal INT1U is generated at timings of peaks (upper limit) of the U-phase carrier signal Cu, the peak interrupt signal INT1V is generated at timings of peaks of the V-phase carrier signal Cv, and the peak interrupt signal INT1W is generated at timings of peaks of the W-phase carrier signal Cw. The valley interrupt signal INT2U is generated at timings of valleys (lower limit) of the U-phase carrier signal Cu, the valley interrupt signal INT2V is generated at timings of valleys of the V-phase carrier signal Cv, and the valley interrupt signal INT2W is generated at timings of valleys of the W-phase carrier signal Cw.

The interrupt signals INT1U to INT2W are supplied from the carrier signal generation section 106 of FIG. 17 to the interrupt controller 509, so that the interrupt controller 509 applies interruption to the CPU 503 at the timings of the interrupt signals. When the interruption is applied at the timings of the valley interrupt signals INT2U, INT2V, INT2W, the CPU 503 gives the command for A/D conversion of the motor currents to the A/D converter 502. In response to the command, the A/D converter 502 starts A/D conversion of the motor currents detected by the shunts ST1 to ST3. When the interruption is applied at the timings of the peak interrupt signals INT1U, INT1V, INT1W, the CPU 503 gives the command for A/D conversion of the battery voltage to the A/D converter 502. In response to the command, the A/D converter 502 starts A/D conversion of the voltage of the battery B.

First, the A/D conversion of the motor currents will be described in detail. FIG. 18 shows relationships among the interrupt signals and the shunt currents (the motor currents of the phases flowing through the shunts ST1 to ST3). The U-phase current of the motor M flows through the shunt ST1, the V-phase current flows through the shunt ST2, and the W-phase current flows through the shunt ST3. The thick arrows indicate the time periods when the phase currents flow. Each of the six kinds of PWM signals corresponding to the upper and lower switching elements for the phases is configured by: an ON-period signal which maintains corresponding one of the switching elements to an ON state, and which has a variable time width; and an OFF-period signal which maintains the switching element to an OFF state, and which has a variable time width. The ON-period signal is a signal in a period where the PWM signal is in "H" state (rising state), and the OFF-period signal is a signal in a period where the PWM signal is in "L" state (falling state).

In FIG. 18, timing a is timing of a valley of the V-phase carrier signal Cv. At this timing, the comparator 24 (FIG. 2) outputs the valley interrupt signal INT2V. When the interrupt controller 509 applies interruption to the CPU 503 based on the interrupt signal, the CPU 503 sends the command to the A/D converter 502. At this timing, the A/D converter 502 starts the A/D conversion of the motor current.

Figure 19A:
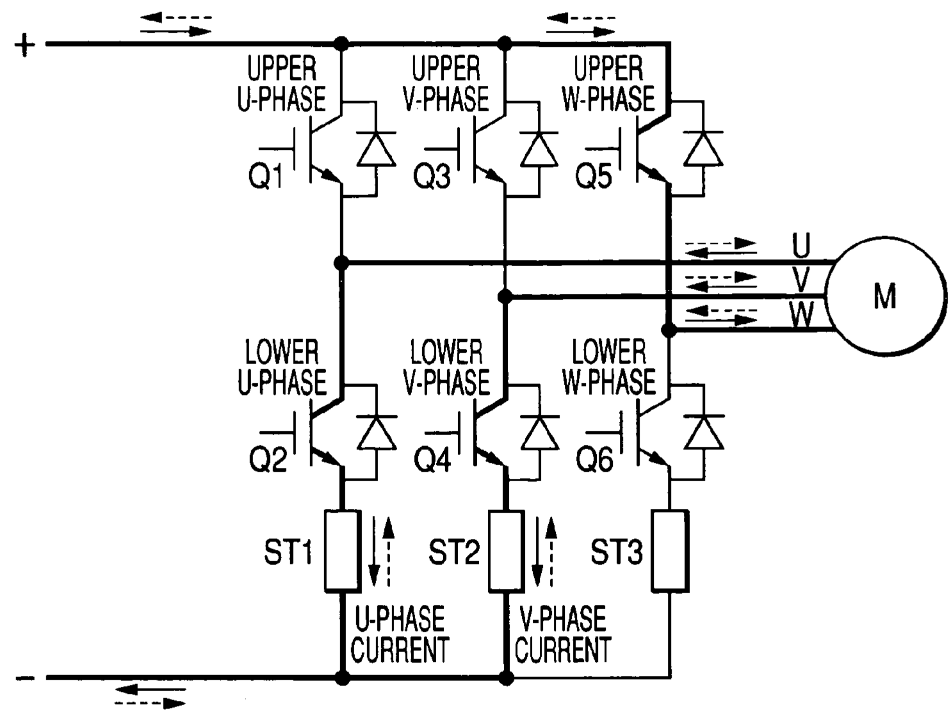
FIGS. 19A–C are diagrams illustrating current paths in an inverter circuit in the second embodiment.

As seen from FIG. 18, at the timing a, the PWM signals of U-phase lower, V-phase lower, and W-phase upper are in "H" state, and hence the switching elements Q2, Q4, Q5 in the inverter circuit 500 are turned ON so that current paths indicated by the thick lines in FIG. 19A are formed. The arrows indicate the direction of the current. As a result, the U-phase current flows through the shunt ST1, and the V-phase current flows through the shunt ST2. The A/D converter 502 conducts A/D conversion on the V-phase current of the shunt ST2 (A/D conversion is already conducted on the U-phase current at a previous timing). The process of A/D-converting the V-phase current continues until timing (B) when the U-phase carrier signal Cu reaches a peak.

Figure 19B:
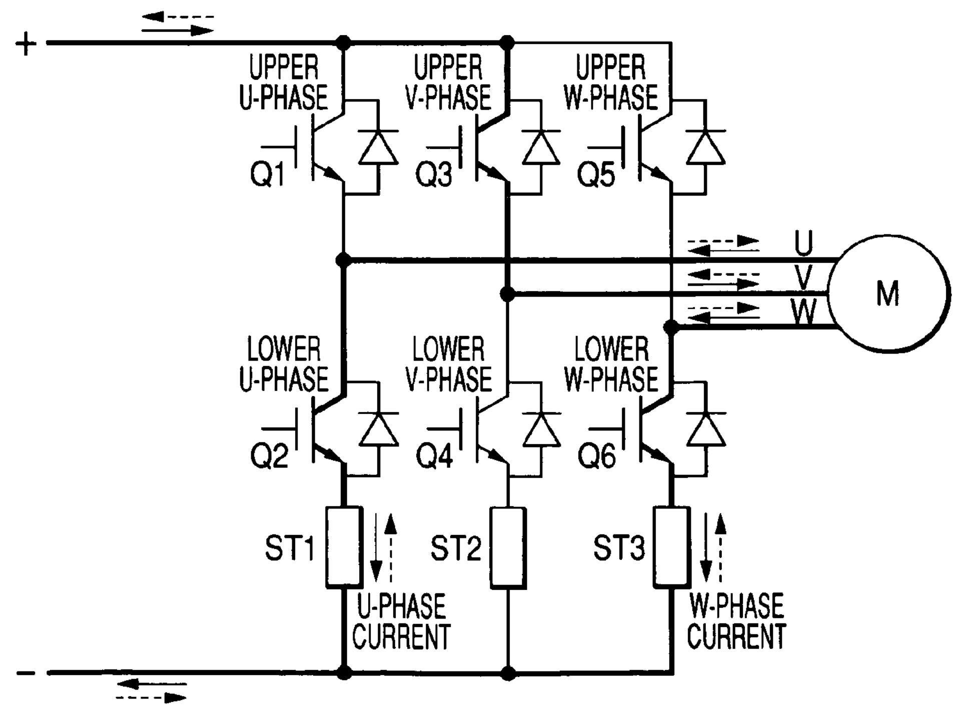

Next, timing b in FIG. 18 is timing of a valley of the W-phase carrier signal Cw. At this timing, the comparator 34 (FIG. 2) outputs the valley interrupt signal INT2W. When the interrupt controller 509 applies interruption to the CPU 503 based on the interrupt signal, the CPU 503 sends the command to the A/D converter 502. At this timing, the A/D converter 502 starts the A/D conversion of the motor current. As seen from FIG. 18, at the timing b, the PWM signals of U-phase lower, V-phase upper, and W-phase lower are in "H" state, and hence the switching elements Q2, Q3, Q6 in the inverter circuit 500 are turned ON so that current paths indicated by the thick lines in FIG. 19B are formed. The arrows indicate the direction of the current. As a result, the U-phase current flows through the shunt ST1, and the W-phase current flows through the shunt ST3. The A/D converter 502 conducts A/D conversion on the W-phase current of the shunt ST3 (A/D conversion will be conducted on the U-phase current at a later timing c). The process of A/D-converting the W-phase current continues until timing when the switching element Q6 is turned OFF (the PWM signal of the W-phase lower falls).

Figure 19C:
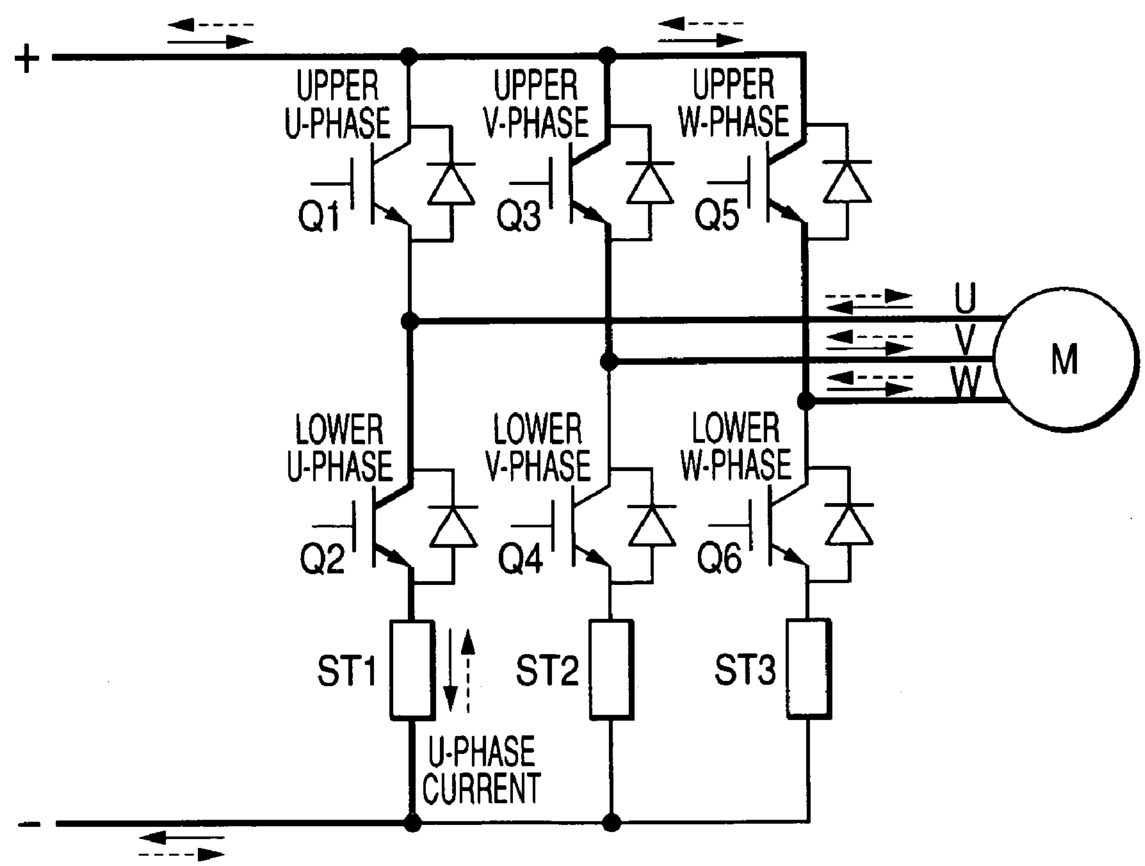

Next, the timing c in FIG. 18 is timing of a valley of the U-phase carrier signal Cu. At this timing, the comparator 14 (FIG. 2) outputs the valley interrupt signal INT2U. When the interrupt controller 509 applies interruption to the CPU 503 based on the interrupt signal, the CPU 503 sends the command to the A/D converter 502. At this timing, the A/D converter 502 starts the A/D conversion of the motor current. As seen from FIG. 18, at the timing c, the PWM signals of U-phase lower, V-phase upper, and W-phase upper are in "H" state, and hence the switching elements Q2, Q3, Q5 in the inverter circuit 500 are turned ON so that current paths indicated by the thick lines in FIG. 19C are formed. The arrows indicate the direction of the current. As a result, the U-phase current flows through the shunt ST1. The A/D converter 502 conducts A/D conversion on the U-phase current. The A/D-converting process continues until timing (D) when the W-phase carrier signal Cw reaches a peak.

In the above-described embodiment, the shunts ST1 to ST3 are disposed respectively for the phases, and the motor currents of the phases are independently detected by the respective shunts. The multi-phase triangular wave carrier signals Cu, Cv, Cw which are shifted in phase from one another by 120° are used as the carrier signals, the valley interrupt signals are produced at valleys of the carrier signals, interruption is applied to the CPU 503 at the timings of the valley interrupt signals, and the motor current is then A/D-converted. At the timing of each valley interrupt signal, the A/D converter 502 starts A/D conversion of the motor current of the phase corresponding to the interrupt signal. Namely, A/D conversion of the U-phase current detected by the shunt ST1 is conducted at timing of the U-phase valley interrupt signal INT2U, A/D conversion of the V-phase current detected by the shunt ST2 is conducted at timing of the V-phase valley interrupt signal INT2V, and A/D conversion of the W-phase current detected by the shunt ST3 is conducted at As a result, when the triangular wave carrier signals have a constant frequency, the valley interrupt signals INT2U, INT2V, INT2W are generated at fixed time intervals which are determined by the period of the carrier signals, thereby enabling the A/D-converting processes for the phases to be always conducted at given timings. Therefore, a relatively long time period can be ensured for A/D conversion in accordance with the period of the carrier signals. The timings of valleys of the carrier signals are not timings when the switching elements Q1 to Q6 for the phases are switched from the OFF state to the ON state, but those when a predetermined time period elapses after the elements are turned ON. At the timings, therefore, the motor currents of the phases detected by the shunts ST1 to ST3 are in a stable state. Therefore, the A/D-converted motor current values are highly reliable. The motor current values are used in the feedback control of the motor M. When the accuracy of the motor current is enhanced, therefore, the motor M can be accurately controlled.

As seen from FIG. 18, the valley interrupt signal INT2U is generated at the intermediate timing c of the time width of the ON-period signal (hatching x) which maintains the switching element Q2 (U-phase lower) to the ON state, the valley interrupt signal INT2V is generated at the intermediate timing a of the time width of the ON-period signal (hatching to the ON state, and the valley interrupt signal INT2W is generated at the intermediate timing b of the time width of the ON-period signal (hatching z) which maintains the switching element Q6 (W-phase lower) to the ON state. At these intermediate timings, the PWM signals (U-phase lower, V-phase lower, and W-phase lower) which drive the switching elements Q2, Q4, Q6 are not in a rising state or in a falling state, but are in stable "H" state. At the timing of each valley interrupt signal, therefore, the motor current flowing through the shunt ST1, ST2, or ST3 and of the phase corresponding to the interrupt signal is in the most stable state. Therefore, the reliability of the A/D-converted motor current is further enhanced. Even when elements in which the operation speed is low, and which require a certain time period before the elements are completely set to the ON state are used as the switching elements, A/D conversion can be conducted without hindrance.

Next, the A/D conversion of the battery voltage will be described. In FIG. 18, timing (A) is timing of a peak of the W-phase carrier signal Cw. At this timing, the comparator 33 (FIG. 2) outputs the peak interrupt signal INT1W. When the interrupt controller 509 applies interruption to the CPU 503 based on the interrupt signal, the CPU 503 sends the command to the A/D converter 502. At this timing, the A/D converter 502 starts the A/D conversion of the voltage of the battery B (hereinafter, referred to as "battery voltage") The A/D-converting process continues until the timing a when the V-phase carrier signal Cv reaches a valley. When the V-phase carrier signal Cv reaches the timing a, the above-described A/D conversion of the V-phase current is conducted.

The timing (B) in FIG. 18 is timing of a peak of the U-phase carrier signal Cu. At this timing, the comparator 13 (FIG. 2) outputs the peak interrupt signal INT1U. When the interrupt controller 509 applies interruption to the CPU 503 based on the interrupt signal, the CPU 503 sends the command to the A/D converter 502. At this timing, the A/D converter 502 restarts the A/D conversion of the battery voltage. The A/D-converting process continues until the timing b when the W-phase carrier signal Cw reaches a valley. When the W-phase carrier signal Cw reaches the timing b, the above-described, A/D conversion of the W-phase current is conducted.

Timing (C) in FIG. 18 is timing of a peak of the V-phase carrier signal Cv. At this timing, the comparator 23 (FIG. 2) outputs the peak interrupt signal INT1V. When the interrupt controller 509 applies interruption to the CPU 503 based on the interrupt signal, the CPU 503 sends the command to the A/D converter 502. At this timing, the A/D converter 502 restarts the A/D conversion of the battery voltage The A/D-converting process continues until the timing c when the U-phase carrier signal Cu reaches a valley. When the U-phase carrier signal Cu reaches the timing c, the above-described A/D conversion of the U-phase current is conducted.

As described above, the A/D conversion of the motor current is started on the basis of the valley interrupt signals which are generated at timings of valleys of the triangular wave carrier signals, and the A/D conversion of the battery voltage is started on the basis of the peak interrupt signals which are generated at timings of peaks of the triangular wave carrier signals. Therefore, the A/D conversions of the motor current and the battery voltage can be conducted with using both timings of peaks and valleys of the triangular wave carrier signals. The CPU 503 feedback controls the motor M with using the A/D-converted values of the motor current and the battery voltage. The A/D conversion requires a certain time period. When the intervals of the interrupt signals are short, therefore, a configuration provided with only one A/D converter cannot operate, and a plurality of A/D converters are required. By contrast, in the embodiment, the intervals of the interrupt signals can be prolonged, and hence even a configuration provided with only one A/D converter 502 can operate. When the initial values of the up/down counters 12, 22, 32 (FIG. 2) are changed, the phase differences among the triangular wave carrier signals are changed. Therefore, the timings of peaks and valleys of the triangular wave carrier signals can be freely set in accordance with the initial values, so that interruption can be applied at arbitrary timings and arbitrary time intervals.

In the case of FIG. 18, since the motor currents of all the phases which are detected by the shunts ST1 to ST3 are A/D-converted in one cycle of the carrier signal Cu (reference triangular wave carrier signal), data of a current of any phase can be sampled, and the accuracy is improved. However, the command voltage values for the phases are temporally changed, and hence a situation where the PWM signal for a certain phase is not output at all in one cycle of a carrier signal may possibly occur. When such a situation occurs, A/D conversion of the motor current of the phase is disabled. When phase-shifted triangular wave carrier signals are used as described above, it is ensured that motor currents of at least two phases can be obtained in one cycle of a carrier signal. When the motor current values of two phases (for example, the U-phase and V-phase) are once detected, the motor current value of the other one phase (for example, W-phase) can be automatically obtained by adding the motor current values of the two phases to each other. In this case, a value which is obtained by inverting the sign of the total of the A/D-converted motor currents of the two phases is used as the motor current value of the remaining one phase.

In the above-described A/D conversion, the CPU 503 obtains the time width of each of the ON-period signals x, y, z (time period between rising and falling of the signal) which maintain the switching elements Q2, Q4, Q6 of the lower side of the phases to the ON state. When the time width is equal to or larger than a fixed value, values of motor currents which are A/D-converted on the basis of the valley interrupt signals INT2U, INT2V, INT2W produced during the time period are made effective. When the time width is smaller than the fixed value, values of motor currents which are A/D-converted on the basis of the interrupt signals INT2U, INT2V, INT2W produced during the time period are made ineffective. The time period can be obtained by calculation based on the triangular wave carrier signals Cu, Cv, Cw and the command values for the phases. Alternatively, the time period from timing when a switching element is turned ON to that when the switching element is turned OFF may be monitored by a timer. When the time period when the switching elements Q2, Q4, Q6 maintain the ON state is excessively short, the data which are obtained during the time period have low reliability. Therefore, data obtained in such a period are regarded as ineffective and discarded. Only when the ON time period of the switching element is equal to or larger than the fixed value, the values obtained by A/D conversion are made effective, whereby the reliability of the data can be enhanced In the case where the time width of each of the ON-period signals x, y, z is previously known by the above-described calculation, when the time width is equal to or larger than the fixed value, A/D conversion may be conducted, and, when the time width is smaller than the fixed value, A/D conversion may be inhibited. When A/D conversion is inhibited, naturally, the data sampling in the period is not conducted. According to the configuration, it is possible to avoid a wasteful operation in which A/D conversion is conducted on ineffective data. From the viewpoint of improving the process speed, therefore, a process in which effectiveness/ineffectiveness of data is first judged and A/D conversion is then conducted is preferable to that in which A/D conversion is first conducted and effectiveness/ineffectiveness is then judged. The fixed value which serves as the criterion to judge effectiveness/ineffectiveness, and determine whether A/D conversion is conducted or not (inhibited) is set to a value which is equal to or larger than the minimum time period required in the A/D-converting process in the A/D converter 502.

The invention can be realized in various modes other than the above-described embodiment. In FIG. 17, the shunts ST1 to ST3 are disposed on the side of the switching elements Q2, Q4, Q6 which are on the lower sides of the phases as viewed A/D conversion of the motor current is conducted in valleys of the triangular wave carrier signals in which the elements are in the ON state. Alternatively, the shunts ST1 to ST3 may be disposed on the side of the switching elements Q1, Q3, Q5 which are on the upper sides of the phases as viewed from the junctions of the switching elements, and the A/D conversion of the motor current may be conducted in peaks of the triangular wave carrier signals in which the elements are in the ON state. In the alternative, the A/D conversion of the battery voltage is conducted in valleys of the triangular wave carrier signals.

In the embodiment, the A/D conversion of the battery voltage is conducted while generating a peak interrupt signal at each of peaks of the triangular wave carrier signals. Alternatively, the A/D conversion of the battery voltage may be conducted while generating one peak interrupt signal during every several cycles of each triangular wave carrier signal.

In the embodiment, the command value which is to be compared with the carrier signals is a voltage value. Alternatively, the command value may be a current value.

<Third Embodiment>

Next, a third embodiment of the invention will be described in detail.

Figure 20:
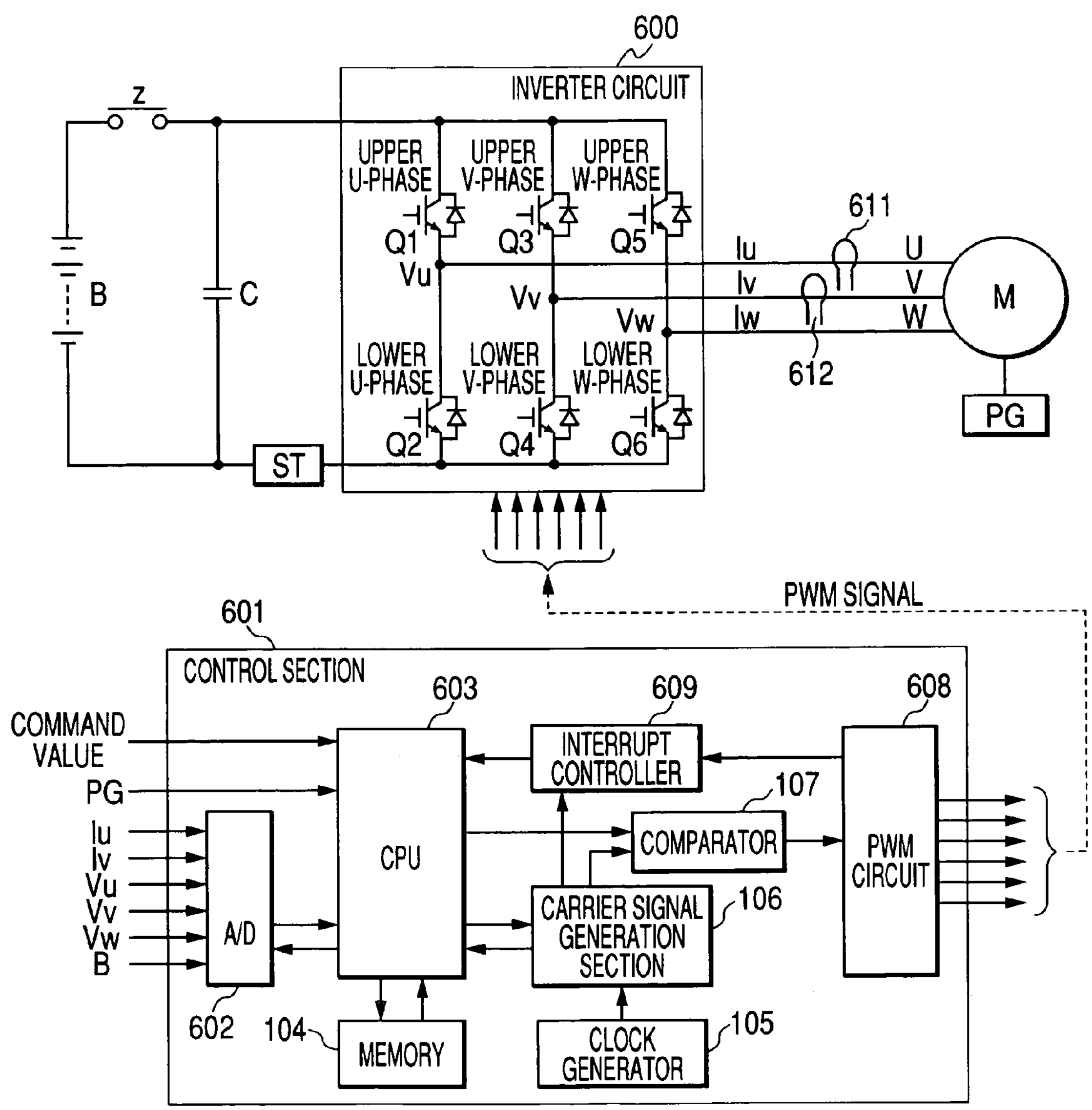
FIG. 20 is a diagram of an inverter control apparatus of a third embodiment of the invention.

FIG. 20 shows an example of an inverter control apparatus are identical with those in the configurations of the first embodiment shown in FIG. 1 and the second embodiment shown in FIG. 17 are denoted by the same reference numerals, and their detailed description is omitted.

An inverter circuit 600 is different from the inverter circuit 100 in the first embodiment in that a current sensor 611 which detects the U-phase current Iu, and a current sensor 612 which detects the V-phase current Iv are disposed, and the shunt ST is not disposed. The W-phase current Iw is obtained by adding the U-phase current Iu to the V-phase current Iv. Therefore, a current sensor which detects the W-phase current Iw is not disposed.

A PWM circuit 608 is different from the PWM circuit 108 in the first embodiment in that the circuit does not send the interrupt signals to an interrupt controller 609.

To a CPU 603, for example, input are command values such as a motor speed based on a lever operation on the forklift, pulses output from the pulse generator PG, the U-phase current Iu, the V-phase current Iv, the U-phase voltage Vu, the V-phase voltage Vv, the W-phase voltage Vw, and the voltage value of the battery B. The currents Iu, Iv, the voltages Vu, Vv, Vw, and the voltage value of the battery B are converted to digital values by an A/D converter 602, and the digital values are supplied to the CPU 603.

The carrier signal generation section 106 produces interrupt signals at timings of peaks and valleys of triangular wave carrier signals for the phases, and sends the interrupt signals to the interrupt controller 609. Upon reception of the interrupt signals from the carrier signal generation section 106, the interrupt controller 609 applies interruption to the CPU 603. When the interruption is applied, the CPU 603 checks normality/abnormality of each of the switching elements Q1 to Q6 of the inverter circuit 600 as described later.

Figure 21:
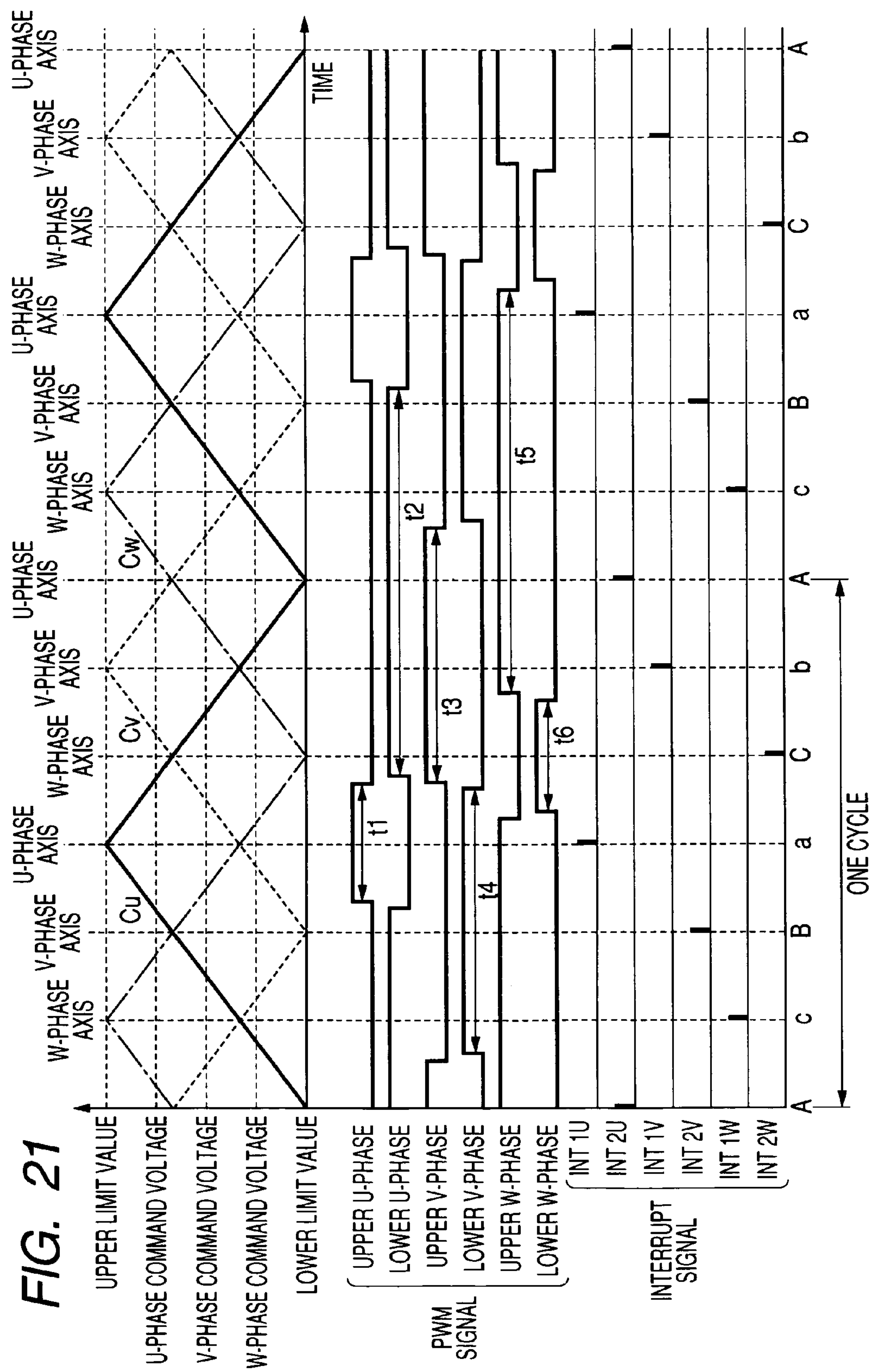
FIG. 21 is a time chart showing generation timings of interrupt signals in the third embodiment.

FIG. 21 is a time chart showing generation timings of the peak interrupt signals INT1U, INT1V, INT1W output from the comparators 13, 23, 33 of FIG. 2, and the valley interrupt signals INT2U, INT2V, INT2W output from the comparators 14, 24, 34. The time chart is similar to the chart of FIG. 18 which has been described in the second embodiment, and hence its description is omitted.

The interrupt signals INT1U to INT2W are supplied from the carrier signal generation section 106 of FIG. 20 to the interrupt controller 609, so that the interrupt controller 609 applies interruption to the CPU 603 at the timing of each of the interrupt signals. When the interruption is applied, the CPU 603 reads the voltage Vu, Vv, or Vw of the phase corresponding to the interrupt signal in the inverter circuit 600, and judges normality/abnormality of the switching elements Q1 to Q6 based on the voltage. Hereinafter, the judgment will be described in detail.

Figure 22A:
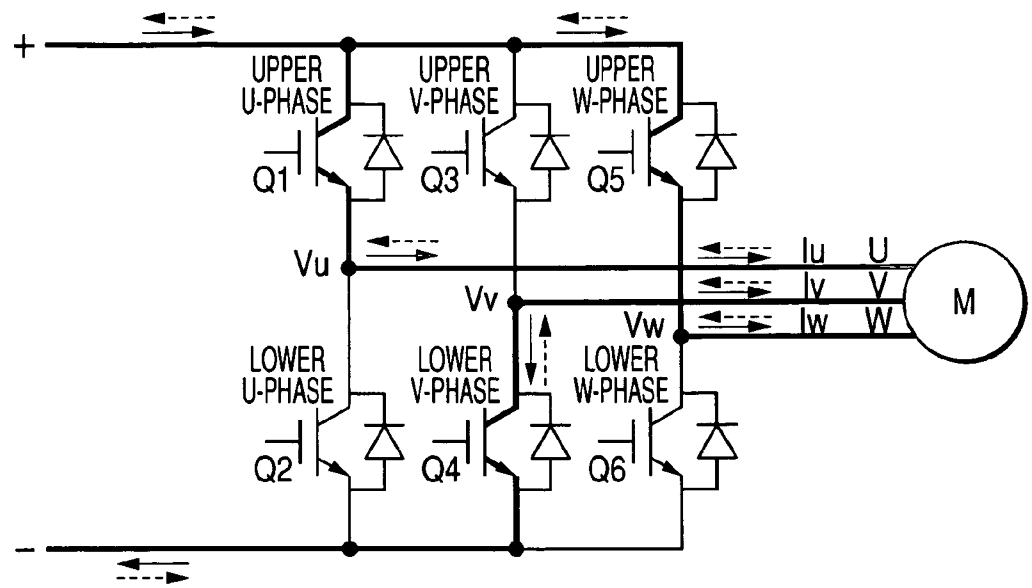
FIGS. 22A–D are diagrams illustrating current paths in an inverter circuit.

First, judgment based on a peak interrupt signal will be described. In FIG. 21, timing a is timing of a peak of the U-phase carrier signal Cu. At this timing, the comparator 13 (FIG. 2) outputs the peak interrupt signal INT1U. When the interrupt controller 609 applies interruption to the CPU 603 based on the interrupt signal, the CPU 603 starts at this timing a process of checking normality/abnormality of the U-phase upper switching element Q1. As seen from FIG. 21, at the timing a, the PWM signals of U-phase upper, V-phase lower, and W-phase upper are in “H” state, and hence the switching elements Q1, Q4, Q5 in the inverter circuit 600 are turned ON in a normal state so that current paths indicated by the thick lines in FIG. 22A are formed. The arrows indicate the direction of the current (this is applicable also to the subsequent figures). The CPU 603 first judges whether the time width (hereinafter, referred to as “ON time period”) t1 of the ON-period signal which maintains the switching element Q1 to an ON state is equal to or larger than a fixed value or not. The ON time period t1 can be previously obtained by calculation based on the U-phase carrier signal Cu and the U-phase command voltage. If the ON time period t1 is equal to or larger than the fixed value, the U-phase voltage Vu of the inverter circuit 600 which is A/D-converted by the A/D converter 602 is read, and it is judged whether the voltage Vu has a predetermined value or not. If the switching element Q1 is not abnormal, the U-phase voltage Vu is substantially equal to the + voltage (for example, +48 V) of the battery B. By contrast, if the switching element Q1 is abnormal, the U-phase voltage Vu has a value which is largely different from the + voltage of the battery B. In the case where the switching element Q1 is broken down to be in an open state, for example, the U-phase voltage Vu is about a half (for example, +24 V) of the + voltage of the battery B. Therefore, normality/abnormality of the switching element Q1 can be judged by measuring the U-phase voltage Vu at the timing of the peak interrupt signal INT1U. If the ON time period t1 of the switching element Q1 is smaller than the fixed value, the element Q1 is not in the stable state. Therefore, the CPU 603 does not read the U-phase voltage Vu, and judgment of normality/abnormality is not conducted.

Figure 22B:
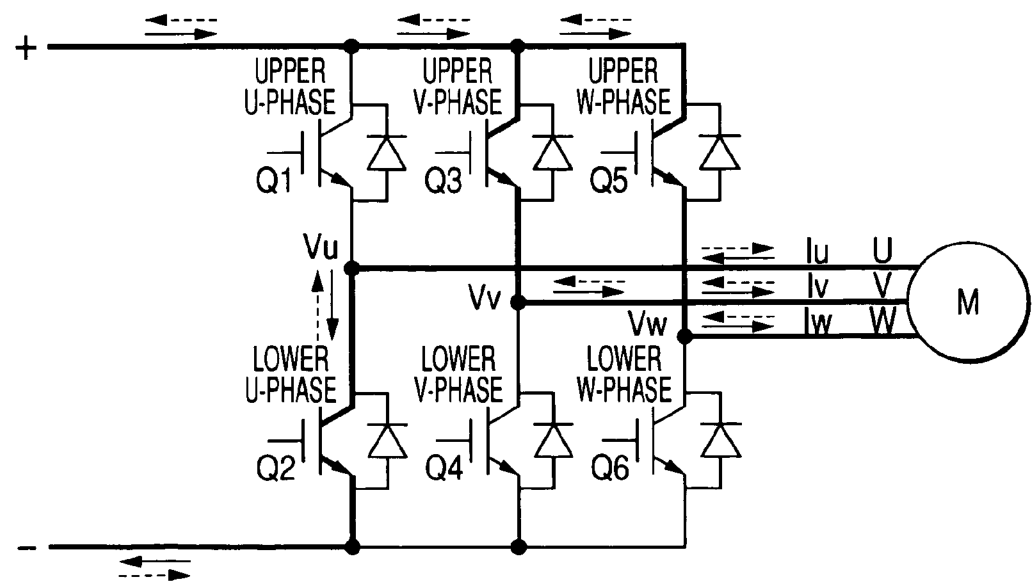

In FIG. 21, timing b is timing of a peak of the V-phase carrier signal Cv. At this timing, the comparator 23 (FIG. 2) outputs the peak interrupt signal INT1V. When the interrupt controller 609 applies interruption to the CPU 603 based on the interrupt signal, the CPU 603 starts at this timing a process of checking normality/abnormality of the V-phase upper switching element Q3. As seen from FIG. 21, at the timing b, the PWM signals of U-phase lower, V-phase upper, and W-phase Q3, Q5 in the inverter circuit 600 are turned ON in a normal state so that current paths indicated by the thick lines in FIG. 22B are formed. The CPU 603 first judges whether the ON-time period t3 of the switching element Q3 is equal to or larger than the fixed value or not. The ON time period t3 can be previously obtained by calculation based on the V-phase carrier signal Cv and the V-phase command voltage. If the ON time period t3 is equal to or larger than the fixed value, the V-phase voltage Vv of the inverter circuit 600 which is A/D-converted by the A/D converter 602 is read, and it is judged whether the voltage Vv has a predetermined value or not. If the switching element Q3 is not abnormal, the V-phase voltage Vv is substantially equal to the + voltage of the battery B. By contrast, if the switching element Q3 is abnormal, the V-phase voltage Vv has a value which is largely different from the + voltage of the battery B. In the case where the switching element Q3 is broken down to be in an open state, for example, the V-phase voltage Vv is about a half of the + voltage of the battery B. Therefore, normality/abnormality of the switching element Q3 can be judged by measuring the V-phase voltage Vv at the timing of the peak interrupt signal INT1V. If the ON time period t3 of the switching element Q3 is smaller than the fixed value, the element Q3 is not in the stable state. Therefore, the CPU 603 does not read the V-phase voltage Vv, and judgment of normality/abnormality is not conducted.

Figure 22C:
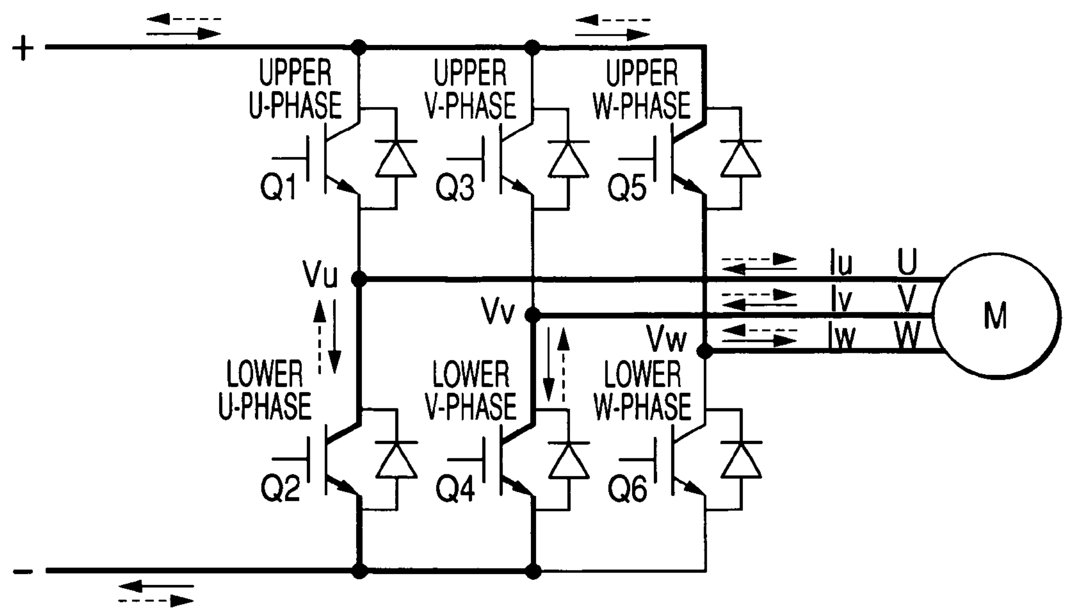

In FIG. 21, timing c is timing of a peak of the W-phase carrier signal Cw. At this timing, the comparator 33 (FIG. 2) outputs the peak interrupt signal INT1W. When the interrupt controller 609 applies interruption to the CPU 603 based on the interrupt signal, the CPU 603 starts at this timing a process of checking normality/abnormality of the W-phase upper switching element Q5. As seen from FIG. 21, at the timing c, the PWM signals of U-phase lower, V-phase lower, and W-phase upper are in "H" state, and hence the switching elements Q2, Q4, Q5 in the inverter circuit 600 are turned ON in a normal state so that current paths indicated by the thick lines in FIG. 22C are formed. The CPU 603 first judges whether the ON time period t5 of the switching element Q5 is equal to or larger than the fixed value or not. The ON time period t5 can be previously obtained by calculation based on the W-phase carrier signal Cw and the W-phase command voltage. If the ON time period t5 is equal to or larger than the fixed value, the W-phase voltage Vw of the inverter circuit 600 which is A/D-converted by the A/D converter 602 is read, and it is judged whether the voltage Vw has a predetermined value or not. If the switching element Q5 is not abnormal, the W-phase voltage Vw is substantially equal to the + voltage of the battery B. By contrast, if the switching element Q5 largely different from the + voltage of the battery B. In the case where the switching element Q5 is broken down to be in an open state, for example, the W-phase voltage Vw is about a half of the + voltage of the battery B. Therefore, normality/abnormality of the switching element Q5 can be judged by measuring the W-phase voltage Vw at the timing of the peak interrupt signal INT1W. If the ON time period t5 of the switching element Q5 is smaller than the fixed value, the element Q5 is not in the stable state. Therefore, the CPU 603 does not read the W-phase voltage Vw, and judgment of normality/abnormality is not conducted.

Next, judgment based on a valley interrupt signal will be described. In FIG. 21, timing (A) is timing of a valley of the U-phase carrier signal Cu. At this timing, the comparator 14 (FIG. 2) outputs the valley interrupt signal INT2U. When the interrupt controller 609 applies interruption to the CPU 603 based on the interrupt signal, the CPU 603 starts at this timing a process of checking normality/abnormality of the U-phase lower switching element Q2. As seen from FIG. 21, at the timing (A), the PWM signals of U-phase lower, V-phase upper, and W-phase upper are in "H" state, and hence the switching elements Q2, Q3, Q5 in the inverter circuit 600 are turned ON in a normal state so that current paths indicated by the thick lines in FIG. 22B are formed. The CPU 603 first judges whether the ON time period t2 of the switching element Q2 is equal to or larger than the fixed value or not. The ON time period t2 can be previously obtained by calculation based on the U-phase carrier signal Cu and the U-phase command voltage. If the ON time period t2 is equal to or larger than the fixed value, the U-phase voltage Vu of the inverter circuit 600 which is A/D-converted by the A/D converter 602 is read, and it is judged whether the voltage Vu has a predetermined value or not. If the switching element Q2 is not abnormal, the U-phase voltage Vu is substantially equal to the − voltage (0 V) of the battery B. By contrast, if the switching element Q2 is abnormal, the U-phase voltage Vu has a value which is largely different from 0 V. In the case where the switching element Q2 is broken down to be in an open state, for example, the U-phase voltage Vu is about a half of the + voltage of the battery B. Therefore, normality/abnormality of the switching element Q2 can be judged by measuring the U-phase voltage Vu at the timing of the valley interrupt signal INT2U. If the ON time period t2 of the switching element Q2 is smaller than the fixed value, the element Q2 is not in the stable state. Therefore, the CPU 603 does not read the U-phase voltage Vu, and judgment of normality/abnormality is not conducted.

In FIG. 21, timing (B) is timing of a valley of the V-phase carrier signal Cv. At this timing, the comparator 24 (FIG. 2) outputs the valley interrupt signal INT2V. When the interrupt controller 609 applies interruption to the CPU 603 based on the interrupt signal, the CPU 603 starts at this timing a process of checking normality/abnormality of the V-phase lower switching element Q4. As seen from FIG. 21, at the timing (B), the PWM signals of U-phase lower, V-phase lower, and W-phase upper are in "H" state, and hence the switching elements Q2, Q4, Q5 in the inverter circuit 600 are turned ON in a normal state so that current paths indicated by the thick lines in FIG. 22C are formed. The CPU 603 first judges whether the ON time period t4 of the switching element Q4 is equal to or larger than the fixed value or not. The ON time period t4 can be previously obtained by calculation based on the V-phase carrier signal Cv and the V-phase command voltage. If the ON time period t4 is equal to or larger than the fixed value, the V-phase voltage Vv of the inverter circuit 600 which is A/D-converted by the A/D converter 602 is read, and it is judged whether the voltage Vv has a predetermined value or not. If the switching element Q4 is not abnormal, the V-phase voltage Vv is substantially equal to the − voltage (0 V) of the battery B. By contrast, if the switching element Q4 is abnormal, the V-phase voltage Vv has a value which is largely different from 0 V. In the case where the switching element Q4 is broken down to be in an open state, for example, the V-phase voltage Vv is about a half of the + voltage of the battery B. Therefore, normality/abnormality of the switching element Q4 can be judged by measuring the V-phase voltage Vv at the timing of the valley interrupt signal INT2V. If the ON time period t4 of the switching element Q4 is smaller than the fixed value, the element Q4 is not in the stable state. Therefore, the CPU 603 does not read the V-phase voltage Vv, and judgment of normality/abnormality is not conducted.

Figure 22D:
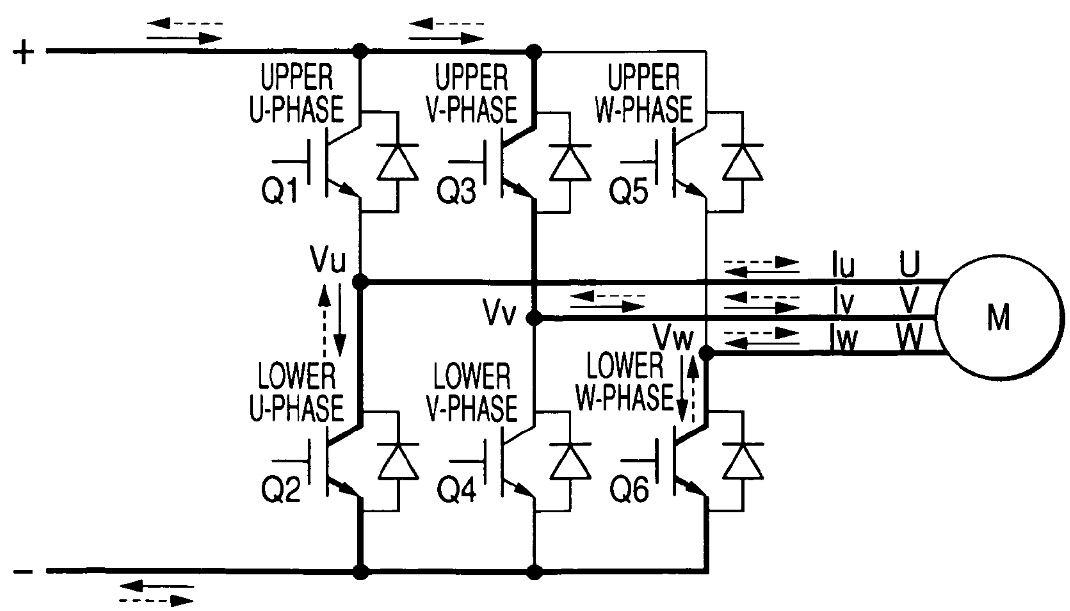

In FIG. 21, timing (C) is timing of a valley of the W-phase carrier signal Cw. At this timing, the comparator 34 (FIG. 2) outputs the valley interrupt signal INT2W. When the interrupt controller 609 applies interruption to the CPU 603 based on the interrupt signal, the CPU 603 starts at this timing a process of checking normality/abnormality of the W-phase lower switching element Q6. As seen from FIG. 21, at the timing (C), the PWM signals of U-phase lower, V-phase upper, and W-phase lower are in "H" state, and hence the switching elements Q2, Q3, Q6 in the inverter circuit 600 are turned ON in a normal state so that current paths indicated by the thick lines in FIG. 22D are formed. The CPU 603 first judges whether the ON time period t6 of the switching element Q6 is equal to or larger than the fixed value or not. The ON time period t6 can be previously obtained by calculation based on the W-phase carrier signal Cw and the W-phase command voltage. If the ON time period t6 is equal to or larger than the fixed value, the W-phase voltage Vw of the inverter circuit 600 which is A/D-converted by the A/D converter 602 is read, and it is judged whether the voltage Vw has a predetermined value or not. If the switching element Q6 is not abnormal, the W-phase voltage Vw is substantially equal to the − voltage (0 V) of the battery B. By contrast, if the switching element Q6 is abnormal, the W-phase voltage Vw has a value which is largely different from 0 V. In the case where the switching element Q6 is broken down to be in an open state, for example, the W-phase voltage Vw is about a half of the + voltage of the battery B. Therefore, normality/abnormality of the switching element Q6 can be judged by measuring the W-phase voltage Vw at the timing of the valley interrupt signal INT2W. If the ON time period t6 of the switching element Q6 is smaller than the fixed value, the element Q6 is not in the stable state. Therefore, the CPU 603 does not read the W-phase voltage Vw, and judgment of normality/abnormality is not conducted.

As described above, the peak interrupt signals INT1U to INT1W and the valley interrupt signals INT2U to INT2W are produced at the timings of peaks and valleys of the triangular wave carrier signals Cu, Cv, Cw for the phases. On the base of the peak interrupt signals INT1U to INT1W, normality/abnormality of the switching elements Q1, Q3, Q5 of the upper sides of the phases respectively corresponding to the interrupt signals is checked, and, on the basis of the valley interrupt signals INT2U to INT2W, normality/abnormality of the switching elements Q2, Q4, Q6 of the lower sides of the phases respectively corresponding to the interrupt signals is checked. Therefore, normality/abnormality of all the switching elements Q1 to Q6 can be judged in one cycle of the reference triangular wave carrier signal (carrier signal Cu).

If it is judged that one of the switching elements Q1 to Q6 is abnormal, a control section 601 conducts a control of stopping the motor M. In the control method, for example, the PWM circuit 608 is inhibited from outputting the PWM signals, thereby stopping the motor. When such a control is conducted, it is possible to prevent abnormal overheating or the like from occurring in the motor M. Alternatively, the motor M may be stopped in the following manner. The contacts of the contactor Z are opened to interrupt the power supply to the inverter circuit 600, thereby stopping the motor M, or a fuse which is not shown is connected in series to the contactor Z, and the fuse is blown up to interrupt the power supply to the inverter circuit 600. In addition to the above, the result of judgment of normality/abnormality of each element may be displayed on a display apparatus which is not shown.

In the embodiment described above, the multi-phase triangular wave carrier signals Cu, Cv, Cw which are shifted in phase by 120° from one another are used as the carrier signals, and the switching elements are checked on the basis of the interrupt signals which are generated at timings of peaks and valleys of the carrier signals. When the triangular wave carrier signals have a constant frequency, therefore, the peak and valley interrupt signals for the phases are generated at fixed time intervals which are determined by the period of the carrier signals, thereby enabling judgment of normality/abnormality of the switching elements for the phases to be always conducted at given timings. Therefore, a relatively long time period can be ensured for the judgment in accordance with the period of the carrier signals. The timings of peaks and valleys of the carrier signals are not timings when the switching elements Q1 to Q6 are switched from the OFF state to the ON state, but those when a predetermined time period elapses after the elements are turned ON. At the timings, therefore, the elements are in a stable state, and the result of the judgment of normality/abnormality is highly reliable.

The ON time period of each switching element is varied in accordance with the temporal change of the command voltage for each phase. When the ON time period is excessively short, therefore, the voltage which is read during the time period has low reliability, and hence there is a possibility that normality/abnormality of the elements is erroneously judged. In the embodiment, the phase voltages are read only when the ON time periods of the switching elements Q1 to Q6 are equal to or larger than the fixed value, and the judgment is then conducted. Consequently, there is no possibility that normality/abnormality of the elements is erroneously judged. The fixed value which serves as the criterion to judge the ON time period is set to a value which is equal to or larger than the minimum time period required in judgment of normality/abnormality of the elements.

As seen from FIG. 21, the peak interrupt signal INT1U is generated at the intermediate timing a of the time width t1 of the ON-period signal (U-phase upper) which maintains the switching element Q1 to the ON state, the peak interrupt signal INT1V is generated at the intermediate timing b of the time width t3 of the ON-period signal (V-phase upper) which maintains the switching element Q3 to the ON state, and the peak interrupt signal INT1W is generated at the intermediate timing c of the time width t5 of the ON-period signal (W-phase upper) which maintains the switching element Q5 to the ON state. The valley interrupt signal INT2U is generated at the intermediate timing (A) of the time width t2 of the ON-period signal (U-phase lower) which maintains the switching element Q2 to the ON state, the valley interrupt signal INT2V is generated at the intermediate timing (B) of the time width t4 of the ON-period signal (V-phase lower) which maintains the switching element Q4 to the ON state, intermediate timing (C) of the time width t6 of the ON-period signal (W-phase lower) which maintains the switching element Q6 to the ON state. At these intermediate timings, the switching elements Q1 to Q6 are in the most stable state. Therefore, the reliability of judgment of normality/abnormality of the elements is further enhanced. Even when elements in which the operation speed is low, and which require a certain time period before the elements are completely set to the ON state are used as the switching elements, judgment of normality/abnormality can be correctly conducted.

When the initial values of the up/down counters 12, 22, 32 shown in FIG. 2 are changed, the phase differences among the triangular wave carrier signals are changed. Therefore, the timings of peaks and valleys of the triangular wave carrier signals can be freely set in accordance with the initial values, so the switching elements can be checked while applying interruption at arbitrary timings and arbitrary time intervals.

The invention can be realized in various modes other than the above-described embodiment. In the embodiment, the interrupt signal is generated at every peaks and valley of the triangular wave carrier signals to check normality/abnormality of the switching elements Q1 to Q6. Alternatively, the checking operation may be conducted at every several cycles of each triangular wave carrier signal.

The peak and valley interrupt signals may be used not only in checking of normality/abnormality of the switching elements, but also as interrupt signals for other processes such as A/D conversion of the battery voltage, or A/D conversion of the phase currents flowing through the motor.

In the embodiment, the command value which is to be compared with the carrier signals is a voltage value. Alternatively, the command value may be a current value.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An inverter control apparatus comprising:

an inverter circuit in which series connections of a pair of switching elements are connected in parallel, the series connections being disposed correspondingly with respective phases of a multiphase alternating current motor, and phase voltages for driving the motor are taken out from junctions of the switching elements in the series connections, respectively;

a current detection means, disposed in series with the inverter circuit, for detecting a motor current flowing through the motor; and a control section which outputs PWM signals based on command values for the phases to control ON/OFF operations of the switching elements of the inverter circuit, wherein the control section comprises:

an A/D converter which A/D converts the motor current detected by the current detection means;

a control means for controlling an operation of the A/D converter;

a carrier signal generation section which generates triangular wave carrier signals respectively corresponding to the phases forming a predetermined phase difference among the carrier signals for the phases; and a signal production means for producing PWM signals respectively for the switching elements on the basis of a comparison between the triangular wave carrier signals for the phases output from the carrier signal generation section, and the command values for the phases, the signal production means produces interrupt signals for the control method respectively at timings when the PWM signals cause ON/OFF states of the switching elements to be switched over, and the control means controls the A/D converter to start A/D conversion, based on the interrupt signals.

2. The inverter control apparatus according to claim 1, wherein the signal production means produces the interrupt signals for the control means respectively at rising timings of the PWM signals when the switching elements are switched from the OFF state to the ON state.

3. The inverter control apparatus according to claim 1, wherein the control means obtains a time period from timing when one interrupt signal is produced to timing when a next interrupt signal is produced, when the time period is equal to or larger than a fixed value, the control means makes values of motor currents, which are A/D-converted during the time period, effective, and when the time period is smaller than the fixed value, the control means makes values of motor currents, which are A/D-converted during the time period, ineffective.

4. The inverter control apparatus according to claim 1, wherein the control means obtains a time period from timing when one interrupt signal is produced to timing when a next interrupt signal is produced, when the time period is equal to or larger than a fixed value, the control means controls the A/D converter to conduct A/D conversion during the time period, and when the time period is smaller than the fixed value, the control means inhibits A/D conversion during the time period.

5. The inverter control apparatus according to claim 1, wherein the control means sets one of the triangular wave carrier signals as a reference triangular wave carrier signal, when A/D conversion is conducted plural times on a motor current of the same phase in one cycle of the reference triangular wave carrier signal, the control means obtains an average of the A/D-converted motor currents, and sets the average as the motor current of the phase in the one cycle.

6. The inverter control apparatus according to claim 1, wherein the carrier signal generation section is disposed in each of the phases, each of the carrier signal generation sections comprises:

a counting means for counting clock signals and outputting a triangular wave carrier signal by incrementing or decrementing a count value;

a first detection means for detecting that the count value of the counting means reaches a predetermined upper limit;

a second detection means for detecting that the count value of the counting means reaches a predetermined lower limit; and a command means giving a subtraction command for conducting a decrementing calculation to the counting means based on a detection output of the first detection means and giving an addition command for conducting an incrementing calculation to the counting means based on a detection output of the second detection means, wherein the counting means for one phase outputs a triangular wave carrier signal which has a predetermined phase difference with respect to triangular wave carrier signals output from the counting means of the other phases.

7. An inverter control method for an inverter control apparatus, which comprises:

an inverter circuit in which series connections of a pair of switching elements are connected in parallel, the series connections being disposed correspondingly with respective phases of a multi-phase alternating current motor, and phase voltages for driving the motor are taken out from junctions of the switching elements in the series connections, respectively;

a current detection method, disposed in series with the inverter circuit, for detecting a motor current flowing through the motor; and a control section which outputs PWM signals based on command values for the phases to control ON/OFF operations of the switching elements of the inverter circuit, the control method comprising the steps of:

generating triangular wave carrier signals respectively corresponding to the phases forming a predetermined phase difference among the carrier signals for the phases, producing the PWM signals on the basis of a comparison between the triangular wave carrier signals and command values for the phases, producing the interrupt signals at timings when the PWM signals cause ON/OFF states of the switching elements to be switched over, and starting A/D conversion of the motor current detected by the current detection method on the basis of the interrupt signals.

8. The inverter control method according to claim 7, wherein the interrupt signals are produced respectively at rising timings of the PWM signals when the switching elements are switched from the OFF state to the ON state.

9. An inverter control apparatus comprising:

an inverter circuit in which series connections of a pair of switching elements are connected in parallel, the series connections being disposed correspondingly with respective phases of a multi-phase alternating current motor, and phase voltages for driving the motor are taken out from junctions of the switching elements in the series connections, respectively;

current detection means, connected in series with the series connections respectively, for detecting a motor current flowing through the motor for each phase; and a control section which outputs PWM signals based on command values for the phases to control ON/OFF operations of the switching elements of the inverter circuit, wherein the control section comprises:

an A/D converter which A/D-converts the motor currents of the phases detected respectively by the current detection means;

a control means for controlling an operation of the A/D converter;

a carrier signal generation section which generates triangular wave carrier signals respectively corresponding to the phases forming a predetermined phase difference among the carrier signals for the phases; and a signal production means for producing PWM signals respectively for the switching elements on the basis of a comparison between the triangular wave carrier signals for the phases output from the carrier signal generation section, and the command values for the phases, the carrier signal generation section produces interrupt signals for the control method respectively at timings of peaks or valleys of the triangular wave carrier signals for the phases, and the control means controls the A/D converter to start A/D conversion of the motor current of the phase corresponding to the interrupt signal on the basis of each of the interrupt signals.

10. The inverter control apparatus according to claim 9, wherein each of the PWM signals is configured by:

an ON-period signal which maintains corresponding one of the switching elements to an ON state, and which has a variable time width; and an OFF-period signal which maintains the switching element to an OFF state, and which has a variable time width, the control means obtains a time width of the ON-period signal which maintains one of the switching elements of the series connection for the phases to an ON state, when the time width is equal to or larger than a fixed value, the control means makes values of motor currents which are A/D-converted on the basis of interrupt signals that are produced during the time period, effective, and when the time width is smaller than the fixed value, the control means makes values of motor currents which are A/D-converted on the basis of interrupt signals that are produced during the time period, ineffective.

11. The inverter control apparatus according to claim 9, wherein each of the PWM signals is configured by:

an ON-period signal which maintains corresponding one of the switching elements to an ON state, and which has a variable time width; and an OFF-period signal which maintains the switching element to an OFF state, and which has a variable time width, the control means obtains a time width of the ON-period signal which maintains one of the switching elements of the series connection for the phases to an ON state, when the time width is equal to or larger than a fixed value, the control method controls the A/D converter to conduct A/D conversion based on interrupt signals that are produced during the time period, and when the time width is smaller than the fixed value, the control means inhibits A/D conversion during the time period.

12. The inverter control apparatus according to claim 9, wherein the carrier signal generation section is disposed in each of the phases, each of the carrier signal generation sections comprises:

a counting means for counting clock signals, and outputting a triangular wave carrier signal by incrementing or decrementing a count value;

a first detection means for detecting that the count value of the counting means reaches a predetermined upper limit, and producing a first interrupt signal corresponding to a peak of the triangular wave carrier signal at timing when the count value reaches the upper limit;

a second detection means for detecting that the count value of the counting means reaches a predetermined lower limit, and producing a second interrupt signal corresponding to a valley of the triangular wave carrier signal at timing when the count value reaches the lower limit; and a command means for giving a subtraction command for conducting the decrementing calculation to the counting means based on a detection output of the first detection method, and giving an addition command for conducting the incrementing calculation to the counting method, based on a detection output of the second detection means, and the counting means for one phase outputs a triangular wave carrier signal which has a predetermined phase difference with respect to triangular wave carrier signals output from the counting means of the other phases.

13. An inverter control method for an inverter control apparatus, which comprises:

an inverter circuit in which series connections of a pair of switching elements are connected in parallel, the series connections being disposed correspondingly with respective phases of a multiphase alternating current motor, and phase voltages for driving the motor are taken out from junctions of the switching elements in the series connections, respectively;

a current detection method, connected in series with the series connections, respectively, for detecting a motor current flowing through the motor for each phase; and a control section which outputs PWM signals based on command values for the phases to control ON/OFF operations of the switching elements of the inverter circuit, the control method comprising the steps of:

in the control section, generating triangular wave carrier signals respectively corresponding to the phases forming a predetermined phase difference among the carrier signals for the phases, producing the PWM signals on the basis of a comparison between the triangular wave carrier signals and command values for the phases, producing the interrupt signals at timings of peaks or valleys of the triangular wave carrier signals, and starting the A/D conversion of the motor currents of the phases corresponding to the interrupt signals detected by the detection method, on the basis of the interrupt signals.

14. An inverter control apparatus comprising:

an inverter circuit in which series connections of a pair of switching elements are connected in parallel, the series connections being disposed correspondingly with respective phases of a multi-phase alternating current motor, and phase voltages for driving the motor are taken out from junctions of the switching elements in the series connections, respectively; and a control section which outputs PWM signals based on command values for the phases to control ON/OFF operations of the switching elements of the inverter circuit, wherein the control section comprises:

a carrier signal generation section which generates triangular wave carrier signals respectively corresponding to the phases forming a predetermined phase difference among the carrier signals for the phases;

a signal production means for producing PWM signals respectively for the switching elements on the basis of a comparison between the triangular wave carrier signals for the phases output from the carrier signal generation section, and the command values for the phases; and a judging means for judging normality and abnormality of the switching elements operating on the basis of the PWM signals, the carrier signal generation section produces interrupt signals for the judging means respectively at timings of peaks or valleys of the triangular wave carrier signals for the phases, and on the basis of each of the interrupt signals, the judging means judges normality and abnormality of the switching elements of the series connection for the phase corresponding to the interrupt signal.

15. The inverter control apparatus according to claim 14, wherein each of the PWM signals is configured by:

an ON-period signal which maintains corresponding one of the switching elements to an ON state, and which has a variable time width; and an OFF-period signal which maintains the switching element to an OFF state, and which has a variable time width, and on the basis of the interrupt signals, the judging means judges whether the time width of the ON-period signal which maintains the switching element for the phase corresponding to the interrupt signal is equal to or larger than a fixed value or not, and when the time width is equal to or larger than the fixed value, the judging means reads a voltage of the phase at a junction, and judges normality and abnormality of the switching elements on the basis of the voltage.

16. The inverter control apparatus according to claim 14, wherein the carrier signal generation section produces a peak interrupt signal for the judging means at timings of peaks of the triangular wave carrier signals for the phases, and a valley interrupt signal for the judging means at timings of valleys, and on the basis of the peak interrupt signal of the interrupt signals, the judging means judges normality and abnormality of one of the switching elements of the series connection for the phase corresponding to the interrupt signal, and on the basis of the valley interrupt signal, the judging means judges normality and abnormality of another one of the switching elements of the series connection for the phase corresponding to the interrupt signal.

17. The inverter control apparatus according to claim 16, wherein the judging means sets one of the triangular wave carrier signals as a reference triangular wave carrier signal, and in one cycle of the reference triangular wave carrier signal, the judging means judges normality and abnormality of all the switching elements on the basis of the peak and valley interrupt signals for the phases.

18. The inverter control apparatus according to claim 14, wherein the carrier signal generation section is disposed in each of the phases, and each of the carrier signal generation sections comprises:

a counting means for counting clock signals, and outputting a triangular wave carrier signal by incrementing or decrementing a count value;

a first detection means for detecting that the count value reaches a predetermined upper limit, and producing a peak interrupt signal corresponding to a peak of the triangular wave carrier signal at timing when the count value reaches the upper limit;

a second detection means for detecting that the count value reaches a predetermined lower limit, and producing a valley interrupt signal corresponding to a valley of the triangular wave carrier signal at timing when the count value reaches the lower limit; and a command means for giving a subtraction command for conducting a decrementing calculation to the counting means, based on a detection output of the first detection means, and giving an addition command for conducting an incrementing calculation to the counting means, based on a detection output of the second detection means, and the counting means for one phase outputs a triangular wave carrier signal which has a predetermined phase difference with respect to triangular wave carrier signals output from the counting means of the other phases.

19. An inverter control method for an inverter control apparatus, which comprises:

an inverter circuit in which series connections of a pair of switching elements are connected in parallel, the series connections being disposed correspondingly with respective phases of a multi-phase alternating current motor, and phase voltages for driving the motor are taken out from junctions of the switching elements in the series connections, respectively; and a control section which outputs PWM signals based on command values for the phases to control ON/OFF operations of the switching elements of the inverter circuit, the control method comprising the steps of:

in the control section, generating triangular wave carrier signals respectively corresponding to the phases forming a predetermined phase difference among the carrier signals for the phases, producing interrupt signals at timings of peaks or valleys of the triangular wave carrier signals for the phases, and judging normality and abnormality of the switching elements of the series connection for the phase corre sponding to the interrupt signal on the basis of each of the interrupt signals.

20. The inverter control method according to claim 19, wherein, in the control section, a peak interrupt signal is produced at timings of peaks of the triangular wave carrier signals for the phases, a valley interrupt signal is produced at timings of valleys, normality and abnormality of one of the switching elements of the series connection for the phase corresponding to the interrupt signal is judged on the basis of the peak interrupt signal, and normality and abnormality of another one of the switching elements of the series connection for the phase corresponding to the interrupt signal is judged on the basis of the valley interrupt signal.

* * * * *